(12) United States Patent
Carlson et al.

(10) Patent No.: US 8,065,848 B2
(45) Date of Patent: *Nov. 29, 2011

(54) STRUCTURAL MEMBER

(75) Inventors: Barry L. Carlson, Windsor, CO (US); Jason Underhill, Fort Collins, CO (US)

(73) Assignee: TAC Technologies, LLC, Fort Collins, CO (US)

( * ) Notice: Subject to any disclaimer, the term of this patent is extended or adjusted under 35 U.S.C. 154(b) by 214 days.

This patent is subject to a terminal disclaimer.

(21) Appl. No.: 12/233,523

(22) Filed: Sep. 18, 2008

(65) Prior Publication Data
US 2009/0075031 A1 Mar. 19, 2009

Related U.S. Application Data

(60) Provisional application No. 61/096,271, filed on Sep. 11, 2008, provisional application No. 60/980,427, filed on Oct. 16, 2007, provisional application No. 60/980,423, filed on Oct. 16, 2007, provisional application No. 60/973,425, filed on Sep. 18, 2007.

(51) Int. Cl.
*E04C 1/00* (2006.01)

(52) U.S. Cl. ........ 52/309.16; 52/843; 52/309.1; 52/577; 29/458; 29/897.3; 428/188; 428/319.7; 264/34; 264/271.1

(58) Field of Classification Search .................... 52/325, 52/421, 577, 783.1, FOR. 134, 309.16, 309.7, 52/309.1, 309.4, 843, 844, 845, 847, 841; 428/411.1, 412, 161, 172, 188, 319.3, 319.7; 264/34, 271.1; 403/234; 29/458, 527.2, 29/897.3, 897.213
See application file for complete search history.

(56) References Cited

U.S. PATENT DOCUMENTS 526,730 A 10/1894 Norcross
742,849 A * 11/1903 Eggert ........................... 52/325
(Continued)

FOREIGN PATENT DOCUMENTS

DE 1484185 2/1969
(Continued)

OTHER PUBLICATIONS

U.S. Appl. No. 11/194,973, filed Apr. 3, 2007.
(Continued)

*Primary Examiner* — Robert Canfield
*Assistant Examiner* — Matthew Gitlin
(74) *Attorney, Agent, or Firm* — William W. Cochran; Cochran Freund & Young LLC

(57) ABSTRACT

A system and method of manufacture providing reinforced structurally functional load-bearing members, including but not limited to using thermoplastic materials, such as High Density Polyethylene (HDPE) or polypropylene (PP), reinforced such as with an aluminum alloy, glass-reinforced polyurethane (foamed or unfoamed), or carbon fiber core element. Among its possible uses, the present invention has application for provision of structural support members, such as an illustrative I-joist product having a vertical center member preferably comprising a thermoplastic material, and top and bottom flanges having structurally meaningful reinforcement. The center member and flanges preferably comprising a thermoplastic material provides a relatively hard, durable, substantially weather-resistant structure. Certain embodiments of the present invention include reinforcing members having a plurality of lobes or arms. Additional embodiments include indentations along the reinforcing members, such as the arms, to aid in bonding between the thermoplastic outer material and reinforcing member within the thermoplastic material. Certain embodiments of the present invention include reinforcing members used in combination with a foamed area and a thermoplastic material.

13 Claims, 50 Drawing Sheets

U.S. PATENT DOCUMENTS

| | | | |
|---|---|---|---|
| 1,006,423 A * | 10/1911 | Asher | 52/324 |
| 1,017,386 A * | 2/1912 | Davis | 52/421 |
| 1,092,621 A * | 4/1914 | Worner | 52/574 |
| 1,175,875 A * | 3/1916 | Shiels | 52/574 |
| 1,422,579 A | 7/1922 | Kent | |
| 1,860,205 A | 5/1932 | Schenker | |
| 2,328,453 A * | 8/1943 | Hopewell | 52/250 |
| 2,751,775 A | 6/1956 | Sergovic | |
| 3,108,406 A * | 10/1963 | Ellis | 52/577 |
| 3,134,468 A * | 5/1964 | Toti et al. | 52/844 |
| 3,195,699 A | 7/1965 | Johnston | |
| 3,217,659 A | 11/1965 | Ford, Jr. | |
| 3,228,162 A | 1/1966 | Gregoire | |
| 3,239,982 A | 3/1966 | Nicosia | |
| 3,263,387 A | 8/1966 | Simpson | |
| 3,267,627 A | 8/1966 | Hammitt | |
| 3,283,464 A | 11/1966 | Litzka | |
| 3,284,971 A | 11/1966 | Attwood | |
| 3,286,413 A | 11/1966 | Wells | |
| 3,295,267 A | 1/1967 | Lundell | |
| 3,300,931 A | 1/1967 | Lutze | |
| 3,307,312 A | 3/1967 | Kreibaum | |
| 3,328,931 A | 7/1967 | Smith | |
| 3,368,016 A | 2/1968 | Birguer | |
| 3,394,507 A | 7/1968 | Doke | |
| 3,396,499 A * | 8/1968 | Biffani | 52/127.12 |
| 3,427,773 A | 2/1969 | Kandall | |
| 3,442,542 A | 5/1969 | Watanabe | |
| 3,487,518 A | 1/1970 | Hopfeld | |
| 3,492,770 A * | 2/1970 | Furner | 52/204.597 |
| 3,507,738 A | 4/1970 | Prusinski et al. | |
| 3,511,743 A | 5/1970 | Rach | |
| 3,516,213 A | 6/1970 | Sauer | |
| 3,577,504 A | 5/1971 | Lipski | |
| 3,583,123 A | 6/1971 | Holmgren et al. | |
| 3,590,547 A | 7/1971 | Molyneux | |
| 3,617,364 A | 11/1971 | Jarema et al. | |
| 3,654,018 A | 4/1972 | Bogue et al. | |
| 3,707,401 A | 12/1972 | Jarema et al. | |
| 3,708,380 A | 1/1973 | Niebylski | |
| 3,715,846 A | 2/1973 | Sullhofer | |
| 3,716,957 A | 2/1973 | Bernardi | |
| 3,716,959 A | 2/1973 | Bernardi | |
| 3,727,936 A * | 4/1973 | Klir et al. | 280/610 |
| 3,732,654 A | 5/1973 | Tsurumi | |
| 3,753,326 A | 8/1973 | Kaufman, Sr. | |
| 3,798,867 A | 3/1974 | Starling | |
| 3,810,363 A | 5/1974 | Dar Conte | |
| 3,845,544 A | 11/1974 | Nurminen et al. | |
| 3,866,372 A | 2/1975 | Haage | |
| 3,871,149 A * | 3/1975 | Georgii | 52/404.1 |
| 3,877,193 A | 4/1975 | Hall | |
| 3,896,199 A | 7/1975 | Michaelis | |
| 3,908,327 A | 9/1975 | Quigg | |
| 3,913,290 A | 10/1975 | Billing et al. | |
| 3,946,529 A | 3/1976 | Chevaux | |
| 3,946,533 A | 3/1976 | Raugh et al. | |
| 3,947,309 A | 3/1976 | Troutner | |
| 3,963,552 A | 6/1976 | Troutner et al. | |
| 3,964,231 A * | 6/1976 | Budich et al. | 52/213 |
| 3,979,870 A | 9/1976 | Moore | |
| 3,992,834 A * | 11/1976 | Valenzano | 52/220.2 |
| D242,625 S | 12/1976 | Schmidt | |
| D242,799 S | 12/1976 | Schmidt | |
| 4,012,883 A | 3/1977 | Muller | |
| 4,014,201 A | 3/1977 | Troutner et al. | |
| 4,019,301 A | 4/1977 | Fox | |
| 4,033,166 A | 7/1977 | Troutner | |
| 4,047,341 A | 9/1977 | Bernardi | |
| 4,081,941 A | 4/1978 | Van Ausdall | |
| 4,122,203 A | 10/1978 | Stahl | |
| 4,129,974 A | 12/1978 | Ojalvo | |
| 4,130,976 A * | 12/1978 | Kesseler et al. | 52/656.2 |
| 4,141,944 A | 2/1979 | Anstadt et al. | |
| 4,147,379 A | 4/1979 | Winslow | |
| 4,177,306 A | 12/1979 | Schultz et al. | |
| 4,196,558 A | 4/1980 | Jungbluth | |
| 4,219,980 A | 9/1980 | Loyd | |
| 4,251,973 A | 2/1981 | Paik | |
| 4,291,081 A | 9/1981 | Olez | |
| 4,297,825 A | 11/1981 | Harper, Jr. | |
| 4,302,913 A | 12/1981 | Schwartz et al. | |
| 4,320,162 A | 3/1982 | Schultz | |
| 4,333,289 A | 6/1982 | Strickland | |
| 4,341,831 A * | 7/1982 | Kleiss | 428/188 |
| 4,355,754 A | 10/1982 | Lund et al. | |
| 4,364,213 A | 12/1982 | Biesanz, Sr. | |
| 4,407,106 A | 10/1983 | Beck | |
| 4,411,115 A * | 10/1983 | Marzouki et al. | 52/309.1 |
| 4,424,652 A | 1/1984 | Turner | |
| 4,429,872 A | 2/1984 | Capachi | |
| 4,453,363 A | 6/1984 | Koller | |
| 4,492,063 A | 1/1985 | Schock et al. | |
| 4,505,082 A | 3/1985 | Schmitz | |
| 4,512,835 A | 4/1985 | Gardiner | |
| 4,514,449 A * | 4/1985 | Budich et al. | 428/76 |
| 4,527,372 A | 7/1985 | Ryan | |
| 4,550,543 A * | 11/1985 | Valenzano | 52/309.7 |
| 4,566,231 A | 1/1986 | Konsevich | |
| 4,569,875 A | 2/1986 | Pohlmann et al. | |
| 4,571,913 A | 2/1986 | Schleich et al. | |
| 4,576,849 A | 3/1986 | Gardiner | |
| 4,587,774 A | 5/1986 | Wendt | |
| 4,607,470 A | 8/1986 | Ecker | |
| 4,616,464 A | 10/1986 | Schleich et al. | |
| 4,616,960 A | 10/1986 | Gladish | |
| 4,621,475 A | 11/1986 | McClain | |
| 4,630,546 A | 12/1986 | Wiger et al. | |
| 4,630,547 A | 12/1986 | Przybylinski et al. | |
| 4,630,548 A | 12/1986 | Wiger et al. | |
| 4,646,493 A | 3/1987 | Grossman | |
| 4,647,489 A | 3/1987 | Siol et al. | |
| 4,695,501 A | 9/1987 | Robinson | |
| 4,704,830 A | 11/1987 | Magadini | |
| 4,725,471 A * | 2/1988 | Imhoff | 428/71 |
| 4,738,058 A | 4/1988 | Svensson | |
| 4,740,405 A * | 4/1988 | Tanaka et al. | 428/45 |
| 4,774,794 A | 10/1988 | Grieb | |
| 4,779,395 A | 10/1988 | Schleich et al. | |
| 4,785,599 A | 11/1988 | Murphy | |
| 4,811,542 A | 3/1989 | Jewell | |
| 4,831,800 A | 5/1989 | Nedeicu | |
| 4,848,054 A | 7/1989 | Blitzer et al. | |
| 4,887,406 A | 12/1989 | Saia | |
| 4,891,081 A | 1/1990 | Takahashi et al. | |
| 4,894,898 A | 1/1990 | Walker | |
| 4,953,339 A | 9/1990 | Jewell | |
| 4,996,812 A | 3/1991 | Venable | |
| 5,021,281 A | 6/1991 | Bompard et al. | |
| 5,022,209 A | 6/1991 | Kimura | |
| 5,052,164 A | 10/1991 | Sandow | |
| 5,052,307 A | 10/1991 | Morrison | |
| 5,066,440 A | 11/1991 | Kennedy et al. | |
| 5,095,674 A | 3/1992 | Huettemann | |
| 5,096,525 A | 3/1992 | Engwall | |
| 5,119,614 A | 6/1992 | Rex | |
| 5,125,207 A | 6/1992 | Strobl, Jr. et al. | |
| 5,148,642 A | 9/1992 | Plumier et al. | |
| 5,207,045 A | 5/1993 | Bodnar | |
| 5,230,190 A | 7/1993 | Schuette | |
| 5,233,807 A | 8/1993 | Spera | |
| 5,238,716 A | 8/1993 | Adachi | |
| 5,268,226 A | 12/1993 | Sweeney | |
| 5,271,204 A * | 12/1993 | Wolf et al. | 52/836 |
| 5,279,093 A | 1/1994 | Mead | |
| 5,285,616 A | 2/1994 | Tripp | |
| 5,294,468 A | 3/1994 | Chang | |
| 5,295,334 A | 3/1994 | Haraden | |
| 5,308,675 A | 5/1994 | Crane et al. | |
| 5,313,749 A | 5/1994 | Conner | |
| 5,321,926 A | 6/1994 | Kennedy | |
| 5,373,674 A | 12/1994 | Winter, IV | |
| 5,396,748 A | 3/1995 | Rogers | |
| 5,398,470 A | 3/1995 | Ritter et al. | |
| 5,412,913 A | 5/1995 | Daniels et al. | |
| 5,414,969 A | 5/1995 | Krejci et al. | |
| 5,421,132 A | 6/1995 | Bischel et al. | |

| | | |
|---|---|---|
| 5,437,303 A | 8/1995 | Johnson |
| 5,455,100 A | 10/1995 | White |
| 5,471,809 A | 12/1995 | Frankel |
| 5,501,053 A | 3/1996 | Goleby |
| 5,509,250 A | 4/1996 | Jensen et al. |
| 5,511,355 A | 4/1996 | Dingler |
| 5,518,208 A | 5/1996 | Roseburg |
| 5,524,410 A | 6/1996 | Menchetti |
| 5,535,569 A | 7/1996 | Seccombe et al. |
| 5,537,789 A | 7/1996 | Minke |
| 5,553,437 A | 9/1996 | Navon |
| 5,588,273 A | 12/1996 | Csagoly |
| 5,595,040 A | 1/1997 | Chen |
| 5,600,930 A | 2/1997 | Drucker |
| 5,600,932 A | 2/1997 | Paik et al. |
| 5,612,111 A | 3/1997 | Lin |
| 5,636,492 A | 6/1997 | Dingler |
| 5,671,573 A | 9/1997 | Tadros et al. |
| 5,680,738 A | 10/1997 | Allen et al. |
| 5,681,641 A | 10/1997 | Grigsby et al. |
| 5,749,199 A | 5/1998 | Allen |
| 5,749,256 A | 5/1998 | Bodnar |
| 5,817,397 A | 10/1998 | Kamiya et al. |
| 5,829,716 A | 11/1998 | Kirkwood et al. |
| 5,845,447 A | 12/1998 | Bodine et al. |
| 5,848,512 A | 12/1998 | Conn |
| 5,893,248 A * | 4/1999 | Beliveau .................. 52/309.7 |
| 5,895,419 A | 4/1999 | Tweden et al. |
| 5,913,784 A | 6/1999 | Hite |
| 5,913,794 A | 6/1999 | Chen |
| 5,914,175 A | 6/1999 | Nudo et al. |
| 5,924,261 A | 7/1999 | Fricke |
| 5,930,966 A | 8/1999 | Wood et al. |
| 5,930,968 A | 8/1999 | Pullam |
| 5,950,377 A | 9/1999 | Yoder |
| 5,953,880 A * | 9/1999 | De Zen .................. 405/257 |
| 5,968,444 A | 10/1999 | Yamamoto |
| 5,974,760 A | 11/1999 | Tingley |
| 5,985,435 A | 11/1999 | Czaplicki et al. |
| 5,996,672 A | 12/1999 | Kotin |
| 6,012,256 A | 1/2000 | Aschheim |
| 6,018,927 A * | 2/2000 | Major .................. 52/793.1 |
| 6,023,903 A | 2/2000 | Stecker |
| 6,041,566 A | 3/2000 | Allen |
| 6,058,673 A | 5/2000 | Wycech |
| 6,060,144 A | 5/2000 | Kimura et al. |
| 6,067,770 A | 5/2000 | Lubker, II et al. |
| 6,073,420 A | 6/2000 | Bjøru et al. |
| 6,082,073 A | 7/2000 | Silvanus et al. |
| 6,115,986 A | 9/2000 | Kelly |
| 6,122,884 A | 9/2000 | Talwar |
| 6,128,884 A | 10/2000 | Berdan, II et al. |
| 6,131,362 A | 10/2000 | Buecker |
| 6,138,432 A | 10/2000 | Banicevic |
| 6,161,361 A | 12/2000 | Ehrenkrantz |
| 6,170,217 B1 | 1/2001 | Meyer |
| 6,173,550 B1 | 1/2001 | Tingley |
| 6,209,282 B1 | 4/2001 | Lafrance |
| 6,212,846 B1 | 4/2001 | Johnston |
| 6,216,404 B1 | 4/2001 | Vellrath |
| 6,219,990 B1 | 4/2001 | Snyder et al. |
| 6,233,892 B1 | 5/2001 | Tylman |
| 6,237,302 B1 | 5/2001 | Fricke |
| 6,237,303 B1 | 5/2001 | Allen et al. |
| 6,280,667 B1 | 8/2001 | Koenig et al. |
| 6,296,224 B1 | 10/2001 | Hayakawa |
| 6,301,857 B1 | 10/2001 | Vrana |
| 6,318,029 B1 | 11/2001 | Huppunen |
| D451,612 S | 12/2001 | Thibault et al. |
| 6,330,778 B1 | 12/2001 | Jakobsson |
| 6,332,301 B1 | 12/2001 | Goldzak |
| 6,341,467 B1 | 1/2002 | Wycech |
| 6,343,453 B1 | 2/2002 | Wright |
| 6,344,268 B1 | 2/2002 | Stucky et al. |
| 6,370,833 B1 | 4/2002 | Rastegar |
| 6,374,555 B1 | 4/2002 | Gusler |
| 6,391,456 B1 | 5/2002 | Krishnaswamy et al. |
| 6,408,591 B1 | 6/2002 | Yamashita et al. |
| 6,415,562 B1 | 7/2002 | Donaghue et al. |
| 6,418,686 B1 | 7/2002 | Record |
| 6,446,414 B1 | 9/2002 | Bullard, III et al. |
| 6,460,309 B1 | 10/2002 | Schneider |
| 6,460,310 B1 | 10/2002 | Ford et al. |
| 6,475,577 B1 | 11/2002 | Hopton et al. |
| 6,484,997 B1 | 11/2002 | Edwards et al. |
| 6,497,080 B1 | 12/2002 | Malcolm |
| 6,505,454 B2 * | 1/2003 | Dingler ...................... 52/842 |
| 6,516,583 B1 | 2/2003 | Houghton |
| 6,526,723 B2 | 3/2003 | Hovenier |
| 6,532,713 B2 | 3/2003 | Katayama et al. |
| 6,550,211 B2 | 4/2003 | Kergen |
| 6,555,214 B1 | 4/2003 | Yates |
| 6,561,571 B1 | 5/2003 | Brennecke |
| 6,561,736 B1 | 5/2003 | Doleshal |
| 6,612,085 B2 | 9/2003 | Edwards et al. |
| 6,615,559 B2 | 9/2003 | McGrath et al. |
| 6,616,997 B1 | 9/2003 | Lauer et al. |
| 6,619,502 B2 | 9/2003 | Walther et al. |
| 6,634,155 B2 | 10/2003 | Smith |
| 6,672,026 B2 | 1/2004 | Sumerak |
| 6,684,596 B2 | 2/2004 | Rastegar |
| 6,701,690 B2 | 3/2004 | Deschenes |
| 6,708,459 B2 | 3/2004 | Bodnar |
| 6,749,709 B1 | 6/2004 | Krisnawswamy et al. |
| 6,755,003 B1 | 6/2004 | McGrath et al. |
| 6,826,884 B2 | 12/2004 | Pabedinskas et al. |
| 6,844,040 B2 | 1/2005 | Pabedinskas et al. |
| 6,863,972 B2 | 3/2005 | Burger et al. |
| 6,922,969 B1 * | 8/2005 | Mina ...................... 52/841 |
| 7,213,379 B2 | 5/2007 | Carlson et al. |
| 7,634,891 B2 * | 12/2009 | Fanucci et al. ................. 52/843 |
| 2002/0146541 A1 | 10/2002 | Fried |
| 2003/0014938 A1 | 1/2003 | Deschenes |
| 2003/0059577 A1 | 3/2003 | Morrison et al. |
| 2004/0031230 A1 | 2/2004 | Pabedinskas et al. |
| 2004/0045847 A1 | 3/2004 | Fairbank |
| 2004/0062915 A1 | 4/2004 | Pabedinskas et al. |
| 2004/0062922 A1 | 4/2004 | Sunde |
| 2004/0118078 A1 * | 6/2004 | Rastegar ...................... 52/729.2 |
| 2004/0137212 A1 | 7/2004 | Ochoa et al. |
| 2004/0250503 A1 | 12/2004 | Bigelow |
| 2004/0265568 A1 | 12/2004 | Crane |
| 2005/0108983 A1 | 5/2005 | Simko et al. |
| 2006/0032182 A1 | 2/2006 | Carlson et al. |
| 2006/0035069 A1 | 2/2006 | Hanai |
| 2007/0141282 A1 | 6/2007 | Chang et al. |
| 2007/0281133 A1 | 12/2007 | Smith et al. |
| 2008/0010924 A1 * | 1/2008 | Pietruczynik et al. ........ 52/309.1 |

FOREIGN PATENT DOCUMENTS

| | | |
|---|---|---|
| DE | 3045389 | 7/1982 |
| DE | 9206272 | 9/1992 |
| FR | A2760478 | 9/1998 |

OTHER PUBLICATIONS

U.S. Appl. No. 11/675,587, filed Feb. 15, 2007 by Carlson et al.
U.S. Appl. No. 11/696,629, filed Apr. 4, 2007 by Carlson et al.
U.S. Appl. No. 11/696,122, filed Apr. 3, 2007 by Carlson et al.
U.S. Appl. No. 11/777,930, filed Jul. 13, 2007 by Carlson.
Non-Final Office Action, mailed Apr. 29, 2009, in U.S. Appl. No. 11/777,930, filed Jul. 13, 2007, by Barry Carlson, et al.
Non-Final Office Action, mailed Nov. 21, 2006, in U.S. Appl. No. 11/194,973, filed Aug. 2, 2005 by Barry Carlson et al.
Non-Final Office Action, mailed Mar. 9, 2009, in U.S. Appl. No. 11/696,629, filed Apr. 4, 2007 by Barry Carlson et al.

* cited by examiner

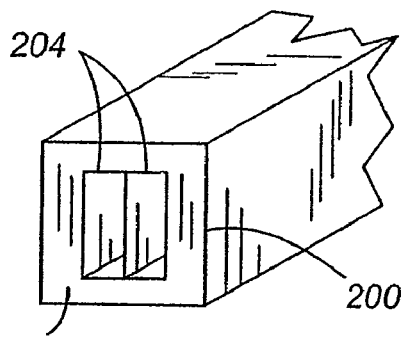 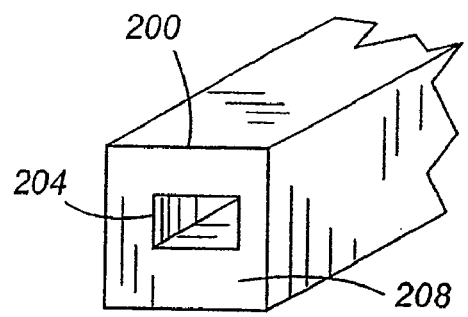
Fig. 15A　　　Fig. 15B
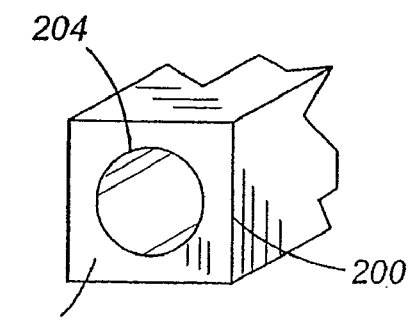 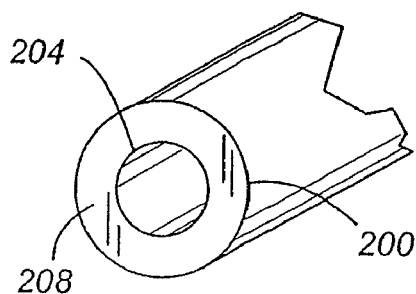
Fig. 15C　　　Fig. 15D
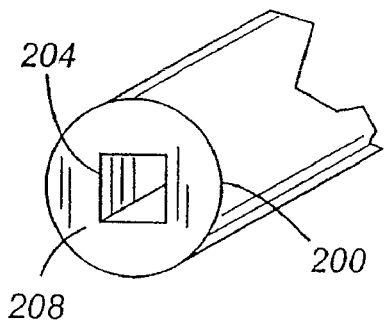 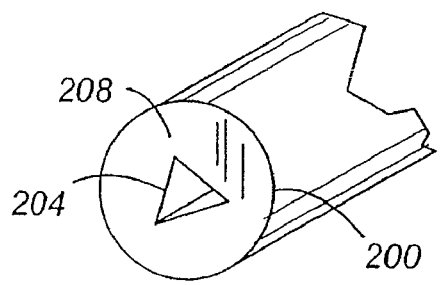
Fig. 15E　　　Fig. 15F
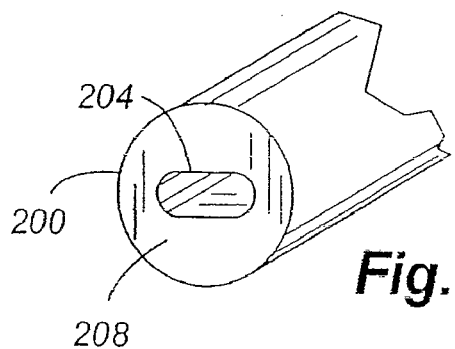
Fig. 15G

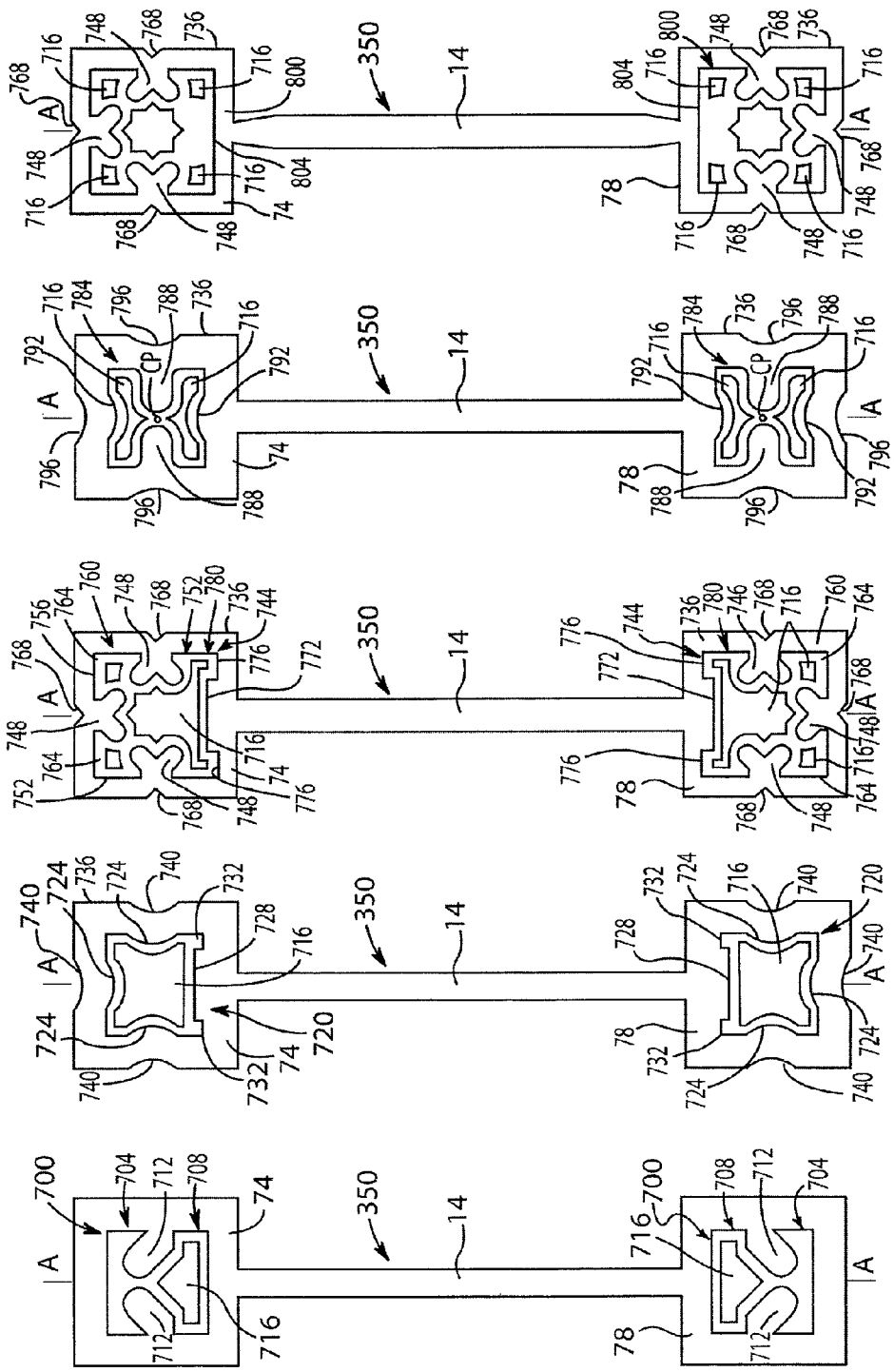

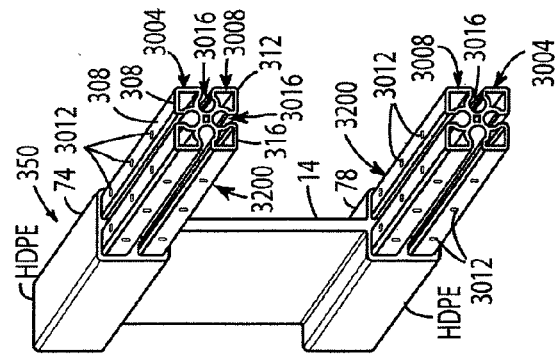
FIG. 33
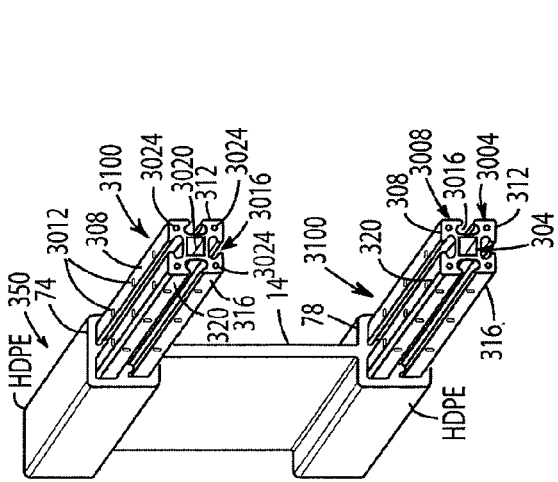
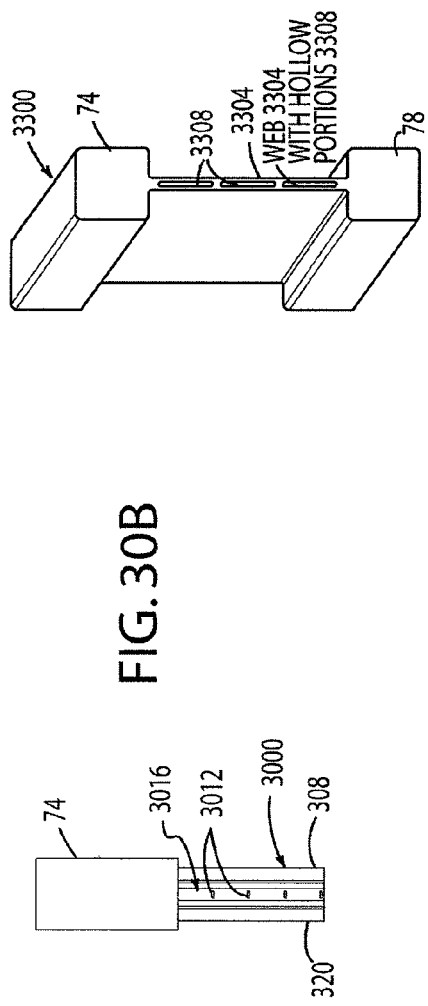
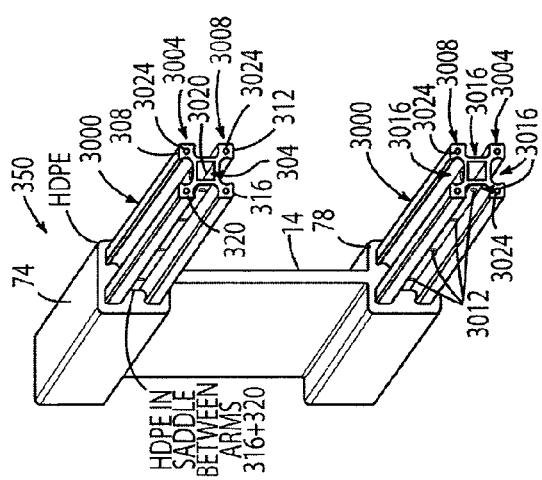

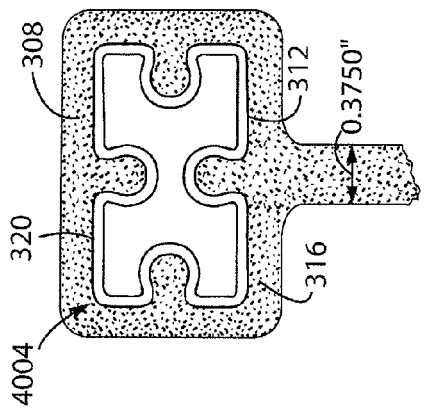
FIG. 40D
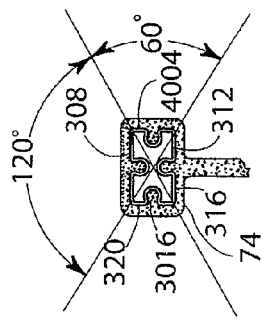
FIG. 40E
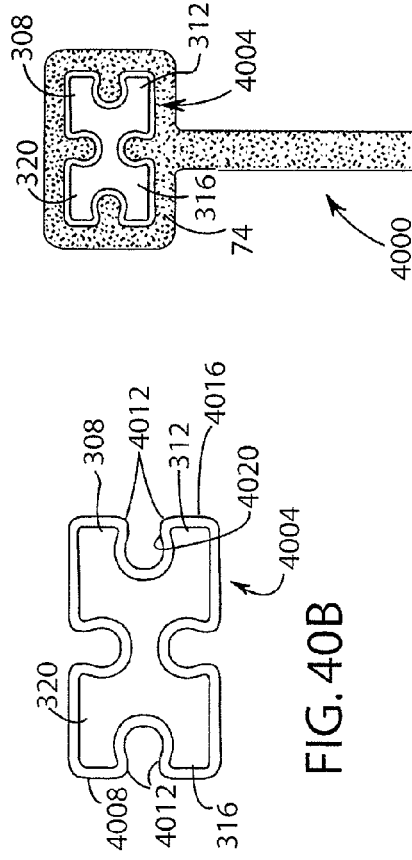
FIG. 40B
FIG. 40C
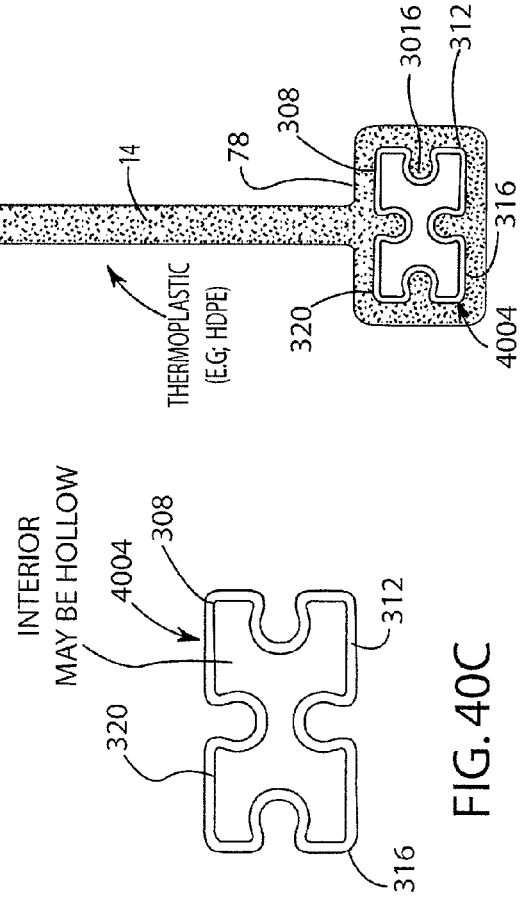
FIG. 40A

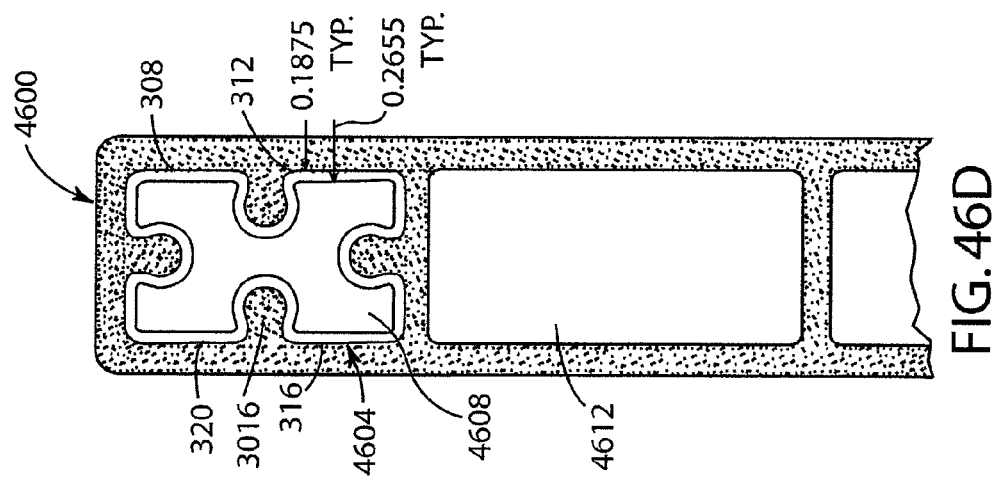
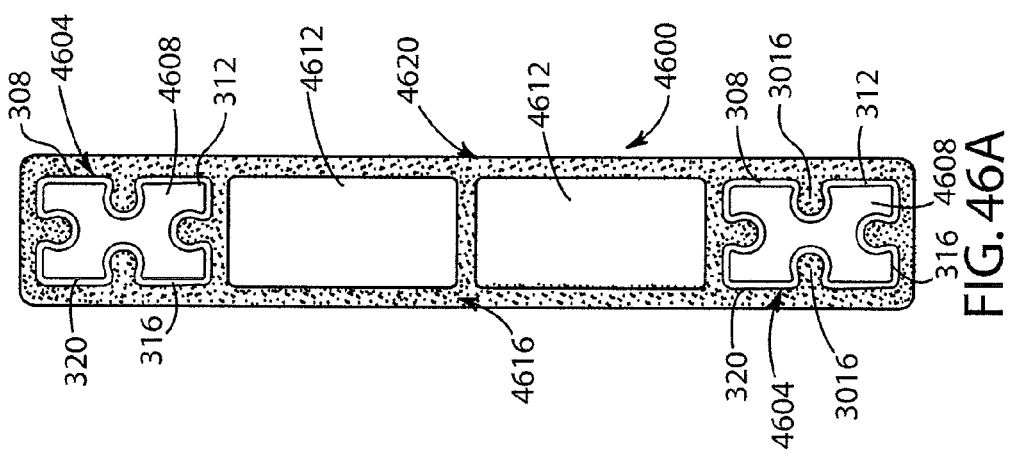
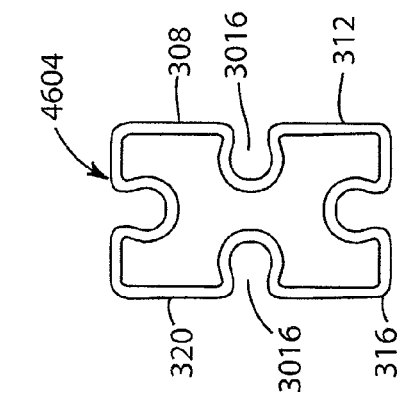
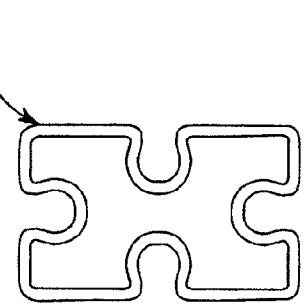

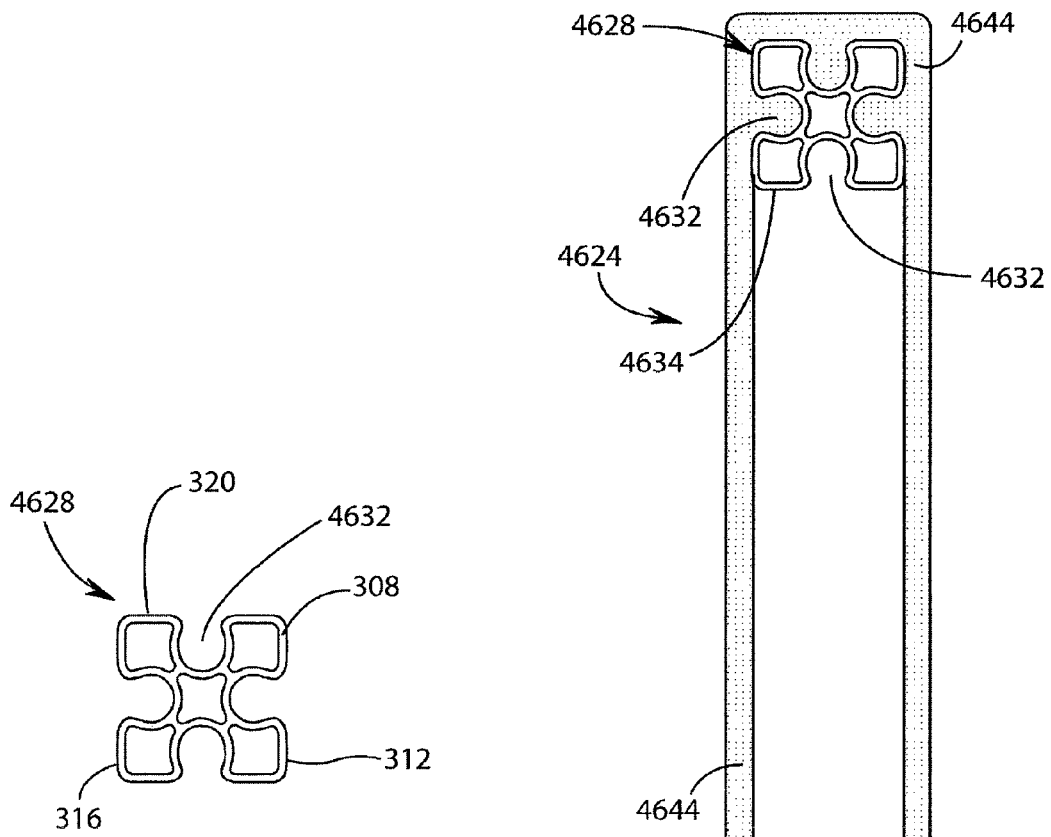
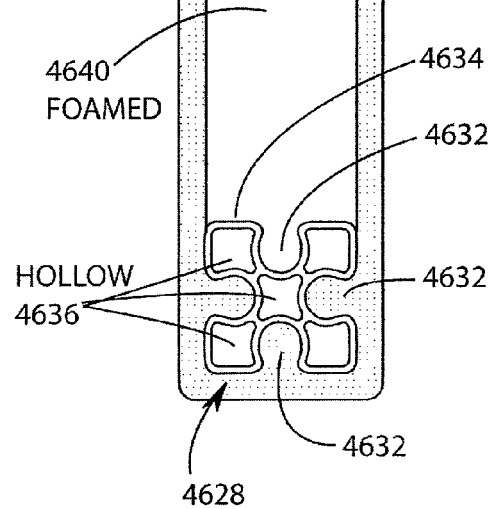
FIG. 46H
FIG. 46G

STRUCTURAL MEMBER

CROSS REFERENCE

The present application cross-references U.S. patent application Ser. No. 11/777,930 filed Jul. 13, 2007, now U.S. Pat. No. 7,721,496 and U.S. patent application Ser. No. 11/675,587 filed Feb. 15, 2007. In addition, the present application cross-references U.S. patent application Ser. No. 11/194,973 filed Aug. 2, 2005, now U.S. Pat. No. 7,213,379. Finally, the present application claims the benefit of Provisional Patent Application No. 60/973,425 filed on Sep. 18, 2007, Provisional Patent Application No. 60/980,427, filed Oct. 16, 2007, Provisional Patent Application No. 61/096,271, filed Sep. 11, 2008, and Provisional Patent Application No. 60/980,423, filed Oct. 16, 2007. The entire disclosures of the above-referenced patent applications and patent are incorporated herein by reference in their entirety, as if fully set forth.

FIELD OF THE INVENTION

The present invention is directed to construction materials, and more particularly, to structural members, such as joists, posts and beams, as well as methods of manufacturing the same.

BACKGROUND OF THE INVENTION

Use of engineered materials, such as wood composites and various plastics, including recyclable thermoplastic, such as high-density polyethylene (HDPE), is becoming increasingly popular in the construction industry. These uses encompass various horizontal and vertical applications that meet a range of present decorative and/or structural construction needs.

Structural members, such as joists, beams and the like, are currently available as wood lumber, a valuable yet limited resource with no recycling capability, as plastic lumber, and as reinforced or composite lumber. Composites often include wood fiber or fiberglass in a plastic matrix, or wood composites such as I-joist products having oriented strand board with micro-laminated top and bottom flanges.

Wood-containing products generally are sensitive to environmental conditions, such as the effect of moisture. Such sensitivity must be accounted for during design, installation and use. There are various recyclable thermoplastic products available which are generally less sensitive to environmental conditions, specifically to the effect of moisture, than wood and composite products. Design benefits follow accordingly.

HDPE resins are used in a variety of blow molding, rotational molding, and extruded applications for liquid food containers, automotive fuel tanks, and large volume drums. HDPE is widely known as the material of choice for recyclable milk containers. It is also widely used for pipelines for water or other solution distribution systems, and for liners for landfills, water, or other solution holding ponds.

U.S. Plastic Lumber Corporation provides a fiberglass reinforced HDPE product that is available in sizes and shapes of standard lumber. These plastic lumber products are typically heavy and contain fiberglass fibers that can quickly dull saw blades and drill bits of construction equipment used to size the materials. Other known HDPE I-joists contain hollow cores with wide flanges that are not conducive to easy cutting-to-dimension with standard construction tools, nor fit with standard fasteners.

Accordingly, there is a need for structural members, including joists, beams, posts and the like, that are preferably made of a weather-resistant recyclable material and that provide adequate structural performance while not being too heavy or large for practical use. In addition, there is a need for providing reinforced structural members that provide adequate structural performance and that can be worked with standard construction equipment without unduly dulling cutting blades and drill bits. There is a further need for such members to be available in either standard and custom sizes and ratings, on demand or as needed, and with the possibility of working the engineering tradeoff between strength and weight in use of engineered materials, such as HDPE.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of certain embodiments.

One aspect of the present invention relates to load-bearing systems, and methods of manufacture, that provide structurally functional, load-bearing assemblies. Embodiments of the invention include, but are not limited to, thermoplastic structural materials such as HDPE or polypropylene (PP) in a form that is reinforced with a rigidifying portion, such as an aluminum, aluminum alloy, carbon fiber core, glass-reinforced polyurethane, or other material.

More specifically, novel structural members may include various joists, beams, posts and the like, having sufficient strength and deflection characteristics for use in structural applications, such as framing, for decking and the like. Such structural members are comparatively lighter in weight as compared to currently available fiber-reinforced plastic lumber products and are more weather-resistant compared to wood and wood-composite products.

An illustrative I-joist product in one aspect of the present invention defines a vertical center member preferably including HDPE or PP, and top and bottom flanges interconnected to the vertical center member, also including HDPE or PP. The HDPE or PP provides a relatively hard, durable, substantially weather-resistant structure. The flanges form a system having structural vigor and enable the HDPE/PP-based system to provide sufficient strength, construction flexibility, and true alignment (i.e., true to specification).

In accordance with other embodiments of the present invention, such I-joists are provided that adequately support loads for indoor and/or outdoor decking, flooring, and other support systems. Webbing may be formed with or as a rigid member and may be combined with top and bottom flanges of a relatively hard, durable, flexible, and substantially weather-proof material. Preferred materials include either virgin and/or recycled HDPE or polypropylene (PP), surrounding a suitable rigidizing core component, such as of an aluminum alloy, carbon fiber, or glass-reinforced polyurethane. Use of recyclable material, such as HDPE, enables cut waste to be recycled. This recycling meets and adheres to current "Green Build" objectives, and is environmentally proactive. Therefore, the present invention not only achieves the design criteria required for support, but also provides a framework suitable for re-use of components in the future.

In various embodiments, webbing and top and bottom flanges of I-joists are manufactured with various dimensions and characteristics and with various materials to achieve maximum transfer of loading with minimal to no vertical or horizontal movement of the finished joist, as specified, while standard construction tools can be used to cut the product to desired dimensions.

Preferably, the load-bearing members, for example, the top and bottom flanges of an I-joist, contain a strengthening reinforcing member or core material or other channel or flange reinforcing members so as to stabilize the member and to assist in load-bearing. Thus, depending on load requirements, either or both the top and/or bottom flanges of an I-joist of the invention may contain one or more of various reinforcing members, which may include aluminum or other alloys, or other materials such as carbon fiber, or glass-reinforced polyurethane (foamed or unfoamed), and may include rods, C- and/or M-shaped channels, channels with center slot, or other configurations, for supplying a desired structural reinforcement.

Load-bearing HDPE embodiments of the present invention weather exceptionally well and do not absorb moisture. Therefore the present invention may be freely utilized for both indoor and outdoor support structures.

In various embodiments, vertical and/or horizontal support members of the invention may replace wood and/or composite material members, and may have hollow or solid cores depending upon the application and need, while also being configurable in custom and/or standard sizes. For example, boards, studs, posts and beams can be provided as standard 2×4, 4×4, 6×6 (values in inches) sized lumber, and joists, rim joists, and beams can be provided as standard 2×8, 2×10, 2×12 sized lumber, while engineered I-joists can be provided as standard sized 9½ or 11⅞ members with 2 1/16 flanges. It is advantageous that such standard sizes will enable use of conventional fasteners and other hanging hardware.

In several embodiments of the invention, structural members are configured to meet given design specifications, which may be custom or customary specifications. Structural configuration and use may be anticipated accordingly during the manufacture process, or can be adjusted before installation by selection or by adding strengthening components.

Joists according to the invention therefore may be supplied having specifications that enable center-to-center spacing selected according to project needs and design specifications while still providing substantially straight and true structural framing. These structural members can be delivered to specification without the need for trimming and truing as per wood lumber, and with minimal cutting but for length adjustments, if needed. This flexibility and reliability is uncommon to lumber products.

Another aspect of the present invention may also include an extrusion process for extruding load members, and further provides a dual extrusion process wherein a reinforcing member, such as an aluminum alloy or glass-reinforced polyurethane is extruded with a specified shape, cooled, prepared for receipt of the HPDE, and the HDPE is then extruded around the reinforcing member, with an option of also within the reinforcing member, and then cooled, all within a continuous process, to form a structural assembly or member of the invention. For a glass-reinforced polyurethane core, liquid or molten glass is added to the tooling downstream of the extruded polyurethane to blend the two materials together. This blended material comprises the reinforcing member or core structure of various structural members as described herein, and, for example, can serve as metal alloy core replacement. The glass-reinforced polyurethane is then fed through a cross-head die to the surrounding thermoplastic, comprising, for example, HDPE or PPE, with or without fillers of calcium carbonate or talc. During the manufacturing process, the glass-reinforced polyurethane may be foamed, such as by air entrainment, to provide a lighter weight reinforcing member.

In certain embodiments of the invention, the extruded aluminum, other alloy component, glass-reinforced polyurethane, or carbon fiber reinforcing member may comprise an outer surface that includes a configuration for enhanced bonding between itself and the HDPE. This may include scarification of the surface, apertures in the surface, application of bonding tape, provision of ribs or other non-flat surface features, or the like, to provide a bonding and adhesion surface for the HDPE. Improved bonding between the aluminum and HDPE can improve the load bearing rating of the final product. Although still available, scarification may not be necessary for certain core materials, such as glass-reinforced polyurethane.

For at least one embodiment of the present invention having a reinforcing member with a plurality of arms, the reinforcing member is shaped such that with embedding of the reinforcing member, the reinforcing member can produce a mechanical bond with the HDPE or other surrounding material. The reinforcing member may comprise apertures or ribbing to aid in developing a sufficient mechanical bond between the HDPE and the reinforcing member, thereby removing the need for adhesive bonding or scarification of the reinforcing member, although adhesive bonding of the reinforcing member to the HDPE, and/or scarification of the surface of the reinforcing member are also optional.

The extrusion process can be enabled to provide various lengths of product as desired, thereby maximizing shipping efficiency. Typically, 60 foot lengths would optimally fill a rail car load, while 40 foot lengths would be desired for a trailer truck load.

Thus, in accordance with various embodiments of the present invention, a structural joist adapted for use in a building structure is provided, the joist comprising a substantially solid vertical center member comprising a thermoplastic material and having a longitudinal axis, and a top flange and a bottom flange interconnected to said vertical center member and extending substantially the entire length of the longitudinal axis, the top flange and the bottom flange comprising a thermoplastic material. In addition, the joist comprises an outer top flange interconnected to the top flange and extending substantially an entire length of the longitudinal axis, and an outer bottom flange interconnected to the bottom flange and extending substantially the entire length of the longitudinal axis. In addition, the joist comprises a metallic non-planar channel member operatively associated with at least one of the top flange, the bottom flange, the outer top flange, or the outer bottom flange, the channel member extending substantially the entire length of the longitudinal axis.

Further embodiments of the present invention also include a joist with outer flanges, with an optional channel member. Thus, in accordance with embodiments of the present invention, an I-joist adapted for use in a building structure is provide, the I-joist comprising an intermediate member having a longitudinal axis and a top flange and a bottom flange, an outer top flange interconnected to the top flange and extending substantially an entire length of the longitudinal axis, and an outer bottom flange interconnected to the bottom flange and extending substantially the entire length of the longitudinal axis.

At least one method of manufacturing a joist having outer flanges is provided herein, the method of manufacturing a joist comprising providing a vertical center member having a top flange and a bottom flange, providing an outer top flange have a receptacle for receiving the top flange, providing an outer bottom flange have a receptacle for receiving the bottom flange, positioning the top flange in the receptacle of outer top flange, and positioning the bottom flange in the receptacle of outer bottom flange. A reinforcing channel member may also be added as part of the method of manufacturing.

Various embodiments of the present invention may also include joists without outer flanges. Thus, in accordance with embodiments of the present invention, a structural joist is provided comprising a vertical center member, a top flange and a bottom flange connected to the vertical center member, and a reinforcing member substantially embedded within at least one of the top flange and the bottom flange, the reinforcing member extending along substantially an entire length of a longitudinal axis of the at least one of the top flange and the bottom flange, wherein a strength of the structural joist is increased.

Other embodiments of the present invention may include a reinforcing member used in various structures, such as post and joists, wherein the reinforcing member includes a plurality of arms. Thus in accordance with embodiments of the present invention, a structural member is provided, the member comprising a thermoplastic outer member having a longitudinal length; and at least one reinforcing member located within the thermoplastic outer member and extending substantially along the longitudinal length of the thermoplastic outer member, the reinforcing member comprising a plurality of arms.

In accordance with another embodiment of the invention, an I-joist is provided comprising a webbing having a longitudinal length and a top flange connected proximate a first end of the webbing and a bottom flange connected proximate a second end of the webbing, wherein the top and bottom flanges extend along the longitudinal length and at least one reinforcing member is located within at least one of the top flange and the bottom flange. The reinforcing member extends substantially along the longitudinal length, and the reinforcing member comprises a plurality of arms having at least one of a rib and a ridge between at least two of the plurality of arms. In accordance with at least one embodiment of the present invention, the at least one rib and ridge comprise a surface having at least one of a divot, a protrusion, an indentation, a scarification, and a texturing. In addition, in at least one embodiment of the invention, the at least one rib and ridge comprise a surface having a scarification, wherein the scarification comprises at least one scrape mark applied by a scraping tool.

Another embodiment of the present invention may also include an I-joist, wherein the I-joist comprises a webbing having a longitudinal length, with a top flange connected proximate a first end of the webbing and a bottom flange connected proximate a second end of the webbing, and wherein the top and bottom flanges extend along the longitudinal length. In addition, the I-joist includes at least one reinforcing member located within at least one of the top flange and the bottom flange, the reinforcing member extending substantially along the longitudinal length, and the reinforcing member comprising a plurality of arms.

Embodiments of the present invention include reinforcing members with features for mechanically bonding the outer thermoplastic material to the inner reinforcing member. Thus, in one embodiment of the invention, an I-joist is provided, the I-joist comprising: a webbing having a longitudinal length, wherein at least a portion of the webbing comprises a thermoplastic material; a top flange connected to the webbing at a first end of the webbing and a bottom flange connected to the webbing at a second end of the webbing, the top and bottom flanges extending along the longitudinal length, wherein at least a portion of the top and bottom flanges comprises the thermoplastic material; and at least one reinforcing member located within at least one of the top flange and the bottom flange, the reinforcing member extending substantially along the longitudinal length, the reinforcing member comprising a first area and a second area, wherein the first area is axially positioned further from the webbing than the second area, wherein a saddle area of the reinforcing member is located between the first area and the second area, wherein the thermoplastic material surrounds the reinforcing member and resides within the saddle area. In accordance with at least one embodiment of the present invention, the thermoplastic material within the saddle area is under a compressive load from the first and second areas after loading the I-joist. In accordance with at least one embodiment of the present invention, each of the first and second areas comprise at least two arms. In accordance with at least one embodiment of the present invention, at least one of the two arms comprises at least a first indentation. In accordance with at least one embodiment of the present invention, each of the two arms comprise a first exterior surface transverse to a second exterior surface. In accordance with at least one embodiment of the present invention, each of the first and second exterior surfaces comprise at least a first indentation. In accordance with at least one embodiment of the present invention, each of the first indentions comprises a debossed area. In accordance with at least one embodiment of the present invention, each the first indentions is longitudinally spaced apart from second indentations, wherein a non-indented portion of the exterior surface extends between the longitudinally spaced apart first and second indentations. In accordance with at least one embodiment of the present invention, at least one of the first and second areas comprises at least one hollow area. In accordance with at least one embodiment of the present invention, the webbing and the top and bottom flanges are manufactured as an integral unit. In accordance with at least one embodiment of the present invention, the webbing and at least one of the top flange and the bottom flange are interconnected by welding at least one of the top flange and the bottom flange to the webbing. In accordance with at least one embodiment of the present invention, at least a portion of the thermoplastic material is thermo-foamed. In accordance with at least one embodiment of the present invention, no adhesive is used to bond the thermoplastic material to the reinforcing member.

Another embodiment of the present invention is directed to a structural member that uses glass-reinforced polyurethane. Thus, a structural member is provided, comprising: a reinforcing member comprising a glass-reinforced polyurethane; and a thermoplastic material extending laterally around and contacting an exterior surface of the reinforcing member. In accordance with embodiments of the present invention, the glass-reinforced polyurethane may be foamed or unfoamed. In accordance with embodiments of the present invention, the reinforcing member may be hollow or not hollow. In accordance with embodiments of the present invention, the reinforcing member comprises a plurality of arms. In accordance with embodiments of the present invention, the plurality of arms includes a first arm aligned substantially opposite a third arm, and a second arm aligned substantially opposite a fourth arm, and wherein a first angle between the first arm and second arm is less than a second angle between the first arm and the fourth arm. In another embodiment, the first angle between the first arm and second arm is greater than a second angle between the first arm and the fourth arm. In accordance with embodiments of the present invention, at least two arms of the plurality of arms are separated by a saddle area, wherein an exterior surface of the reinforcing member includes at least one bend, the bend transitioning between a straight portion of the exterior surface and a saddle portion of the exterior surface, wherein the straight portion is substantially parallel to a planar exterior surface of the structural member, and wherein said bend is greater than about 90 degrees and less than about 180 degrees. In accordance with embodiments of the present invention, the reinforcing member comprises a plurality of lobes and saddle areas. In accordance with embodiments of the present invention, the reinforcing member comprises a plurality of interconnected cells, the cells including at least one of a lobe and a saddle area. In accordance with embodiments of the present invention, the structural member is selected from the group consisting of a beam, a post, a pylon, a column, an I-joist, a rim joist, a stringer, a ledger, and at least a portion of a truss.

Another embodiment of the present invention is directed to a structural member, comprising a reinforcing member comprising a plurality of arms, wherein at least two of the arms are separated by a saddle area, wherein an exterior surface of the reinforcing member includes at least one bend, the bend transitioning between a straight portion of the exterior surface and a saddle portion of the exterior surface, wherein the straight portion is substantially parallel to a planar exterior surface of the structural member, and wherein said bend is greater than about 90 degrees and less than about 180 degrees; and a thermoplastic material extending laterally around and contacting an exterior surface of the reinforcing member.

Embodiments of the present invention also include structural members having reinforcing members that are subdivided. Thus, in one aspect of the invention, a structural member is provided, the structural member comprising: a reinforcing member comprising a plurality of interconnected cells, the cells including at least one of a lobe and a saddle area; and a thermoplastic material surrounding at least a portion of the reinforcing member. In accordance with embodiments of the present invention, the structural member may be a beam, a post, a pylon, a column, an I-joist, a rim joist, a stringer, a ledger, and at least a portion of a truss.

Embodiments of the present invention also include structural members having a plurality of reinforcing members that are subdivided. Thus, in one aspect of the invention, a structural member is provided, the structural member comprising: a plurality of reinforcing members wherein the reinforcing members comprise a plurality of interconnected cells, the cells including at least one of a lobe and a saddle area; and a thermoplastic material surrounding at least a portion of the reinforcing members. In accordance with embodiments of the present invention, the structural member may be a beam, a post, a pylon, a column, an I-joist, a rim joist, a stringer, a ledger, and at least a portion of a truss.

Among other embodiments of the present invention described herein, an additional method of manufacture is provided for manufacturing a structural support member having a rated deflection loading. The method comprises preparing a structural reinforcing member of at least length L for bonded integration into a structural support member of at least length L, and forming a structural support member preform by feeding the structural reinforcing member into a thermoplastic extruder and extruding the structural reinforcing member with a thermoplastic, wherein the thermoplastic is bonded to the surface of the structural reinforcing member along the length of at least L. In addition, the method comprises controlled cooling of the extrusion-formed structural support member preform wherein the thermoplastic is bonded to the structural reinforcing member along the length of at least L and wherein the bonded thermoplastic and structural reinforcing member share the loading of the structural support member without separating along the at least length L when the structural support member is loaded to the rated deflection loading.

Other aspects of various embodiments not summarized here are also considered to form part of the present invention, either alone or in combination with other aspects. Accordingly, aspects may be claimed alone or in combination with other aspects.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Various embodiments of the present invention are set forth in the attached figures and in the detailed description of the invention as provided herein and as embodied by the claims. It should be understood, however, that this Summary may not contain all of the aspects and embodiments of the present invention, is not meant to be limiting or restrictive in any manner, and that Invention as disclosed herein is and will be understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

Various advantages and benefits of the present invention will be better understood when considered in conjunction with the following detailed description, making reference to the drawings that are not necessarily to scale unless noted, wherein:

FIGS. 9-11A are perspective views of I-joists in accordance with embodiments of the present invention;

FIG. 11B is an end, side elevation view of a flange of an I-joist having an alternate embodiment of a reinforcing member;

FIGS. 15A-15G are perspective views of posts (or reinforced portions of structural members) having core reinforcing members in accordance with embodiments of the present invention;

FIGS. 21L-21P are side elevation views of I-joists having reinforcing members in accordance with embodiments of the present invention;

FIG. 30A is a side perspective view of an I-joist in accordance with embodiments of the present invention, wherein the thermoplastic material has been omitted from an end of the I-joist to show the reinforcing members;

FIG. 30B is a top elevation view of the I-joist of FIG. 30A;

FIG. 31A is a side perspective view of an I-joist in accordance with embodiments of the present invention, wherein the thermoplastic material has been omitted from an end of the I-joist to show the reinforcing members;

FIG. 32A is a side perspective view of an I-joist in accordance with embodiments of the present invention, wherein the thermoplastic material has been omitted from an end of the I-joist to show the reinforcing members;

FIG. 33 is a side perspective view of an I-joist in accordance with embodiments of the present invention;

FIG. 40A is a side elevation view of an I-joist in accordance with embodiments of the present invention;

FIGS. 40B and 40C are detail views of the reinforcing member shown in FIG. 40A;

FIGS. 40D and 40E are detail views of portions of the I-joist shown in FIG. 40A;

FIG. 46A is a side elevation view of a structural member in accordance with embodiments of the present invention;

FIGS. 46B and 46C are detail views of the reinforcing member shown in FIG. 46A;

FIG. 46D is a detail view of a portion of the structural member shown in FIG. 46A;

FIG. 46G is a side elevation view of a structural member in accordance with embodiments of the present invention;

FIG. 46H is a detail view of the reinforcing member shown in FIG. 46G;

The drawings are not necessarily to drawn to scale.

DETAILED DESCRIPTION

Figure 1:
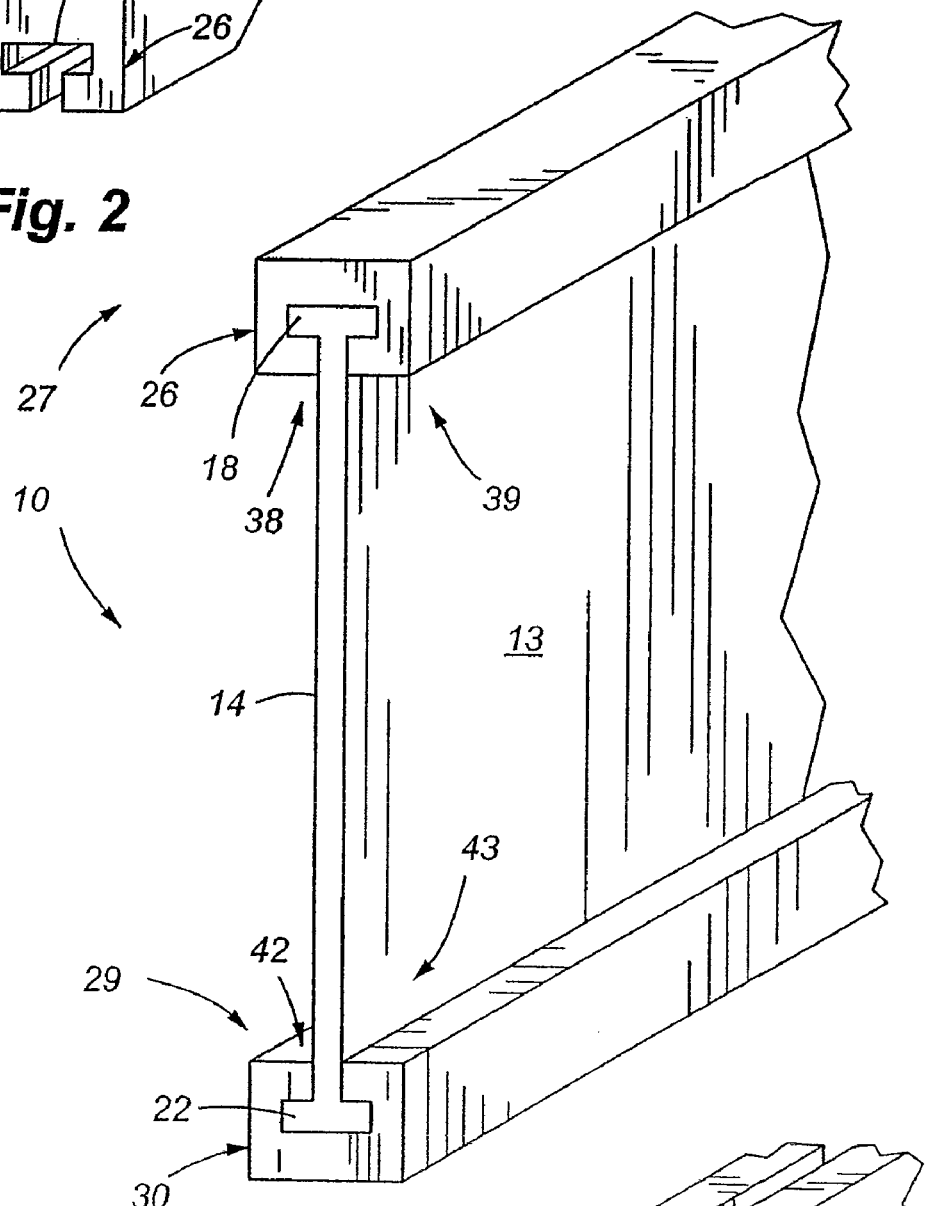
FIG. 1 is a perspective view of an illustrative I-joist in accordance with embodiments of the present invention.

Referring now to FIG. 1, in accordance with embodiments of the present invention, an illustrative I-joist structural member 10 is shown. I-joist 10 includes a web member 13. Web member 13 has a central web or webbing 14, an upper flange 18, and a lower flange 22, wherein flanges 18, 22 are interconnected by webbing 14.

As part of a typical I-joist, webbing 14 interacts as a load-bearing member with load-bearing upper and lower flanges 18, 22. In one embodiment, web member 13 includes webbing 14, upper flange 18 and lower flange 22 formed of a relatively hard, durable, flexible, and substantially weather-proof material, including but not limited to thermoplastics, such as HDPE or polypropylene (PP), and/or thermoplastic composite materials, such as HDPE or PP with additives such as, for example, natural or man-made fibers or particles of various materials/compositions, including but not limited to wood particles and/or fiberglass strands. Preferably web member 13 is extruded.

I-joist 10 also includes an upper outer flange 26 that is interconnected to upper flange 18 to form upper flange assembly 27 and a lower outer flange 30 that is interconnected to lower flange 22 to from lower flange assembly 29. Provision of these flange assemblies 27, 29 increases the rigidity and load-bearing capability of joist 10.

Typically, upper flange 18 and lower flange 22 are similar in cross-section but they may be dissimilar according to design specifications as needed. Likewise, typically outer upper flange 26 and outer lower flange 30 are similar in cross-section but they may be dissimilar according to design specifications as needed.

Alternatively webbing 14, upper flange 18, and lower flange 22 are not integrally formed and may be separately manufactured and then interconnected. For separately extruded parts, interconnection may be by extrusion welding or the like, thus to form web member 14.

As will be appreciated by those skilled in the art, and in accordance with embodiments of the present invention directed to manufacturing I-joists and/or other structural members of the present invention, the P-WAVE™ technology of Kubota Research Associates, Inc. may have application for joining such components of the structures described herein, such as joining the webbing to the top and bottom flanges of an I-joist. The P-WAVE™ technology of Kubota Research Associates, Inc. includes the use of infrared welding to join plastic parts together. Alternatively, in at least one embodiment, the thermoplastic portion of the entire I-joist is extruded around the reinforcing member(s), wherein the top and bottom flanges along with the webbing are formed as an integral piece.

Outer flanges 26 and 30 may be formed over upper flange 18 and lower flange 22, respectively, in an integrated manufacturing process or may be separately formed and then mated (e.g., slid) in place and then interconnected, such as by extrusion welding or the like. One advantage of separate components is that a single supply can be used for both outer flanges for an I-joist with symmetrical cross-section, which may provide some cost savings. Alternatively, each component may be separately specified, to provide specialized configurations, as needed, without having to interrupt regular extrusion production runs. Such flexibility enables meeting various architectural and custom design goals while providing some cost savings.

Figure 2:
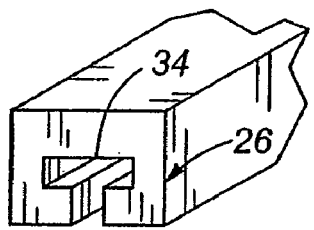
FIG. 2 is a perspective view of an upper outer flange of the I-joist depicted in FIG. 1.
Figure 3:
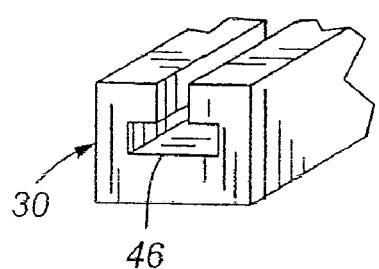
FIG. 3 is a perspective view of a lower outer flange of the I-joist depicted in FIG. 1.

Referring again to FIGS. 1-3, upper flange 18 cooperates with its connection to webbing 14 to form a key 38. More particularly, upper flange 18, as it extends from and in cooperation with webbing 14, forms key 38. Accordingly, upper outer flange 26 includes a receptacle 34 that internally substantially corresponds in shape (i.e., cross section) to the external shape of key 38.

Likewise, lower flange 22 and webbing 14 form a key 42, and lower outer flange 30 includes receptacle 46 that internally substantially corresponds in shape to the external shape of key 42. Receptacle and key pairs 34, 38 and 46, 42, as cooperating locking components, form locking mechanisms 39 and 43, respectively.

Locking mechanism 39 enables flanges 18 and 26 to be intimately mated and structurally sound. Likewise, locking mechanism 43 enables flanges 22 and 30 to be intimately mated and structurally sound.

Outer flanges 26 and 30 preferably feature material characteristics that generally complement the structural characteristics of I-joist 10. In accordance with preferred embodiments of the present invention, outer flanges 26 and 30 include HDPE material.

Webbing 14 is preferably solid, but may be a lattice, slotted or otherwise apertured, depending on the surrounding application environment, needs of the construction project, load-bearing specifications, and overall construction objectives, and may be formed of various suitable load-bearing materials, such as HDPE, aluminum or the like.

Figures 4, 5:
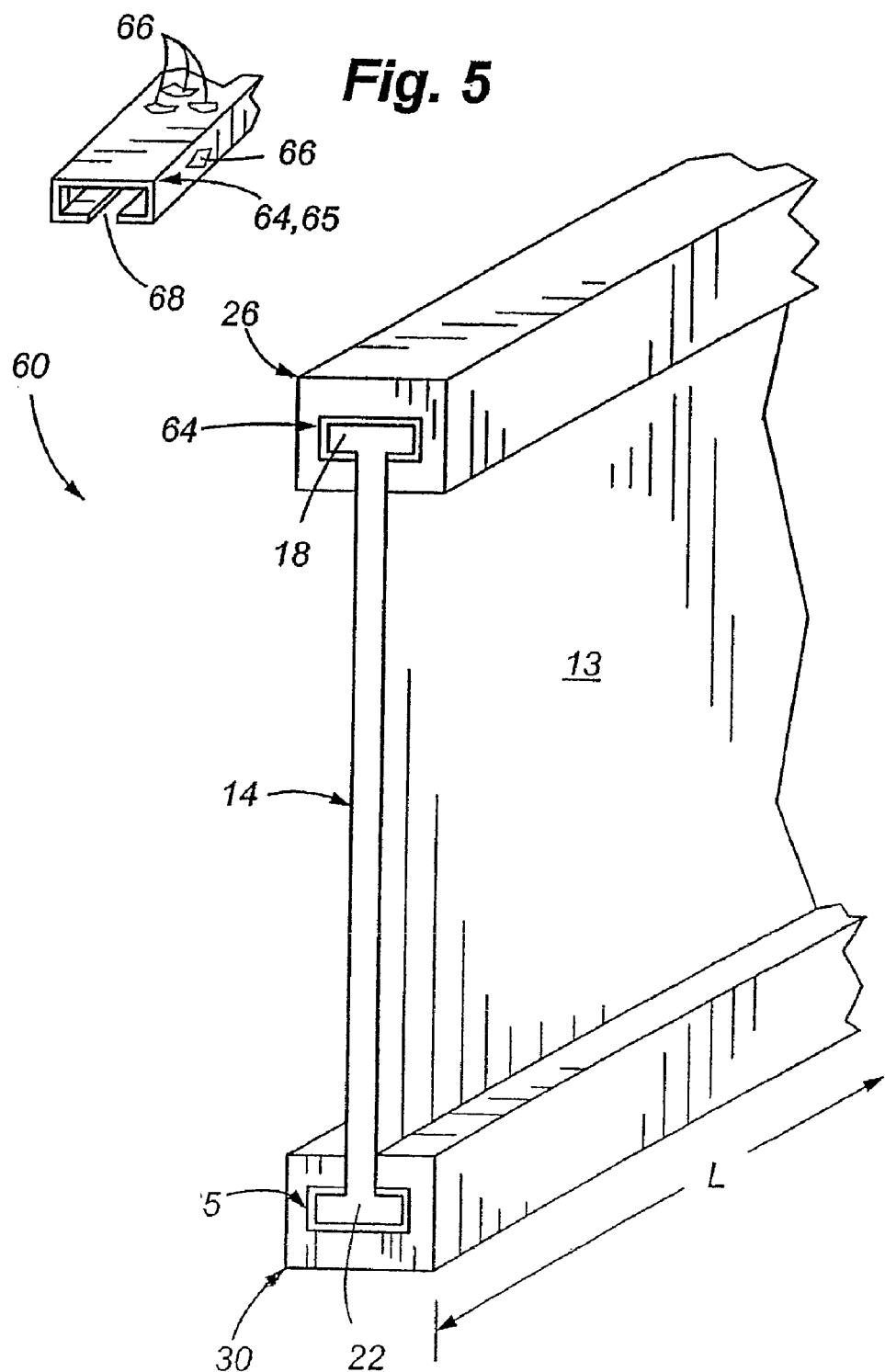
FIG. 4 is a perspective view of an I-joist in accordance with embodiments of the present invention.
FIG. 5 is a perspective view of a channel reinforcing member of the I-joist depicted in FIG. 4.

Referring now to FIGS. 4-5, in accordance with embodiments of the present invention, an I-joist structural member 60 is shown that is similar to I-joist 10 described with respect to FIG. 1, and further includes channel reinforcing members 64, 65.

By way of example and not limitation, channel reinforcing member 64, 65 have a substantially rectangular shape with an opening 68 along one side. The shape of each channel reinforcing member 64, 65 allows it to be engaged or slid over upper flange 18 and lower flange 22, respectively, prior to, or in combination with interconnecting with outer flanges 26 and 30. Preferably, channel reinforcing members 64, 65 include a metal alloy, as for example, an aluminum alloy, with the thickness of the sidewalls of each channel reinforcing member being selected based on intended use and designed loading of I-joist 60. Channel reinforcing members 64, 65 preferably extend substantially the entire longitudinal length L of I-joist 60.

Figure 6:
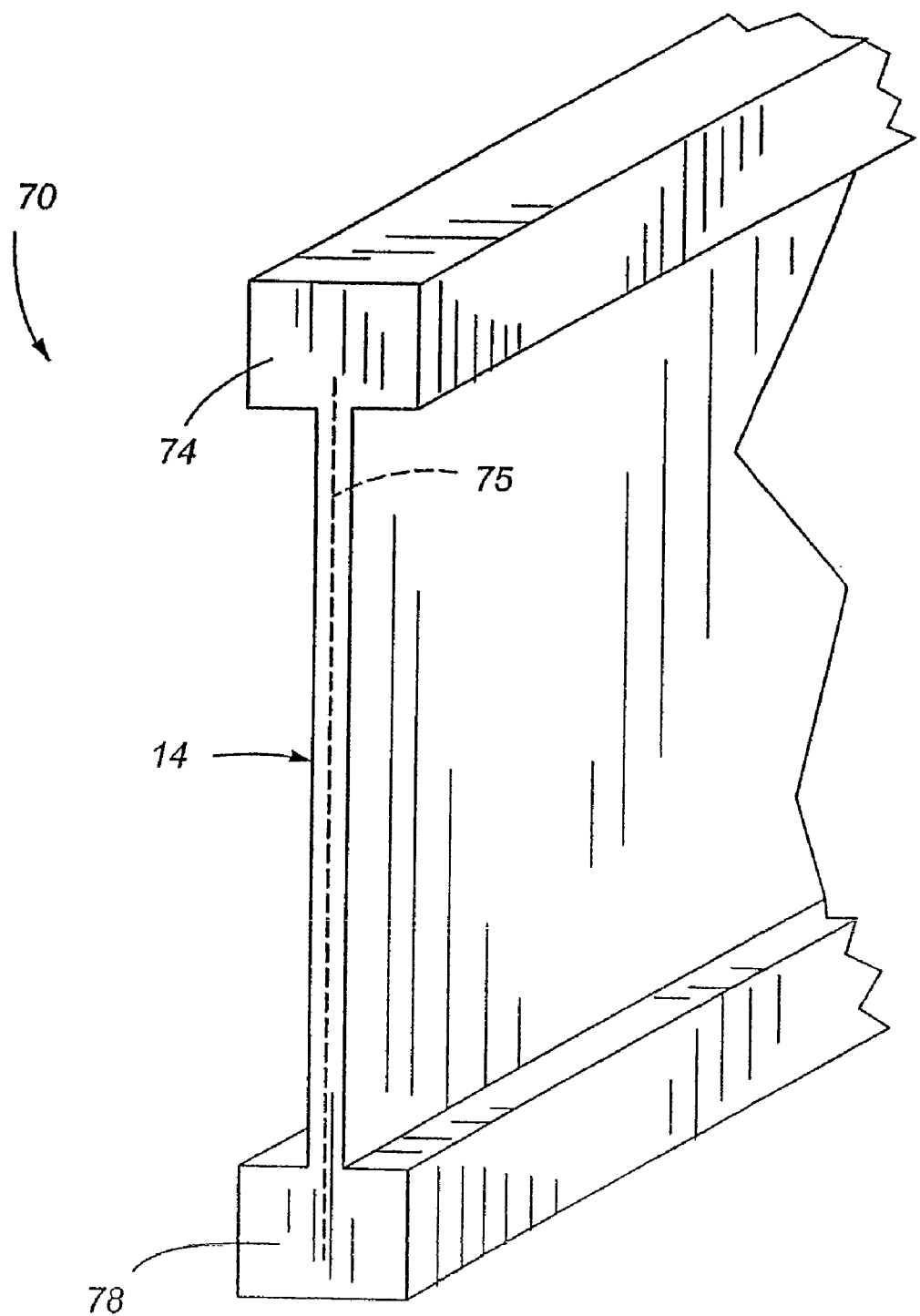
FIG. 6 is a perspective view of an I-joist in accordance with embodiments of the present invention.

Referring now to FIG. 6, an I-joist structural member 70 in accordance with embodiments of the present invention is shown. I-joist 70 includes webbing 14 having an integrated upper flange 74 and lower flange 78, where flanges 74 and 78 have a relatively larger cross-sectional area than flanges 18 and 22 of I-joist 10.

Preferred embodiments of the invention include structural members formed with HDPE and a reinforcing member that acts as a strengthened core for the HDPE. The HDPE is preferably without cellular fiber content, such as wood fiber, and at least to the extent that any such content should not seriously impact resistance to moisture of the resulting structural member. Also preferably, the HDPE is without mineral fiber content, such as fiberglass, to the extent that the ability of the structural member can remain easily cut and/or drilled without tool damage. However, unless otherwise specified, any thermoplastic and/or thermoplastic composite materials are collectively herein referred to as simply "HDPE" or "thermoplastic," and it is to be understood that reference herein to "HDPE" and "thermoplastic" includes other possible thermoplastics other than HDPE, such as, but not limited to, polypropylene (PP), as well as blends, composite/amended thermoplastic materials, and/or coated thermoplastic members, and further includes substantially virgin or recycled HDPE. Furthermore, other materials other than thermoplastics are within the scope of the invention. Thus, a structural member, such as an I-joist, that utilizes a non-thermoplastic (non-HDPE) material to form its flanges and/or webbing, is within the scope of the present invention.

In alternative embodiments of the invention, I-joist 70 is formed with a structure of HDPE, wherein either the webbing 14 and/or any of the flanges, include one or more reinforcing or strengthening members. A strengthening member 75 is indicated by dotted detail in FIG. 6, which may include, as for example, a fiberglass, metal, wood, or composite material.

Figures 7, 8:
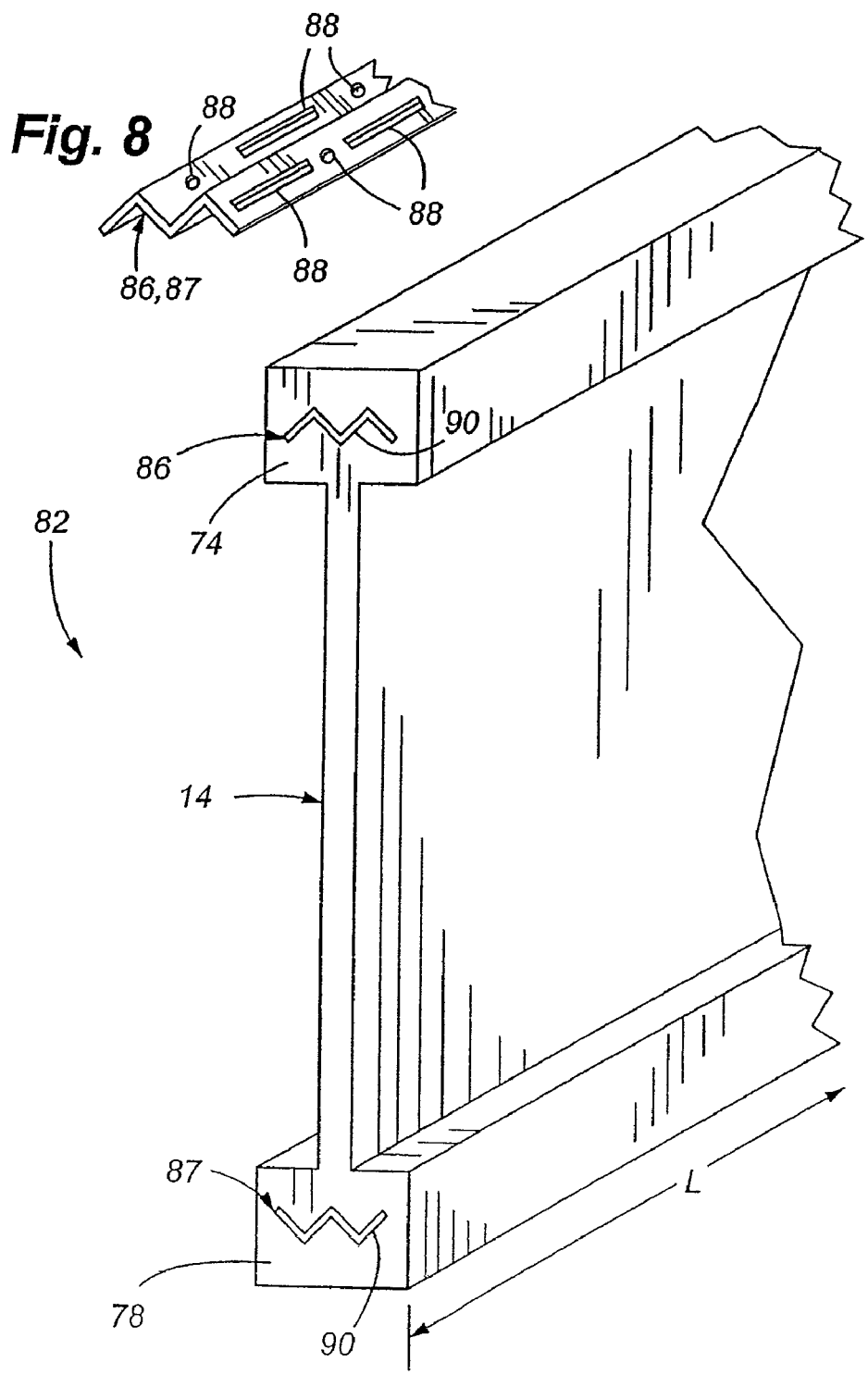
FIG. 7 is a perspective view of an I-joist in accordance with embodiments of the present invention.
FIG. 8 is a perspective view of flange reinforcing members of the I-joist depicted in FIG. 7.

Referring now to FIGS. 7-8, an I-joist structural member 82 in accordance with embodiments of the present invention is shown. I-joist 82 may be understood to add elements to the basic structure of I-joist 70, and further includes flange reinforcing members 86, 87 within flanges 74 and 78, respectively. More particularly, FIG. 8 shows an illustrative configuration which may serve for both reinforcing members 86, 87, wherein flange reinforcing members 86, 87 are positioned in or manufactured in conjunction with formation of flanges 74, 78, respectively.

The presence of flange reinforcing members 86, 87 improves the structural performance of the I-joist, and allows the I-joist to provide adequate load carrying capacity with tolerable deflection, while maintaining a relatively small profile. Preferably, the flange reinforcing members include a metal or metal alloy, as for example, an aluminum alloy, with the dimensions and thickness of the sidewalls of the flange reinforcing members being capable of being customized and selected based on intended use of the I-joist. The reinforcing members may also include or comprise carbon fiber and/or glass-reinforced polyurethane. The use of an aluminum alloy material as compared to steel as a flange reinforcing member can enable a lighter weight I-joist and can enable the I-joist to be cut relatively easily using standard construction equipment. That is, an aluminum alloy provides attractive reinforcing characteristics, while at the same time not unduly dulling cutting blades of saws that are used to dimension to length the I-joist. Carbon fiber provides yet a lighter weight I-joist, but would potentially require the use of diamond-bit blades for successful repeated cutting and dimensioning the I-joist. Glass-reinforced polyurethane provides another option for the reinforcing material.

In accordance with embodiments of the present invention, flange reinforcing members 86, 87 are encased within flanges 74, 78, wherein the material forming the flange completely surrounds the longitudinal sides of the reinforcing member. Flange reinforcing members preferably extend substantially the entire longitudinal length L of the I-joist.

Flange reinforcing members may take on a variety of shapes. Referring again to FIG. 7, flange reinforcing members 86, 87 may, as by way of example and not limitation, include a plurality of angles and substantially planar surfaces, such as forming a corrugated reinforcing member 90, 91.

Corrugated reinforcing member 90, 91 may include sharper or wider angles as compared to the example structure shown in FIGS. 7 and 8, and may further include rounded corners and curved surfaces. Thus, it is to be understood that the shape of corrugated reinforcing member 90, 91 shown in FIGS. 7 and 8 and is provided by way of illustration and not limitation.

Figure 9:
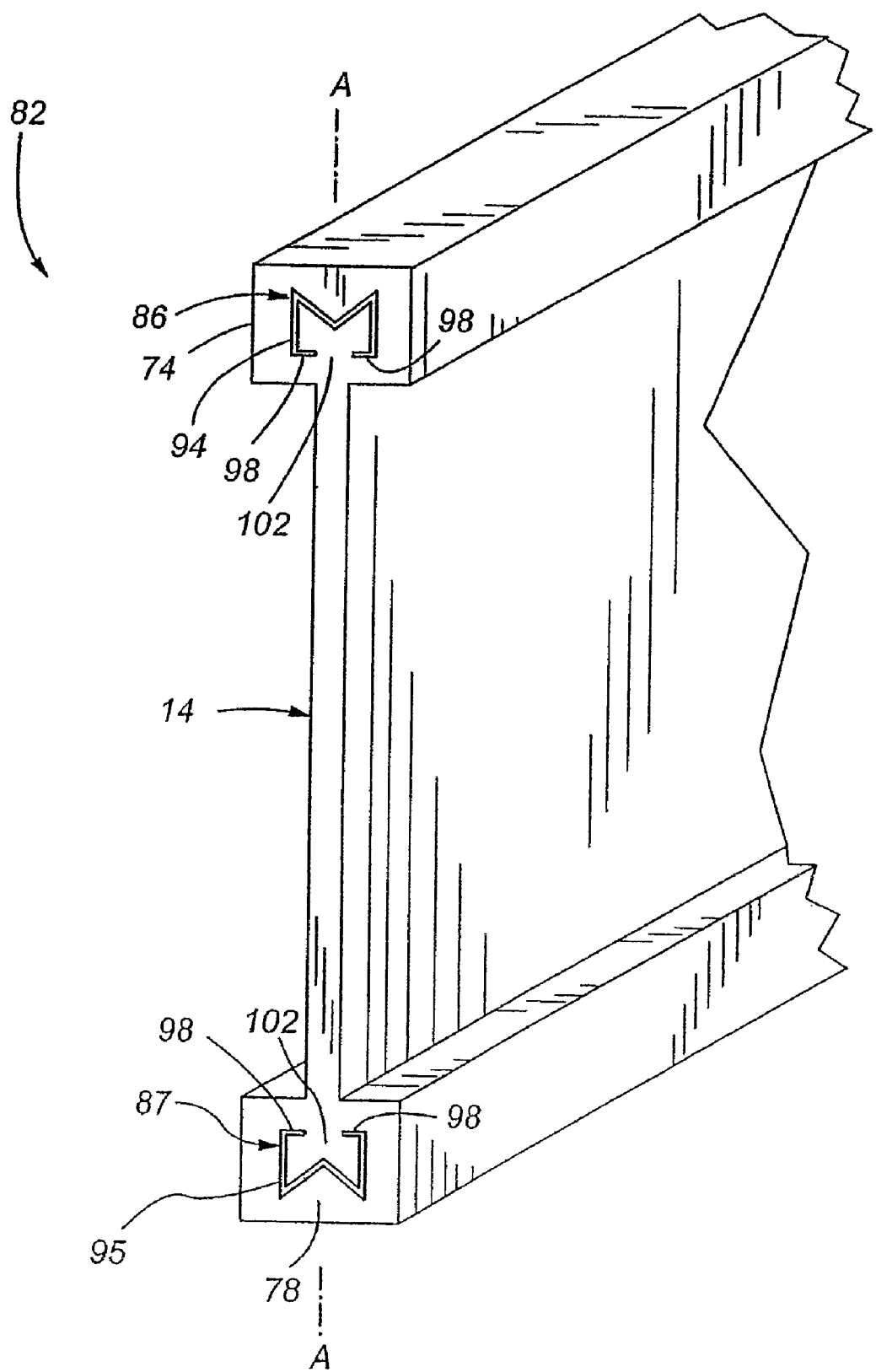

Referring now to FIG. 9, another configuration of flange reinforcing members 86, 87 is shown. The substantially M-shaped reinforcing members 94, 95 of FIG. 9 include a pair of inward projections 98 adjacent opening 102. In accordance with embodiments of the present invention, opening 102 is open toward webbing 14, and is preferably substantially aligned with axis A-A of webbing 14. When placed in lower flange 78, substantially M-shaped reinforcing member 95 is preferably inverted, as shown.

Figure 10:
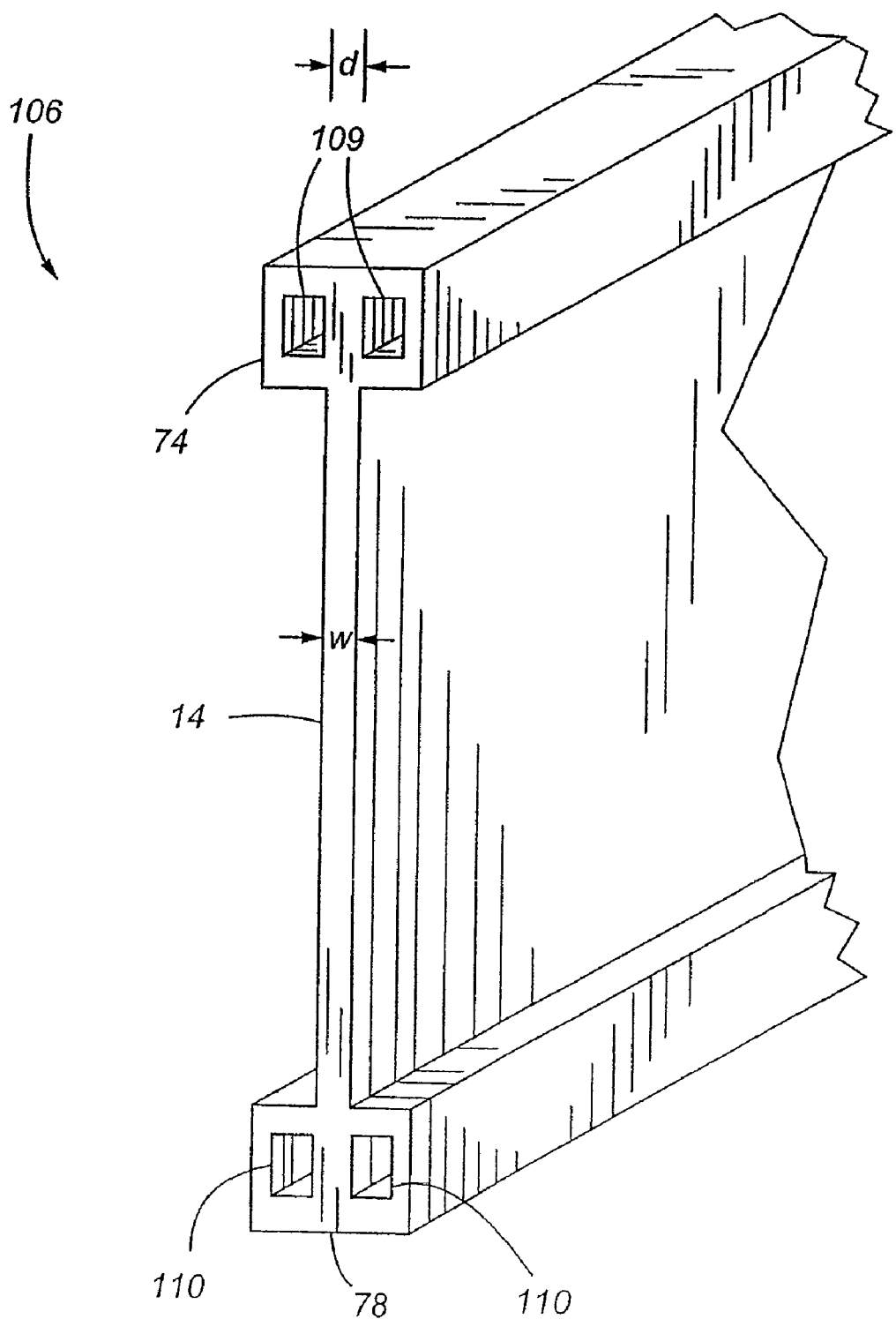

Referring now to FIG. 10, an I-joist structural member 106 in accordance with embodiments of the present invention is shown. I-joist 106 adds to the structure of I-joist 70, and further includes at least one enclosed flange reinforcing member 109, 110 within each of flanges 74 and 78, respectively.

In the illustration of FIG. 10, each of upper flange 74 and lower flange 78 includes a plurality of enclosed flange reinforcing members 109, 110 that are spaced apart from one another. However, a single enclosed flange reinforcing member 109, 110 may be used, depending upon the desired structural performance sought. Preferably, enclosed flange reinforcing member 109, 110 is hollow and includes a metal or metal alloy, as for example, an aluminum alloy, with the dimensions and thickness of the sidewalls of the enclosed flange reinforcing member capable of being customized and selected based on the intended use of the I-joist. Enclosed flange reinforcing member 109, 110 preferably extends substantially the entire longitudinal length L of the I-joist.

As shown in FIG. 10, and in accordance with embodiments of the present invention, enclosed flange reinforcing members 109, 110 include a substantially rectangular member. However, other shapes are within the scope of the present invention, which may be but are not limited to geometric shapes. By way of illustration, such other shapes may include a triangular shape or a flattened-oval shape, for example.

As shown in FIG. 10, in one aspect of the present embodiment, the pair of enclosed flange reinforcing members positioned in upper flange 74, as well as the pair in lower flange 78, are spaced apart a distance "d" that is substantially the same as width "w" of webbing 14. However, separation distance d may be less than or greater than width w of webbing 14.

In accordance with preferred embodiments of the present invention, each of the enclosed flange reinforcing members is situated within upper flange 74 or lower flange 78, wherein the material forming upper flange 74 or lower flange 78 completely surrounds the sides of each enclosed flange reinforcing members. Preferably, I-joist 106 includes an HDPE material that forms the upper and lower flanges, while the HDPE material completely surrounds each longitudinal side of the enclosed flange reinforcing members.

Figures 11A, 11B:
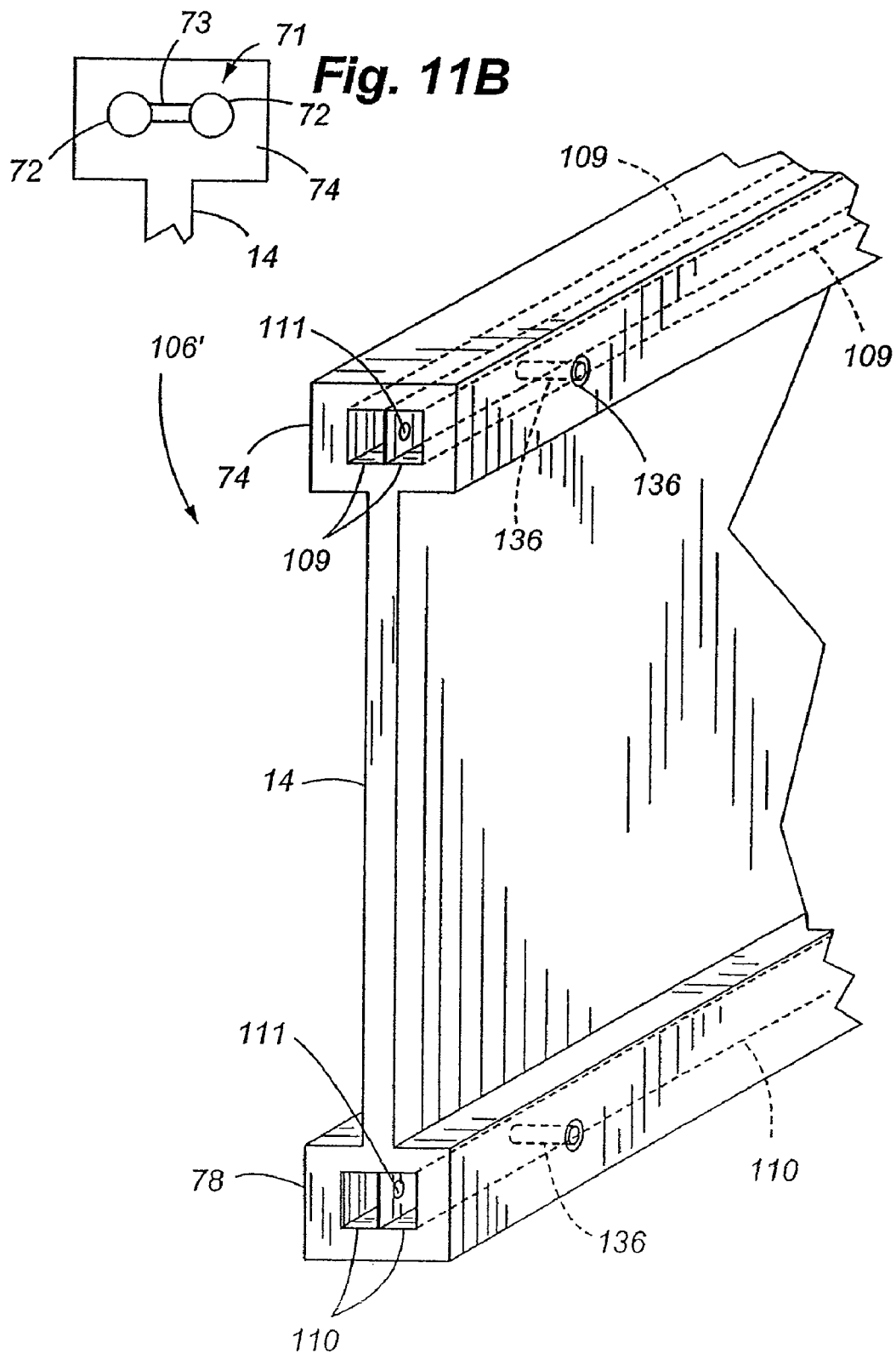

Referring now to FIG. 11A, an I-joist structural member 106' is shown, wherein two adjacent enclosed flange reinforcing members 109, 109 and 110, 110 are used in each of upper flange 74 and lower flange 78, respectively. Flange reinforcing members 109, 109 are used in an upper flange 74 and may have a selected separation distance (if any), and a like configuration may be provided for flange reinforcing members 110, 110 in lower flange 76. Although not required for all structural applications, flange reinforcing members in a particular flange may be interconnected by a tie bar, band, wire, glue, weld, pin, rivet, screw or other connecting means 111.

Referring now to FIG. 11B, in accordance with embodiments of the present invention, reinforcing member 71 is shown within upper flange 74. However, it is to be understood that reinforcing member 71 may be used in lower flange 78 of an I-joist, and may also be used in other structures, such as posts and beams. Reinforcing member 71 includes a plurality of rods 72 having a substantially circular cross section, wherein the rods 72 are rigidly connected by a cross member 73. The reinforcing member 71 is preferably formed of glass-reinforced polyurethane, carbon fiber or a metal alloy, such as an aluminum alloy. Depending upon the loading conditions for the structural member, the reinforcing member may comprise solid or hollow rods 72, with a solid or hollow cross member 73.

In accordance with embodiments of the present invention, I-joists may include an upper flange having a reinforcing member, such as a corrugated reinforcing member 90, and the lower flange may having a different type of reinforcing member, such as an enclosed flange reinforcing member 110. Accordingly, it is within the scope of the present invention that the upper and lower flanges may include different types of reinforcing members. Such configurations may be advantageous for certain design considerations, such as where the upper and lower flanges will experience different amounts and/or modes of loading.

Figure 12:
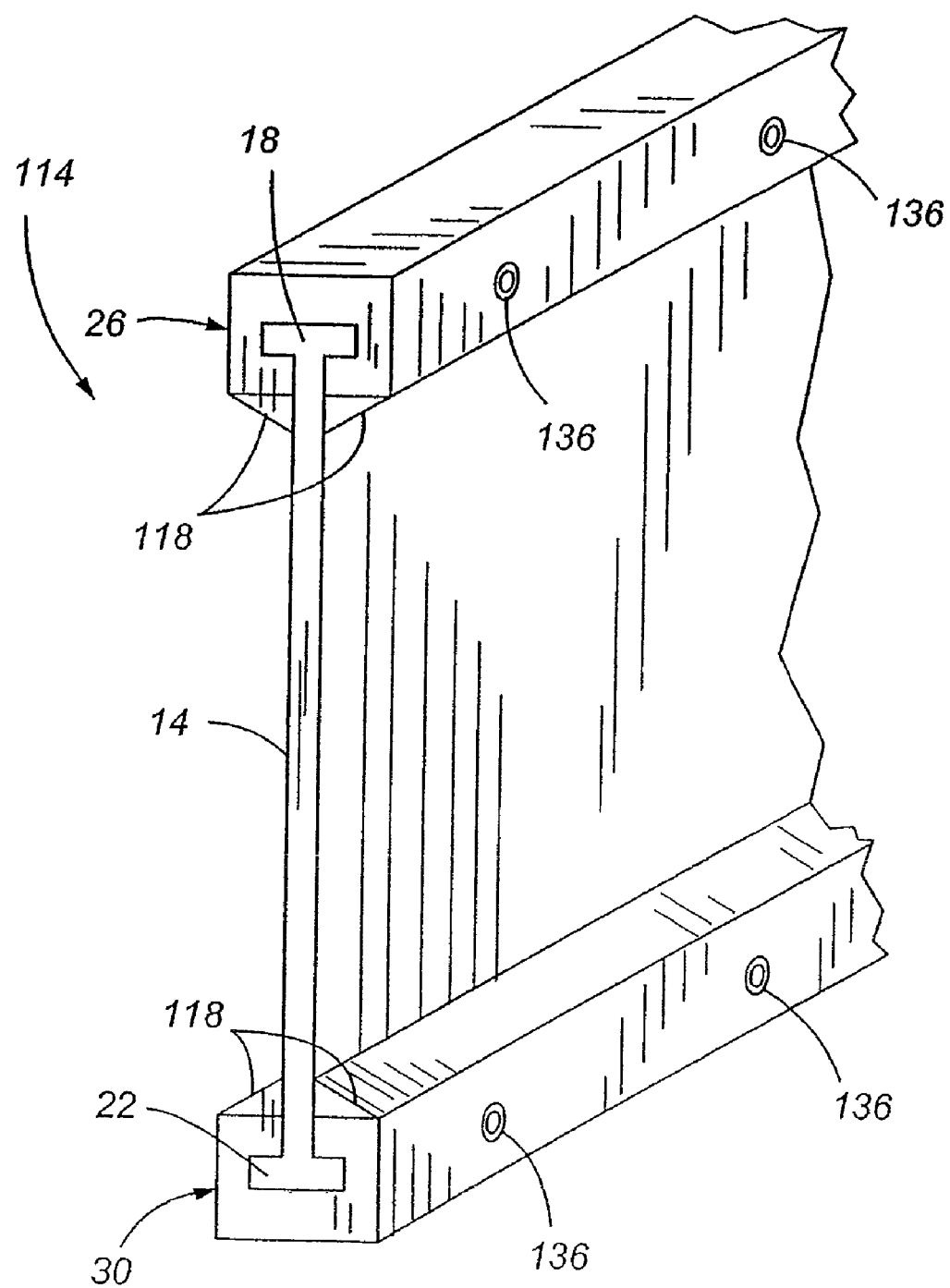
FIG. 12 is a perspective view of an I-joist having gusset reinforcing members in accordance with embodiments of the present invention.

Referring now to FIG. 12, in accordance with embodiments of the present invention, an I-joist structural member 114 is shown that includes reinforcing wedges or gussets 118 as reinforcing members between outer upper flange 26 and webbing 14. In addition, gusset reinforcing members 118 may also be used between webbing 14 and outer lower flange 30. Gusset reinforcing members 118 may be formed as part of the outer flanges.

It will be appreciated by those skilled in the art that conventional wood or composite I-joists that are constructed by gluing the top and bottom flanges to the vertical center member are not weather-resistant, unlike HDPE weather-resistant embodiments of the present invention. An additional benefit of the present invention is that the configuration can be a plain or true I-system or a custom I-system.

Such custom configuration may include strengtheners or deflection-reducing elements, such as having gussets 118 supporting webbing and/or the upper and lower flanges, or having one or more pins 136 mating the HDPE overlay and the reinforcing core, so as to further strengthen the resulting structural members.

Figure 13:
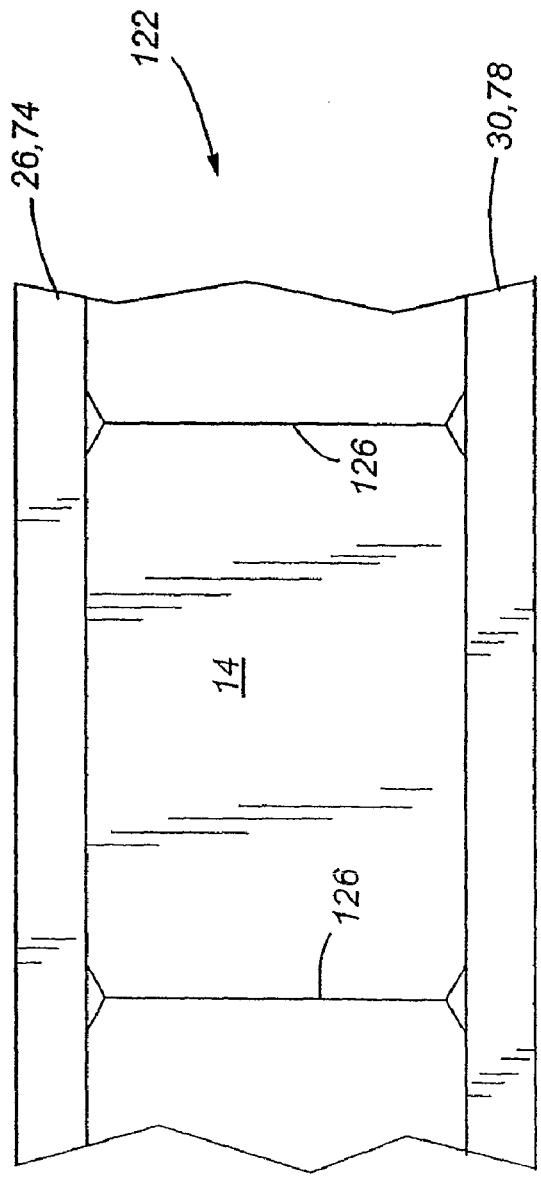
FIG. 13 is a side elevation of an I-joist having side vertical reinforcing members in accordance with embodiments of the present invention.

Referring now to FIG. 13, a partial side elevation view of an I-joist structural member 122 is shown that includes at least one, and more preferably, a plurality of vertical reinforcing members 126 positioned along the exterior of webbing 14. Vertical reinforcing members 126 increase stability, load capability and/or load transfer characteristics of I-joist. Vertical reinforcing members 126 are preferably spaced apart laterally and positioned between the bottom of outer upper flange 24 and the top of outer bottom flange 30.

Alternatively, vertical reinforcing members 126 may be positioned between the bottom of upper flange 18 and the top of lower flange 22, extending through the outer upper flange 26 and outer lower flange 30. Alternatively, for I-joists not having an outer upper flange 26 or an outer lower flange 30, vertical reinforcing members 126 may be placed between upper flange 74 and lower flange 78, as for example, in I-joists 70, 82, 106, and 106' described above.

Figure 14:
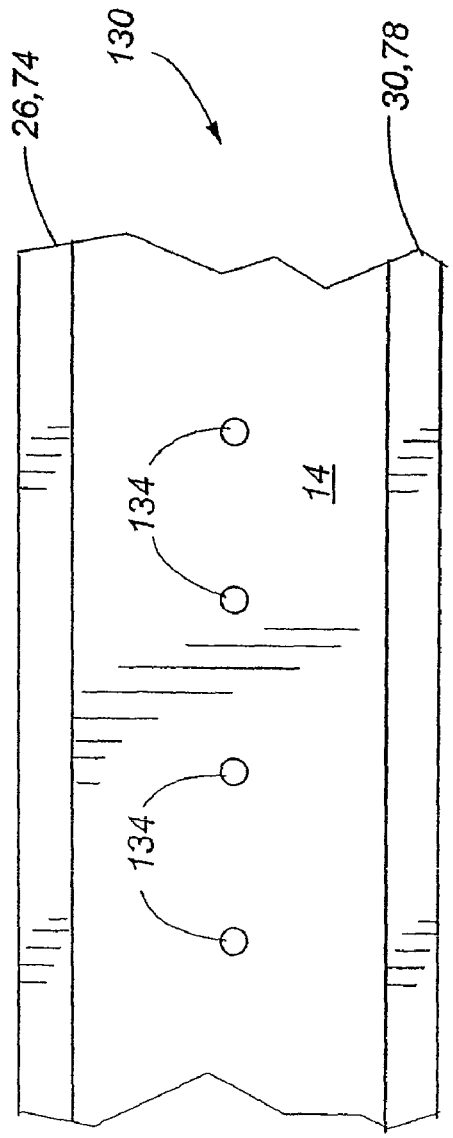
FIG. 14 is a side elevation of an I-joist having webbing with knockouts in accordance with embodiments of the present invention.

Referring now to FIG. 14, in accordance with embodiments of the present invention, an I-joist structural member 130 is shown that includes one or more knock-outs 134 in webbing 14. Such knock-outs 134 are advantageous for passing conduits through the joist framing, such as for electrical power.

Redwood and treated hemlock/fir are often used for outside decking material because of their ability to withstand weathering better than other lumber products. Load to deflection tests have been conducted using I-joists according to the invention versus wood product that would be replaced therewith. Such testing demonstrated better performance of an I-joist of the present invention as against redwood and treated hemlock/fir. Therefore it will be appreciated that the present invention provides easy to configure and weather-resistant structural members with excellent load-bearing characteristics that enables improved load-bearing systems for a wide variety of applications.

Referring now to FIGS. 15A-15G, in accordance with embodiments of the present invention, additional illustrative structural members 200 are shown by way of illustration and not by way of limitation of the invention. These members may serve as reinforcing configurations within the flanges for I-joists, beams, posts, studs, or the like in horizontal or vertical structural support systems, for a variety of purposes. An illustrative application includes structural columns and posts for supporting framing, such as to support dock or deck platforms, or such as otherwise may be used to support I-joists thereunder.

Support members 200 include a core reinforcing member surrounded by a thermoplastic material, such as HDPE. The core reinforcing members are stiff or rigid and preferably hollow, and may be formed of a metal or metal alloy, such as an aluminum alloy, or may also be formed of carbon fiber and/or glass-reinforced polyurethane.

The following configurations are described with respect to cross-sectional views. Referring to FIG. 15A, a rectangular or square post 200 having a plurality of rectangular core reinforcing members 204 is shown, where members 204 are surrounded by outer layer 208 that includes HDPE.

Referring to FIG. 15B, a rectangular or square post 200 is shown with a single core reinforcing member 204 having a rectangular cross section. Referring to FIG. 15C, a rectangular or square post 200 is shown with a single core reinforcing member 204 having a circular cross section.

Referring to FIG. 15D, a circular post 200 is shown with a single core reinforcing member 204 having a circular cross section. Referring to FIG. 15E, a circular post 200 is shown with a single core reinforcing member 204 having a rectangular cross section.

Referring to FIG. 15F, a circular post 200 is shown with a core reinforcing member 204 having a triangular cross section. Referring to FIG. 15G, a circular post 200 is shown with a core reinforcing member 204 having a flattened oval cross section. Thus a variety of post configurations are possible, as are a variety of core reinforcing members, in practice of the invention.

During manufacture of the reinforcing members, or prior or during forming an I-joist, post, or beam, the reinforcing member may be textured to provide improved adhesion between the surface of the reinforcing member and the HDPE. Surface texturing is anticipated to provide better bonding between the thermoplastic material and the reinforcing member, and thus better structural performance.

Referring again to FIGS. 7-8, flange reinforcing members 86, 87 may include one or more apertures 88. Apertures 88 also provide continuity between the thermoplastic material, as for example HDPE, located above and below the flange reinforcing members 86, 87.

It will be further appreciated that surfaces of flange reinforcing members 86, 87, enclosed flange reinforcing members 109, 110, or core reinforcing member 204, and the like, may include a textured, scarified, and/or roughed surface and which may also include projections or indentations as well as apertures 88. An example of this surface treatment is generally shown in FIG. 5 as details 66.

Figure 16:
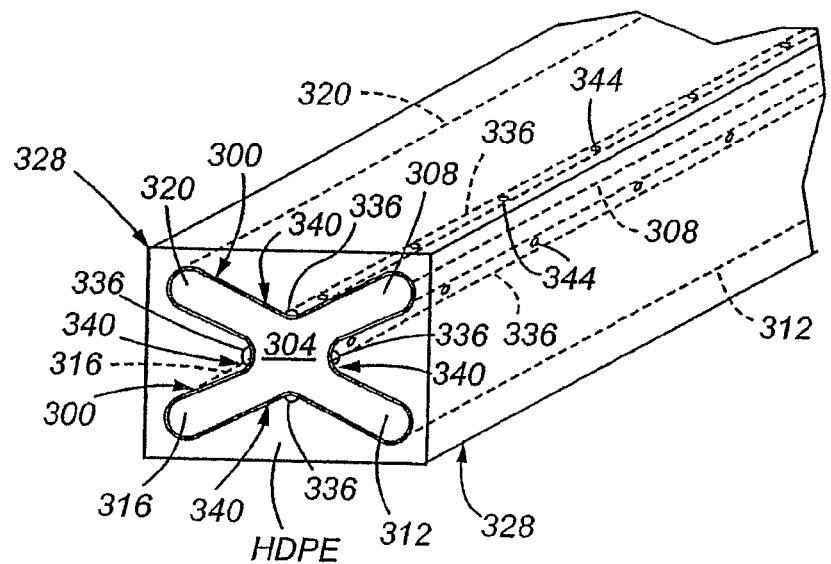
FIGS. 16-20 show illustrative reinforcement embodiments of the present invention, the reinforcing members suitable for use in the flange portion of I-joists, as well as in posts.

Referring now to FIG. 16, a structural reinforcing member 300 is provided that includes a plurality of arms extending from a central core 304. In accordance with illustrative embodiments of the present invention, structural reinforcing member 300 includes four arms, including a first arm 308, a second arm 312, a third arm 316, and a fourth arm 320. The first arm 308 is preferably situated substantially opposite third arm 316, or between about 160 to 200 degrees from third arm 316, and more preferably, about 180 degrees from third arm 316. Similarly, second arm 312 is also preferably situated substantially opposite fourth arm 320, or between about 160 to 200 degrees from fourth arm 320, and more preferably, about 180 degrees from fourth arm 320. In addition, first arm 308 is separated from second arm 312 by between about 45 to 90 degrees, and more preferably, by between about 55 to 75 degrees, and more preferably yet, by between about 68 degrees. Similarly, third arm 316 is separated from fourth arm 320 by between about 45 to 90 degrees, and more preferably, by between about 55 to 75 degrees, and more preferably yet, by between about 68 degrees. A structural reinforcing member may have more than four arms and is considered within the scope of the present invention. As for example and not intending to limit the scope of the invention, a reinforcing member may comprise six arms.

Structural reinforcing member 300 is encased within HDPE structural member 328 and preferably includes a metal, such as steel, aluminum or an aluminum alloy, or alternatively, the reinforcing member may comprise carbon fiber and/or glass-reinforced polyurethane. In accordance with several embodiments of the present invention, central core 304 is preferably hollow. Structural reinforcing member 300 preferably extends the entire longitudinal length L of structural member 328.

Figure 17:
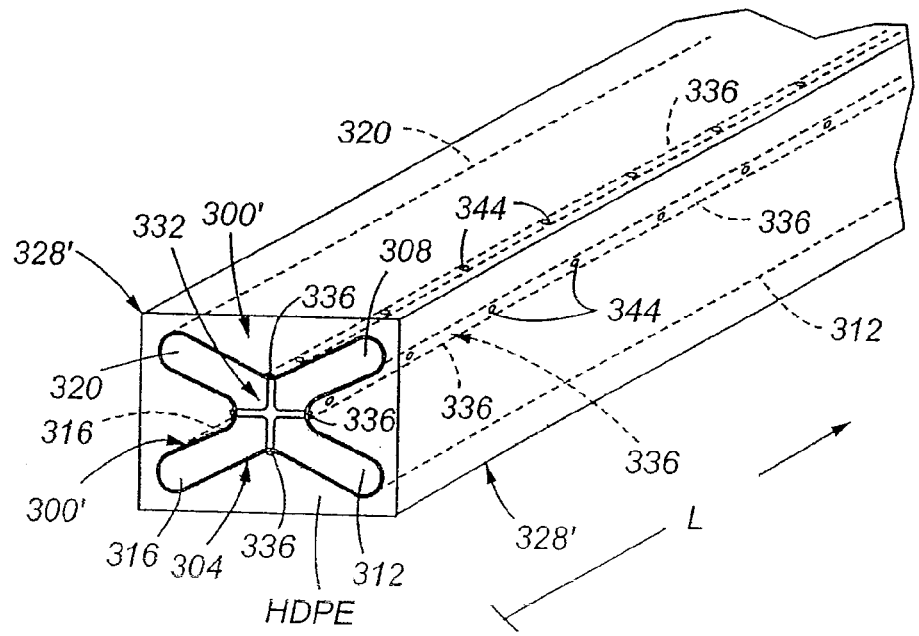

Referring now to FIG. 17, a modified structural reinforcing member 300' is shown, wherein structural reinforcing member 300' includes an internal reinforcing core 332. Reinforcing core 332 adds additional strength to structural reinforcing member 300', and allows structural member 328' including structural reinforcing member 300' to be used in higher load types of applications, but without the extra weight of a solid core addition.

As shown in FIG. 17, reinforcing core 332 appears as a cross-shaped member. However, other shaped reinforcing cores are within the scope of the present invention. As for example, reinforcing core may include a substantially square, circular or diamond shape in cross section.

Referring still to FIGS. 16 and 17, and in accordance with embodiments of the invention, the exterior surface of structural reinforcing members 300 and 300' preferably includes a surface texturing to aid in the bonding of the surrounding HDPE with members 300 and 300'. More particularly, an exterior rib 336 may be provided at the exterior intersection 340 between arms 308, 312, 316 and 320 of structural reinforcing members 300 and 300'. Ribs 336 preferably extend the longitudinal length L of structural reinforcing members 300 and 300'.

Still referring to FIGS. 16 and 17, in accordance with embodiments of the present invention, ribs 336 may further include fully penetrating or partially hollowed out depressions or divots 344. Divots 344 are preferably spaced apart along the longitudinal length of ribs 336. Divots 344 serve to further anchor reinforcing member 300, 300', that preferably includes an aluminum alloy, carbon fiber, or glass-reinforced polyurethane to the surrounding thermoplastic material, preferably HDPE. Such surficial features as divots and other texturing described herein may not be need for certain types of reinforcing material, such as glass-reinforced polyurethane, because sufficient chemical bonding between the material types is provided. Where needed, divots 344 assist in limiting or removing sliding tendencies between the HDPE and reinforcing members 300, 300' when structural members 328, 328' are under loaded conditions. In an alternative embodiment, the reinforcing member 300, 300' may include apertures 88 that act as openings for receiving at least some HDPE when the HDPE is extruded around the reinforcing member 300, 300'. As with divots 344, the apertures 88 assist in limiting or removing sliding tendencies between the HDPE and reinforcing members 300, 300' when structural members 328, 328' are under loaded conditions.

Figure 18:
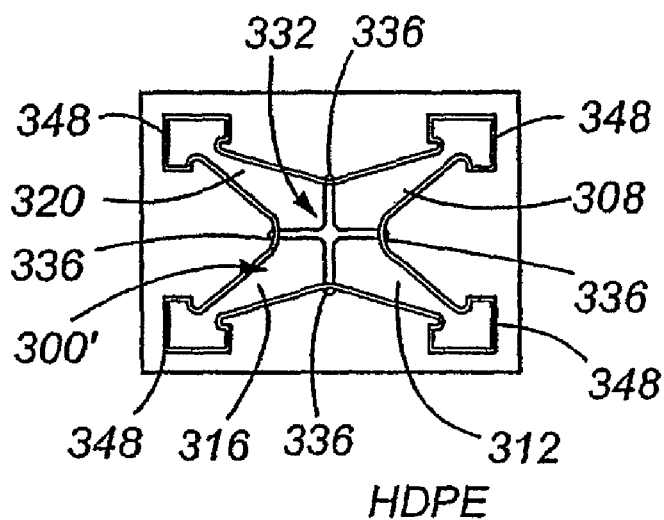
Figure 19:
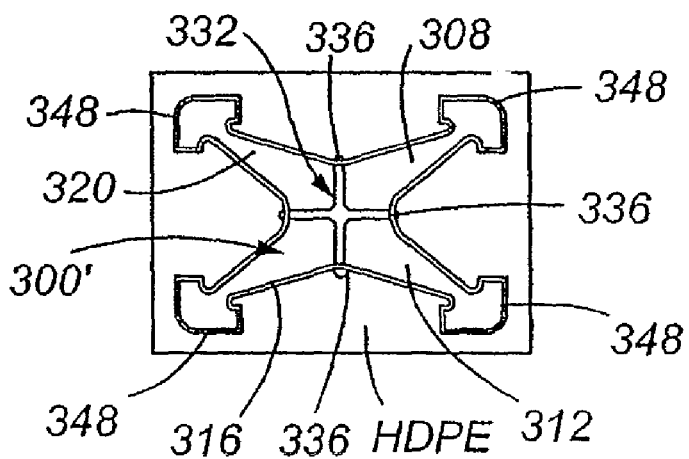
Figure 20:
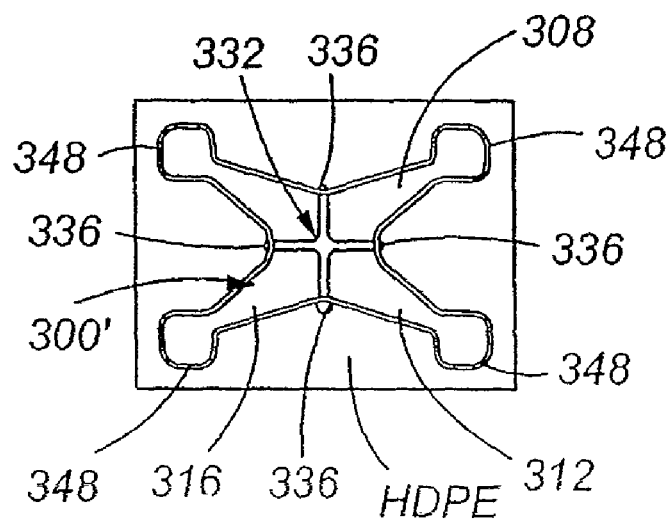

Referring now to FIGS. 18-20, end elevation views of structural reinforcing members 300' are shown, wherein arms 308, 312, 316 and 320 have various shapes and end shapes 348, such as prongs or lobes. For the reinforcing members shown in FIGS. 18-20, reinforcing cores 332 may be omitted if a hollow structural member 300 without reinforcing cores 332 is desired. Reinforcing members 300, 300' may also be solid.

Figure 21:
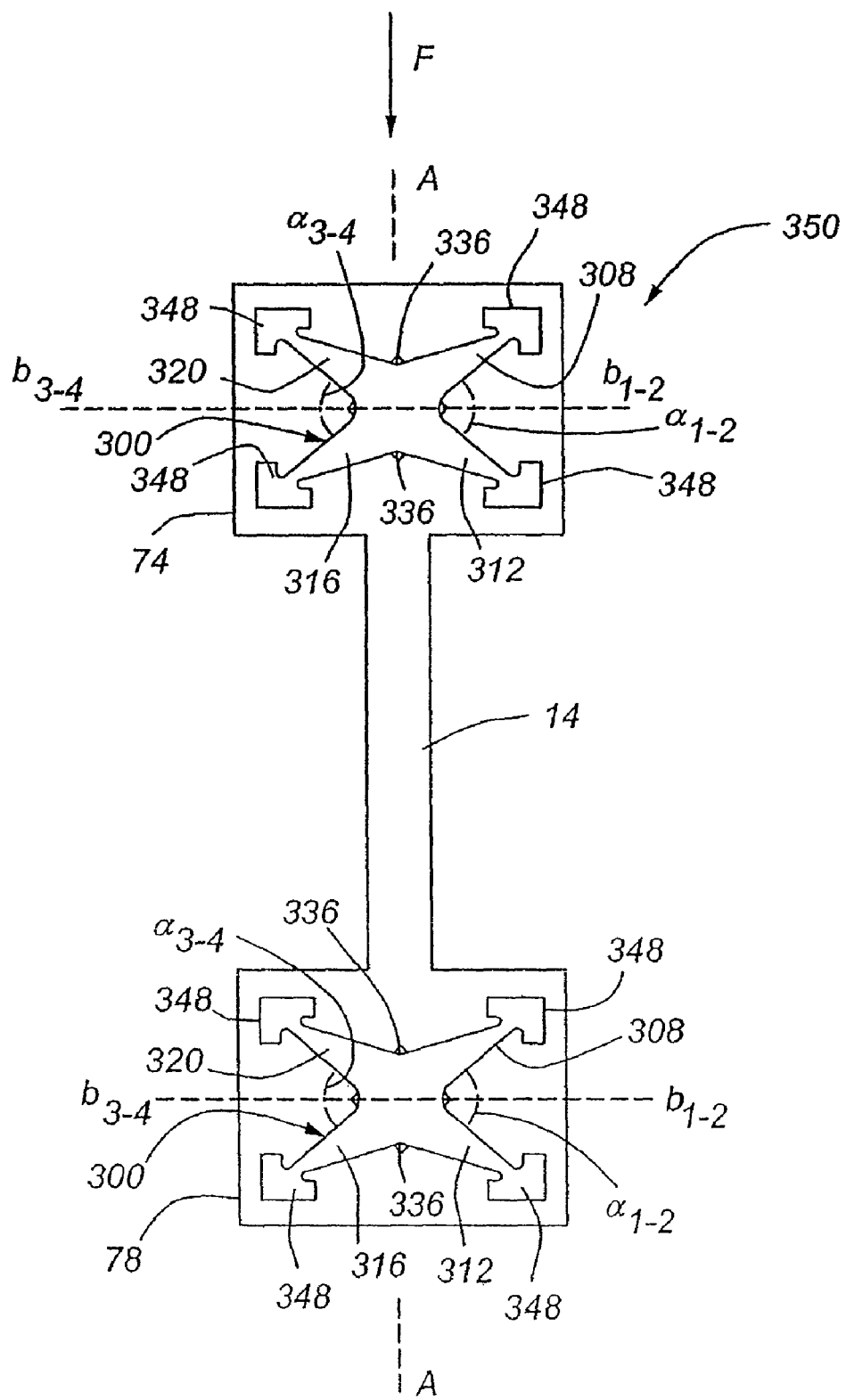
FIG. 21 is an end, side elevation view of an I-joist in accordance with embodiments of the present invention.

In practice of an embodiment of the invention, structural reinforcing members 300 and 300' may be used in I-joists, posts beams, trusses, and the like, with good benefit. As for example, FIG. 21 illustrates an embodiment of the present invention, wherein I-joist 350 includes flange 74, 78 with reinforcing members 300, 300'. In accordance with embodiments of the present invention, for I-joist 350 the reinforcing member 300, 300' is preferably oriented such that a bisector "$b_{1-2}$" of the angle "$\alpha_{1-2}$" between first arm 308 and second arm 312 is transverse to axis A-A of the I-joist 350, and more preferably, bisector "$b_{1-2}$" is substantially perpendicular to axis A-A of I-joist 350. Similarly, bisector "$b_{3-4}$" of the angle "$\alpha_{3-4}$" between third arm 316 and fourth arm 320 is transverse to axis A-A of the I-joist 350, and more preferably, bisector "$b_{3-4}$" is substantially perpendicular to axis A-A of I-joist 350. I-joist 350 is anticipated to preferably be oriented such that a compression load or force "F" applied to I-joist 350 is substantially parallel to axis A-A of I-joist 350.

The configuration of the reinforcing member 300, 300' comprising a plurality of arms enhances the strength of the entire I-joist 350. This is achieved under loading conditions when the upper arms 308 and 320 tend to converge toward the lower arms 312 and 316, respectively, thereby binding in place the HDPE. That is, the first arm 308 and the second arm 312 tend to converge toward each other compressing the HDPE between them together and thereby further locking the reinforcing member 300, 300' in place under loading conditions. Likewise, the fourth arm 320 and third arm 316 tend to converge toward each other compressing the HDPE between them together and thereby further locking the reinforcing member 300, 300' in place under loading conditions. In addition, the ribs 336 and associated divots 344, whether partially or fully penetrating, keep the HDPE from traversing along the longitudinal axis of the reinforcing member 300, 300' when under loading conditions.

Figure 21D:
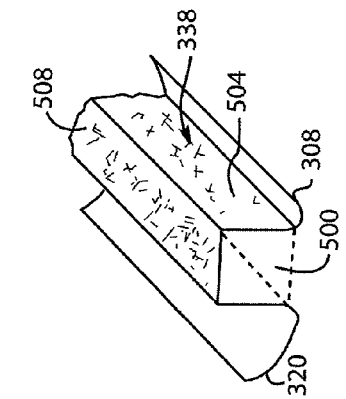
FIG. 21D is an enlarged detail perspective view of an example of a ridge of the reinforcing member of FIG. 21B.
Figure 21G:
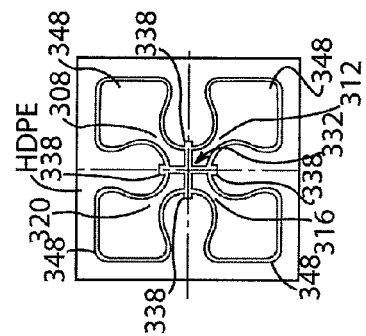
FIG. 21G is a side elevation view of a beam or flange portion of an I-joist in accordance with embodiments of the present invention.
Figure 21C:
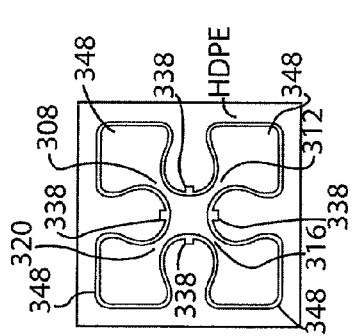
FIG. 21C is a side elevation view of a beam or flange portion of an I-joist in accordance with embodiments of the present invention.
Figure 21A:
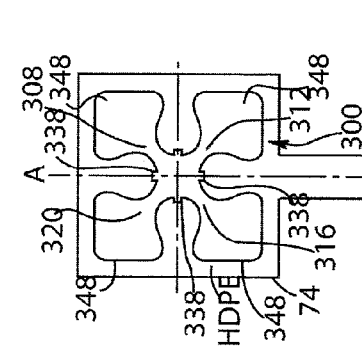
FIG. 21A is a side elevation view of an I-joist having reinforcing members in accordance with embodiments of the present invention.

Referring now to FIG. 21A, I-joist 350 is shown including flanges 74 and 78. The flanges 74 and 78 include structural reinforcing members 300, wherein the structural reinforcing members 300 have ribs 336 and/or ridges 338 that extend along the longitudinal length of the I-joist 350. The ribs 336 may include depressions or divots 344. The ridges 338 may include indentations, as described below.

In accordance with embodiments of the present invention, the ridges 338 may optionally comprise surface scarification or texturing. More particularly, and referring now to FIG. 21B, a structural reinforcing member 300 is shown in a perspective view. The ridge 338 between first arm 308 and fourth arm 320 includes ridge surfaces that are exposed to the HDPE upon extrusion of HDPE around the structural reinforcing member 300. FIG. 21C illustrates a side elevation view of the reinforcing member 300 of FIG. 21B surround by a HDPE. In at least one embodiment of the invention, the ridge surfaces include a texturing to facilitate improved bonding between the structural reinforcing member 300 and the HDPE to be extruded around the structural reinforcing member 300.

Referring now to FIG. 21D, a detail perspective view of a portion of a ridge 338 is shown. The ridge 338 of FIG. 21D comprises a substantially rectangular shape 500 when viewed from an end-on side position, however, other ridge shapes are within the scope of the invention. In at least one embodiment of the invention, the lateral sides 504 of the ridge are textured, such as by a roughing process or an extrusion step to provide random or uniform surface depressions and/or projections on the lateral sides 504. In at least one embodiment of the invention, the ridge 338 includes a top surface 508, wherein the top surface 508 includes a texturing. Thus, in accordance with embodiments of the invention, one or more of the lateral sides 504 and/or top surface 508 may include some type of texturing or other structural feature, thereby providing a means for improving bonding between the ridge surface and the HDPE.

Figure 21B:
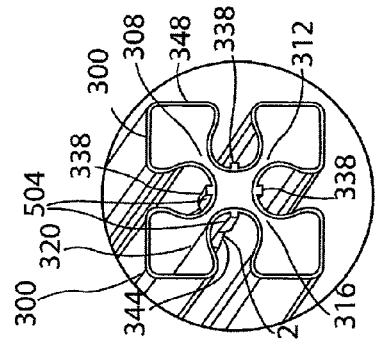
FIG. 21B is a partial perspective view of a reinforcing member that may be used in a structural member, such as the I-joist of FIG. 21A.

Referring again to FIG. 21B, the ridges 338 may include shaped features. In at least one embodiment, and as shown in FIG. 21B, shaped features comprising indentations are provided on the ridges 338. For the ridges 338 shown in FIG. 21B, full indentations 512 in the ridges 338 extend to the surface intersection between the arms, such as between the third arm 316 and the fourth arm 320. Alternatively, as shown in FIG. 21E, the partial indentations 516 in the ridges 338 are provided, wherein at least a portion of the ridge 338 always exists between the arm surfaces. Full indentations 512 may be combined with partial indentations 516 on one or more of the ridges. Ridges 338 with indentations 512, 516 may be also use surface texturing as discussed above.

Figure 21F:
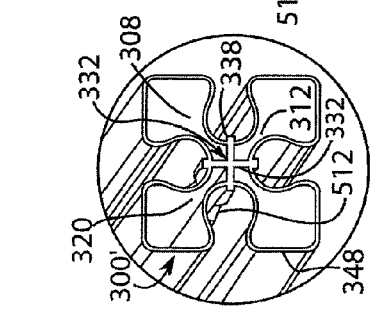
FIG. 21F is a partial perspective view of a reinforcing member in accordance with embodiments of the present invention.
Figure 21E:
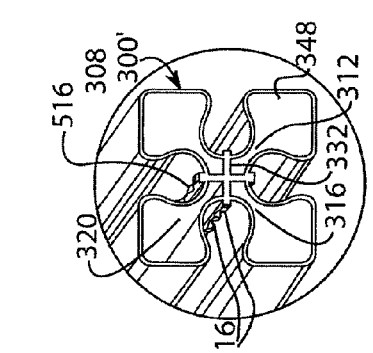
FIG. 21E is a partial perspective view of a reinforcing member in accordance with embodiments of the present invention.
Figure 21H:
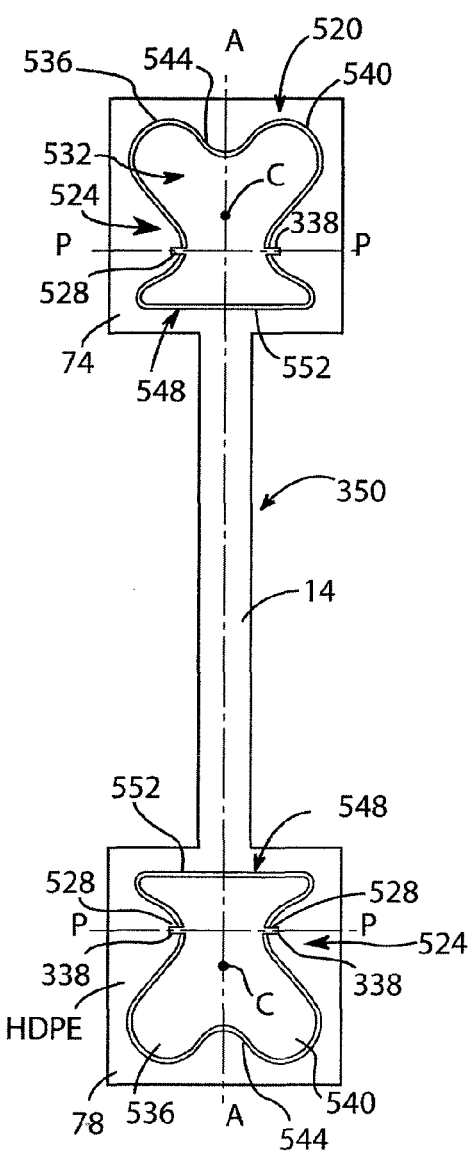
FIG. 21H is a side elevation view of an I-joist having reinforcing members in accordance with embodiments of the present invention.

Referring to FIG. 21E-21G, embodiments of the present invention may include the reinforcing core 332, and in at least one embodiment, ridges 338 are axially aligned with cross members of the core 332.

Figure 21I:
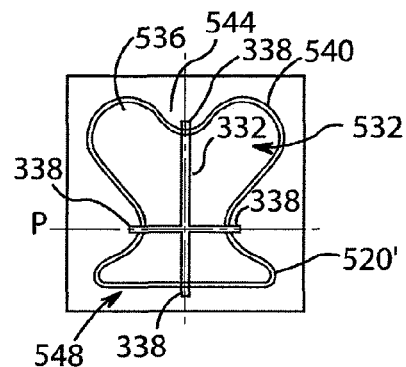
FIG. 21I is a side elevation view of a beam or flange portion of an I-joist in accordance with embodiments of the present invention.
Figure 21J:
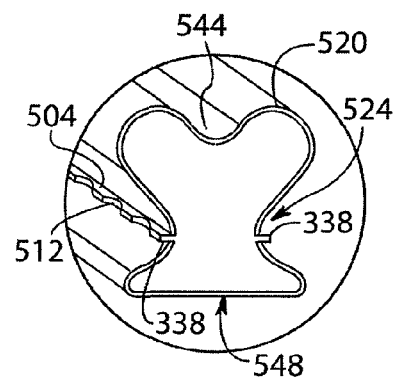
FIG. 21J is a partial perspective view of a reinforcing member in accordance with embodiments of the present invention.
Figure 21K:
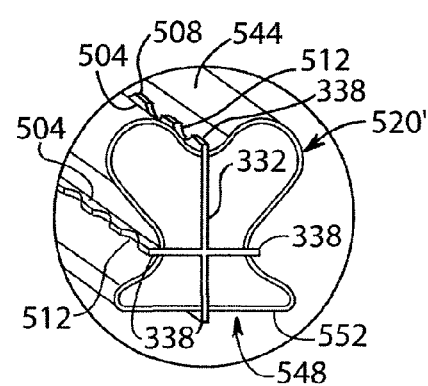
FIG. 21K is a partial perspective view of a reinforcing member in accordance with embodiments of the present invention.

Referring now to FIGS. 21H-21K, and in accordance with embodiments of the present invention, an asymmetrical structural reinforcing member 520 is provided. The reinforcing member 520 preferably is symmetrical about the longitudinal axis A-A of the webbing 14 of the joist 350, however, reinforcing member 520 is asymmetrical with respect to an axis P-P that is laterally perpendicular to the longitudinal axis A-A. The reinforcing member 520 preferably includes a shape having similarities to an hourglass, wherein a narrowing region 524 defines a waist 528. In accordance with at least one embodiment of the invention, for an I-joist, the waist 528 is located closer to the webbing 14 than a point defining the center C of the flange 74 or 78 of the I-joist. In addition, in accordance with at least one embodiment, and as shown in FIGS. 21H-21K, an exterior portion 532 of the reinforcing member 520 includes two lobes 536 and 540 with a saddle region 544 between the lobes 536 and 540. A ridge 338 may be provided or excluded from the saddle region 544. In at least one embodiment of the invention, the surface opposite the saddle region 544 comprises a substantially planar region 548 that is perpendicular to the longitudinal axis A-A of the I-joist. A ridge 338 may be provided along the surface 552 opposite the saddle 544. As shown in FIGS. 21I and 21K, an asymmetrical structural reinforcing member 520' may be provided that comprises a reinforcing core 332 as previously described.

For the various reinforcing members disclosed herein, including those shown in FIGS. 21B-21K, the reinforcing members may be used in a variety of structural members, including I-joists, beams, and posts. The reinforcing members may be solid material, such as an aluminum alloy or glass-reinforced polyurethane, or they may be hollow, or hollow with the reinforcing core 332. If hollow during one step of the manufacturing process, they may be later filled or partially filled with a material, such as with a foam material. In at least one embodiment, the foam preferably comprises a closed-cell foam that is substantially non-flammable. Furthermore, in at least one embodiment, a foam material may be applied to the exterior of the reinforcing member, such as an aluminum alloy reinforcing member, prior to extrusion or application of HDPE to the exterior of the foam-coated reinforcing member. If at least a portion of the structural reinforcing members are hollow, these passages provide conduit runs for items such as electrical wiring. A variety of materials may be used to form the reinforcing members, including metal alloys, composites, and carbon fiber, or combinations of materials. In addition, the material thickness of the reinforcing members may be adjusted to provide different strength characteristics for the reinforcing member, and the structural component that it is associated with.

Referring now to FIGS. 21L-21P, and in accordance with embodiments of the present invention, a variety of I-joists 350 are shown, wherein the I-joists include a number of alternatively shaped reinforcing members. For the I-joist 350 shown in FIG. 21L, a reinforcing member 700 includes a first region 704 and a second region 708, wherein the first region is positioned further from the webbing 14 of the I-joist 350 than the second region 708. The reinforcing member 700 is preferably symmetrical about the axis A-A of webbing 14. In addition, angled lateral channels 712 are located symmetrically about the axis A-A of webbing 14. In at least one embodiment of the invention, first region 704 is solid, and the second region 708 includes a hollow portion 716. The hollow portion 716 may remain hollow, be filled with another material such as a foam, and/or act as a conduit for carrying wiring and the like. During application of forces to the I-joist 350, the thermoplastic material within the angles lateral channels 712 is confined between the first and second regions 704 and 708, respectively, thereby assisting in the stability of the reinforcing member 700 relative to the surrounding thermoplastic material during such loading. Although not shown, the reinforcing member 700 may include ribs with divots, texturing, indentations, or other surficial features.

Referring now to FIG. 21M, an I-joist 350 is shown comprising a reinforcing member 720 that has three sides with concave features 724, and a fourth side 728 adjacent the webbing 14 that is substantially planar for at least the width of the webbing 14, and that includes flanges 732 on the ends of the fourth side 728. The reinforcing member 720 is preferably symmetrical about the axis A-A of webbing 14. In accordance with embodiments of the present invention, the upper flange 74 and lower flange 78 of the I-joist 350 may further comprise an exterior surface 736 that includes concave features 740. In at least one embodiment of the present invention, at least portions of the concave features 740 of the exterior surface 736 are substantially parallel to the concave features 724 of the reinforcing member 720. As shown in FIG. 21M, the reinforcing member 720 may comprise a hollow portion 716.

Referring now to FIG. 21N, an I-joist 350 is shown comprising a reinforcing member 744. The reinforcing member 744 is preferably symmetrical about the axis A-A of webbing 14. The reinforcing member 744 includes channels 748 along its lateral sides 752 and top side 756. The first portion 760 of the reinforcing member 744 includes two prongs 764 located on either side of the channel 748 located on the top side 756. The exterior surface 736 of the flanges 74 and 78 include indentations 768. The reinforcing member 744 also preferably includes a substantially planar surface 772 adjacent the webbing 14, with flanges 776 on the sides of the substantially planar surface 772. During application of forces to the I-joist 350, the thermoplastic material within the channels 748 is confined between prongs 764 and the second portion 780 of the reinforcing member 744, thereby assisting in the stability of the reinforcing member 744 relative to the surrounding thermoplastic material during such loading.

Referring now to FIG. 21O, an I-joist 350 in accordance with embodiments of the present invention is shown, the I-joist including reinforcing member 784 within both its upper flange 74 and lower flange 78. The reinforcing member 784 has a shape similar to an hourglass, and is preferably symmetrical about the axis A-A of the webbing 14, and is also preferably symmetrical about a center point CP. Each lateral surface of the reinforcing member 784 preferably includes a lateral channel 788. In addition, the upper and lower surfaces of the reinforcing member include concave features 792. In one embodiment, the surface adjacent the webbing 14 may comprise a planar surface, similar to that shown in FIGS. 21M and 21N. In accordance with embodiments of the present invention, the exterior surface 736 of the upper and lower flanges may include concave features 796. During application of forces to the I-joist 350, the thermoplastic material within the lateral channels 788 is confined, thereby assisting in the stability of the reinforcing member 784 relative to the surrounding thermoplastic material during such loading.

Referring now to FIG. 21P, another I-joist 350 in accordance with embodiments of the present invention is shown. The I-joist of FIG. 21P includes reinforcing member 800 that comprises structure similar to reinforcing member 744 shown in FIG. 21N; however, reinforcing member 800 includes a substantially planar surface 804 located adjacent the webbing 14. During application of forces to the I-joist 350, the thermoplastic material within the channels 748 is confined, thereby assisting in the stability of the reinforcing member 800 relative to the surrounding thermoplastic material during such loading.

Figure 22:
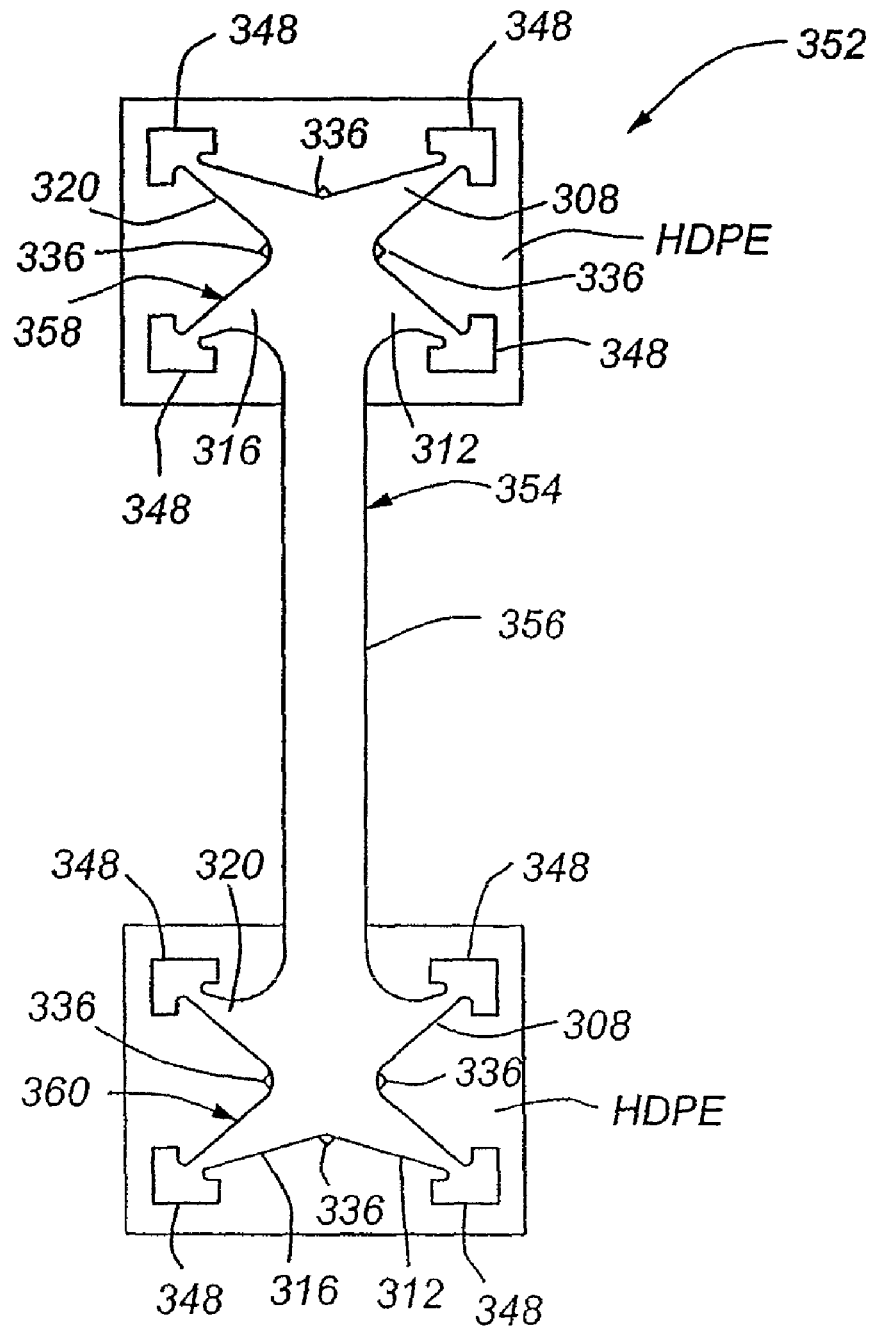
FIG. 22 is an end, side elevation view of yet another I-joist in accordance with embodiments of the present invention.

Referring now to FIG. 22, in accordance with embodiments of the present invention, an I-joist 352 is shown that comprises a web and flange reinforcing member 354. The web and flange reinforcing member 354 preferably is formed of carbon fiber, glass-reinforced polyurethane or a metal alloy, such as an aluminum alloy. The web and flange reinforcing member 354 preferably comprises an assembled, integral structure that includes webbing 356 that is connected or formed integrally with reinforcing flange members 358 and 360. Webbing 356 may be solid or hollow, and reinforcing flange members 358 and 360 may comprise one of the earlier presented reinforcing members, such as reinforcing members 300, 300', where such reinforcing members may also be solid or hollow, and where hollow, may include a reinforcing core 332. In addition, the webbing 356 may be solid and combined with hollow reinforcing members. For a web and flange reinforcing member 354 made of carbon fiber, the webbing 356 is preferably thinner in width w than a structurally equivalent webbing 14 that is made of HDPE. As for example, the webbing 356 may be about 3/16 of an inch in width. In accordance with embodiments of the present invention, to form the I-joist 352, HDPE is extruded to the exterior of reinforcing flange members 358 and 360 of web and flange reinforcing member 354.

Figures 23, 24:
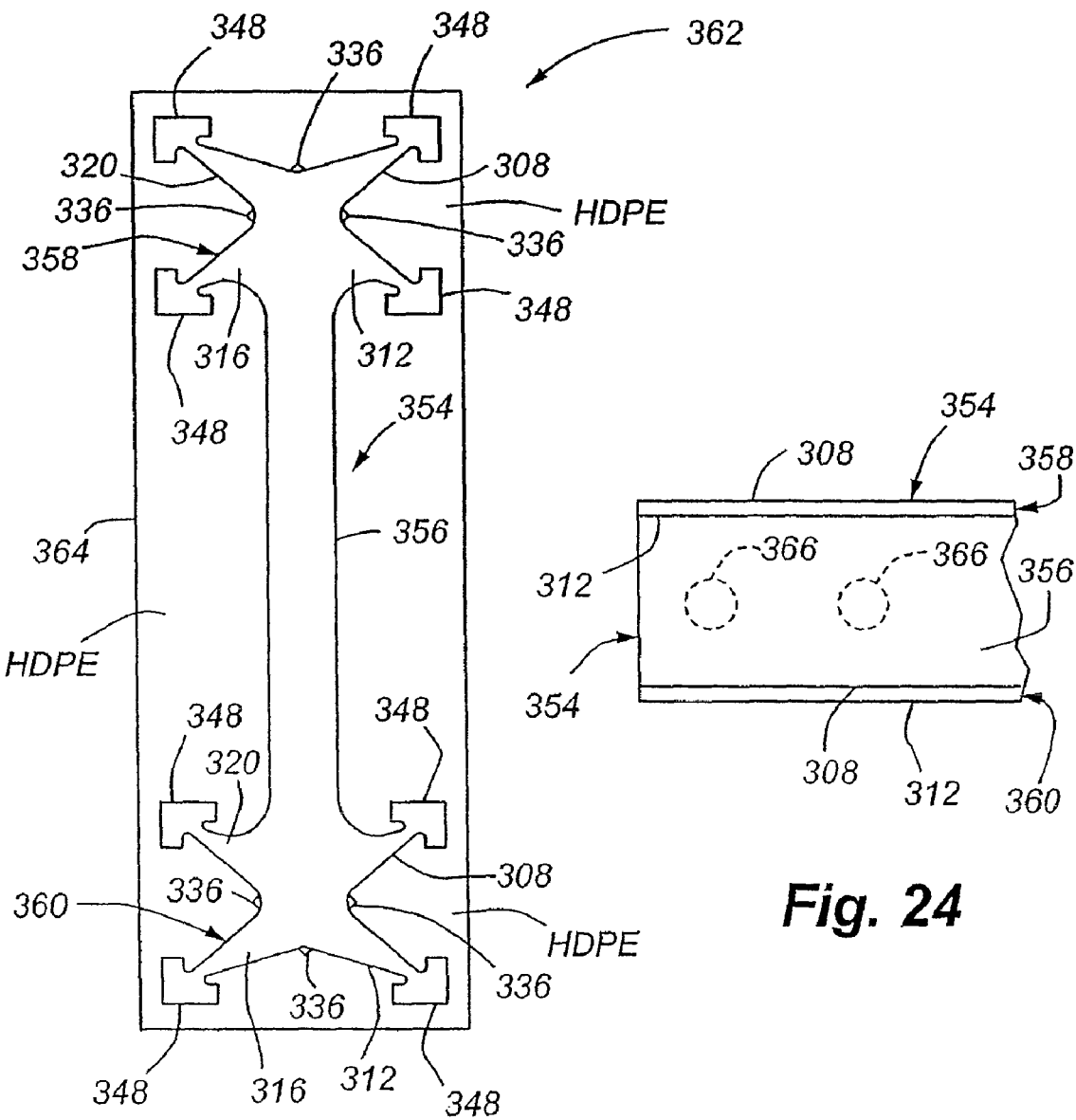
FIG. 23 is an end, side elevation view of a rim joist in accordance with embodiments of the present invention.
FIG. 24 is a side elevation view a web and flange reinforcing member in accordance with embodiments of the present invention.

Referring now to FIG. 23, an end-on side elevation view of a rim joist 362 in accordance with embodiments of the present invention is shown. The rim joist 362 includes the web and flange reinforcing member 354 as described above for I-joist 352, and further comprises a substantially rectangular shaped outer member 364 encompassing the web and flange reinforcing member 354.

Referring now to FIG. 24, a side elevation view of only the web and flange reinforcing member 354 is shown. In accordance with embodiments of the present invention, the web 356 of the web and flange reinforcing member 354 may include holes 366 spaced apart along its longitudinal length.

Although the I-joist shown herein typically include a reinforcing member of similar structure in both the upper flange 74 and lower flange 78, it is to be understood that the upper flange 74 may use a reinforcing member of an alternate configuration than lower flange 78. For example, an I-joist may use reinforcing member 300 in the upper flange 74 and reinforcing member 784 in the lower flange 78.

Figure 28:
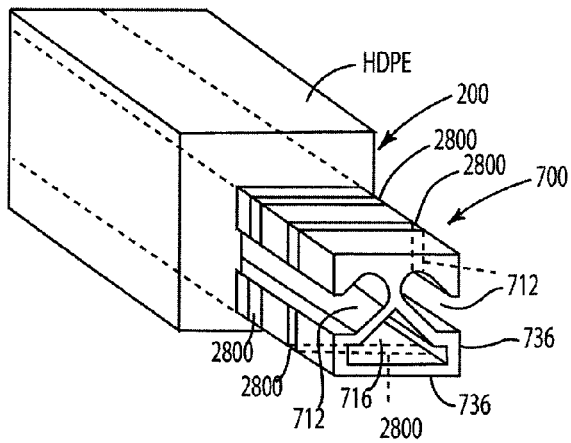
FIG. 28 is a perspective view of a beam or flange portion of an I-joist in accordance with embodiments of the present invention, wherein the thermoplastic material has been omitted from an end of the beam or flange portion to show the reinforcing member.
Figure 29A:
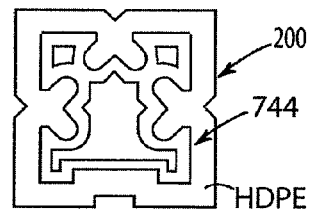
FIGS. 29A-29G are side elevation views of beam or flange portions of an I-joist in accordance with embodiments of the present invention.
Figure 29B:
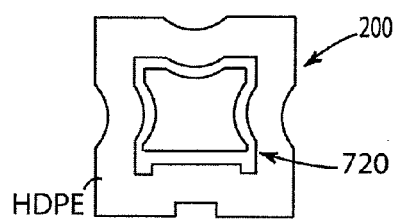
Figure 29C:
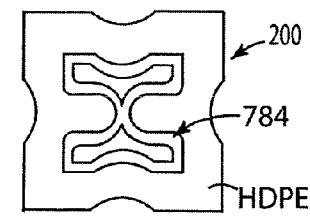
Figure 29D:
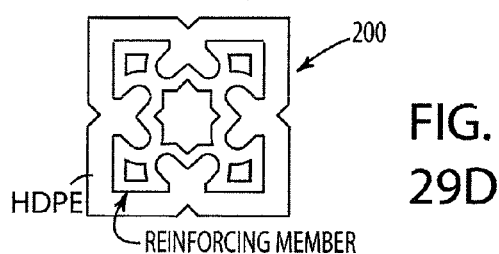
Figure 29E:
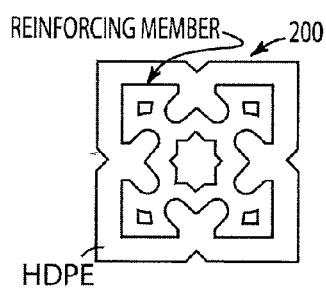
Figure 29F:
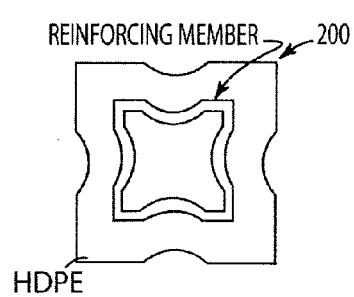
Figure 29G:
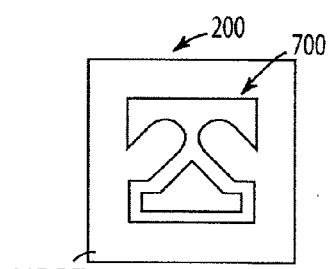

Referring now to FIG. 28, and in accordance with embodiments of the present invention, a beam, post or structural member 200 is shown in perspective view, wherein the structural member 200 includes the reinforcing member 700. (To show a portion of the longitudinal length of the reinforcing member 700, the surrounding HDPE has been omitted from an end of the structural member 200.) In accordance with embodiments of the present invention, the various reinforcing members of the present invention may include one or more types of surface features to enhance the coupling of the HDPE to the reinforcing member. One preferred surface feature comprises debossing or indenting the exterior surface of the reinforcing member. For the reinforcing member 700 shown in FIG. 28, the surface feature is an indentation 2800, wherein the indentation 2800 is shown along adjacent surfaces, such as the top surface and left side for the orientation of the structural member 200 depicted in FIG. 28; however, the indentation 2800 preferably extends around the entire periphery of the exterior surface 736 of the reinforcing member 700. The indentation is preferably made by applying a force to the exterior surface of the reinforcing member, such as by impacting the exterior surface of the reinforcing member with another object, or by applying an annular pressure to the reinforcing member at the desired location for the indentation. In accordance with embodiments of the present invention, the indentation extends around the exterior of the reinforcing member at substantially the same longitudinal position. For example, for the reinforcing member shown in FIG. 28, the indentation 2800 is along the first side, second side, third side and fourth side and the indentions 2800 on each side are substantially coplanar. The various embodiments of the present invention that include reinforcing members may comprise the indentations 2800, whether the reinforcing member is located in an I-joist or other structural member, such as a beam or post.

FIGS. 29A-29G illustrate structural members 200 with a number of possible reinforcing members, including those reinforcing members depicted in FIGS. 21L-21P.

Referring now to FIG. 30A, and in accordance with embodiments of the present invention, an I-joist 350 is shown in perspective view, wherein for purposes of clarity, at one end of the I-joist 350 the reinforcing members 3000 are shown extending from the upper and lower flanges 74, 78 of the I-joist 350 without the surrounding HDPE material. The reinforcing member 3000 includes a first region 3004 and a second region 3008 wherein the first region 3004 is located further away from the webbing 14 than the second region 3008. For the I-joist 350 shown in FIG. 30A, the reinforcing member 3000 comprises a plurality of arms. More particularly, similar to the reinforcing member 300 shown in FIG. 16, reinforcing member 3000 includes a plurality of arms extending from a central core 304. In accordance with illustrative embodiments of the present invention, reinforcing member 3000 includes four arms, including a first arm 308, a second arm 312, a third arm 316, and a fourth arm 320. Therefore, for the upper flange 74 of the I-joist 350, first region 3004 comprises first arm 308 and fourth arm 320, while the second region 3008 comprises the second arm 312 and the third arm 316. For the lower flange 78 of the I-joist 350, first region 3004 comprises the second arm 312 and the third arm 316, while the second region 3008 comprises first arm 308 and fourth arm 320. The first arm 308 is preferably situated substantially opposite third arm 316, and second arm 312 is also preferably situated substantially opposite fourth arm 320. For reinforcing member 3000, indentations 3012 are provided along the saddle areas 3016 between the arms 308, 312, 316 and 320. FIG. 30B illustrates a top plan view of the I-joist 350 of FIG. 30B, and the indentations within the saddle area 3016 between the first arm 308 and fourth arm 320 are shown.

Referring now to FIGS. 31A and 32A, additional embodiments of I-joists 350 in accordance with embodiments of the present invention are shown. The I-joist 350 of FIG. 31A includes a reinforcing member 3100 that has a more pronounced prong shape at the end of its arms 308, 312, 316 and 320. In addition, indentations 3012 are shown along the outer portions of the arms 308, 312, 316 and 320. The I-joist 350 of FIG. 32A includes reinforcing member 3200, wherein arms 308, 312, 316 and 320 include proportionally larger arm hollow areas as compared to the reinforcing members 3000 and 3100. In addition, the central hollow area is smaller for reinforcing member 3200 than it is for reinforcing members 3000 and 3100. Thus, embodiments of the present invention encompass a variety of configurations.

Figure 30C:
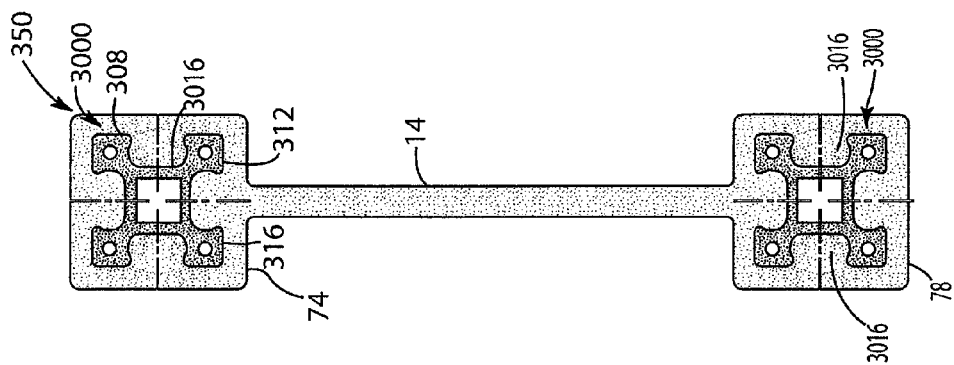
FIG. 30C is a side elevation view of the I-joist of FIG. 30A.
Figure 31B:
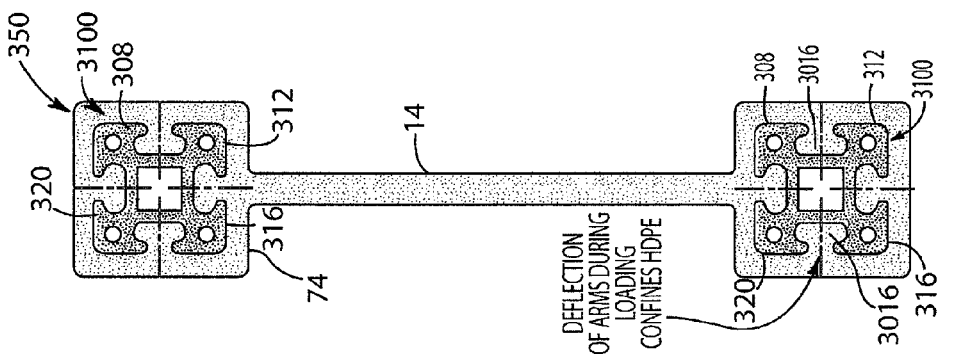
FIG. 31B is a side elevation view of the I-joist of FIG. 31A.
Figure 32B:
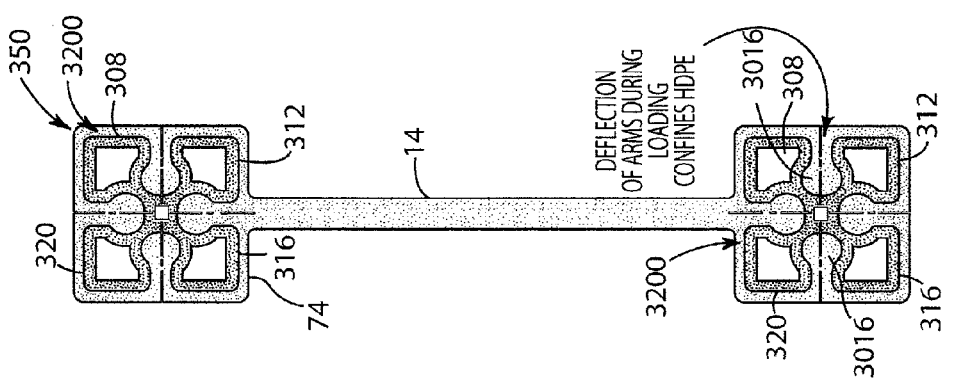
FIG. 32B is a side elevation view of the I-joist of FIG. 32A.

Referring now to FIGS. 30C, 31B, and 32B, front elevation views of the I-joist 350 of FIGS. 30A, 31A, and 32A, respectively, are shown. Where provided in this invention disclosure, the dimension values shown are for preferred embodiments and are not meant to be limiting. The I-joist 350 of FIGS. 30C, 31B, and 32B are drawn to scale, and include values appropriate for proper functioning of the I-joist under loading conditions. More particularly, the shapes, thicknesses and dimensions of the various features of the reinforcing members and surrounding HDPE are shown, and such dimensions allow for the arms of the reinforcing members to deflect under loading, thereby confining the HDPE or other thermoplastic material between the lateral saddle areas.

Figure 37B:
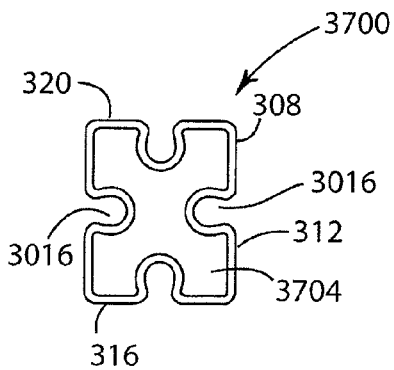
FIGS. 37B and 37C are detail views of the reinforcing member shown in FIG. 37A.
Figure 37C:
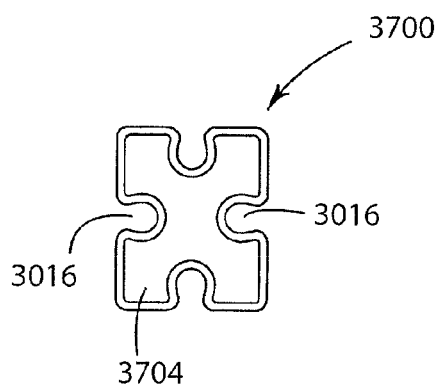
Figure 37A:
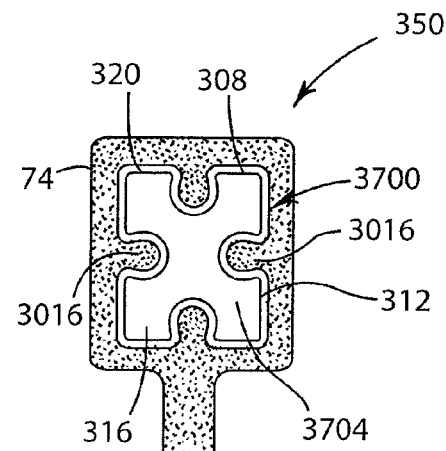
FIG. 37A is a side elevation view of an I-joist in accordance with embodiments of the present invention.
Figure 37A:
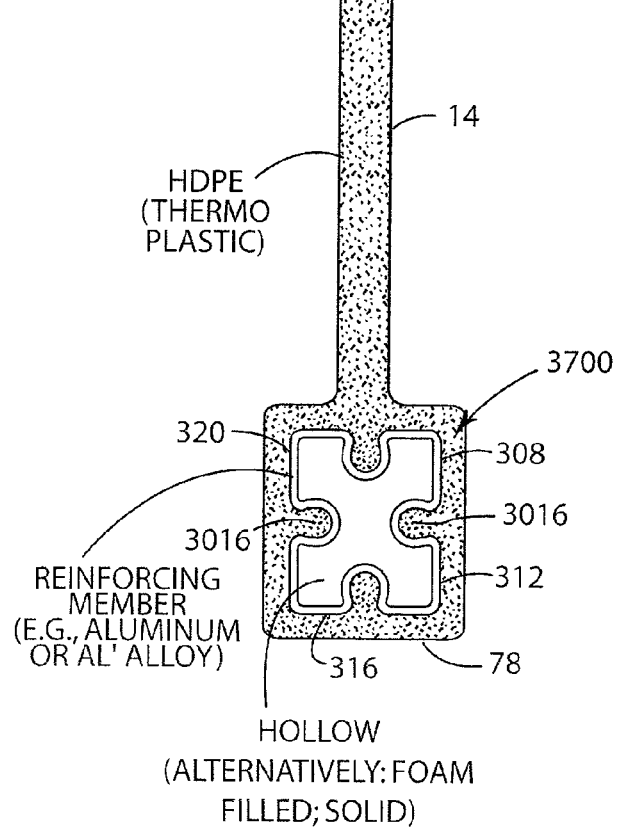

Referring now to FIG. 37A, a further embodiment of I-joist 350 is shown. I-joist 350 includes a reinforcing member 3700 that has a hollow region 3704 that extends from the center of the reinforcing member 3700 to and into the plurality of arms 308, 312, 316 and 320. In accordance with embodiments of the present invention, the hollow region 3704 may be filled with a material, such as closed cell foam. Alternatively, the I-joist shown in FIG. 37A may include a reinforcing member 3700 comprising foamed glass-reinforced polyurethane with or without the hollow regions 3704.

Figure 38B:
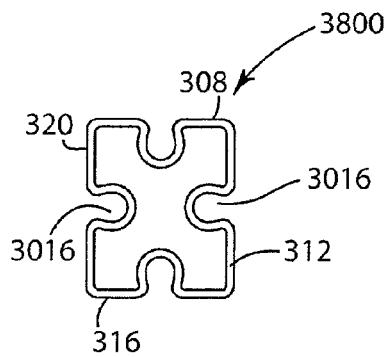
FIGS. 38B and 38C are detail views of the reinforcing member shown in FIG. 38A.
Figure 38C:
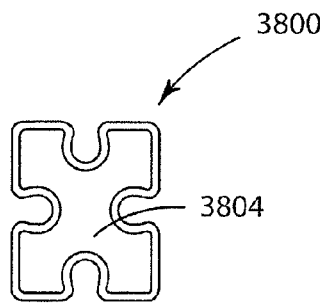
Figure 38A:
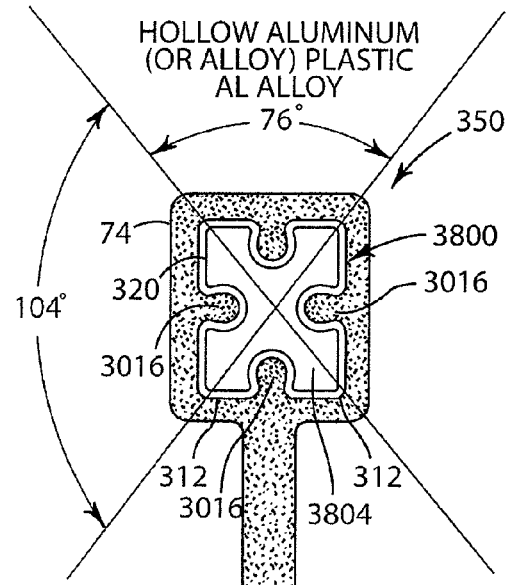
FIG. 38A is a side elevation view of an I-joist in accordance with embodiments of the present invention.
Figure 38A:
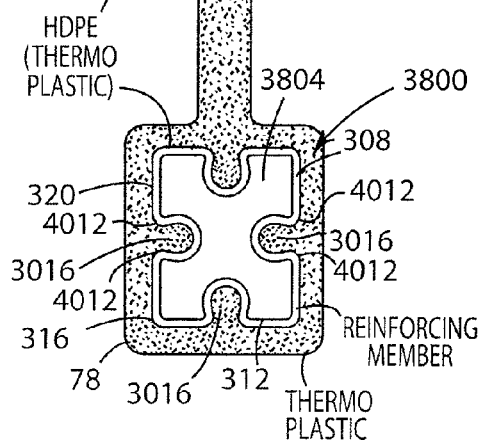

Referring now to FIG. 38A, a further embodiment of I-joist 350 is shown. I-joist 350 includes reinforcing members 3800a and 3800b that have hollow regions 3804 that extend from the center of the reinforcing members 3800a and 3800b to and into the plurality of arms 308, 312, 316 and 320. In accordance with embodiments of the present invention, the hollow region 3804 may be filled with a material, such as closed-cell foam. The I-joist of FIG. 37A is similar in many respects to the I-joist of FIG. 38A; however, the relative cross-sectional area occupied by the reinforcing member 3700 and 3800 is different for the two I-joists. In addition, I-joist 350 of FIG. 38A includes a reinforcing member 3800a having a different thickness than reinforcing member 3800b. Thus a particular structural member of the present invention, such as an I-joist, may include a plurality of reinforcing members having different dimensions, configurations, material types and engineering properties, and are within the scope of the present invention. By way of example and not limitation, for the I-joists 350 of FIGS. 37A and 38A, the flanges 74 and 78 have an outer width dimension of about 1.5 inches, and a height of about 1.75 inches, where the overall height of the I-joist is about 7.5 inches; however, the ratio of the cross-sectional area occupied by the reinforcing member to the overall cross-sectional area of the I-joist may vary.

The embodiments depicted in FIGS. 37A and 38A further illustrate that the reinforcing members may encompass a variety of configurations. Although depicted in FIGS. 37A and 38A as aluminum, the reinforcing members 3700 and 3800 (and other reinforcing members described herein) may comprise a metal alloy, steel, carbon fiber and other appropriate structural materials as described herein or know to those skilled in the art.

As noted above, where provided in the text and the drawings of this disclosure, the dimension values shown are for preferred embodiments and are not meant to be limiting. FIGS. 37B and 37C are detail drawings of the reinforcing member 3700. These drawings and the I-joist 350 shown in FIG. 37A are drawn to scale, and include dimension values appropriate for proper functioning of the I-joist under loading conditions. Similarly, FIGS. 38B and 38C are detail drawings of the reinforcing member 3800. These drawings and the I-joist 350 shown in FIG. 38A are drawn to scale, and include dimension values appropriate for proper functioning of the I-joist under loading conditions. As one skilled in the art will appreciate, the values shown are but one example of dimensions that may be used and are not intended to be limiting. The shapes, thicknesses and dimensions of the various features of the reinforcing members and surrounding HDPE are shown, and such dimensions allow for the arms of the reinforcing members to deflect under loading, thereby confining the HDPE or other thermoplastic material between the lateral saddle areas 3016. However, other dimensions and shapes are possible and are within the scope of the present invention.

Figure 39:
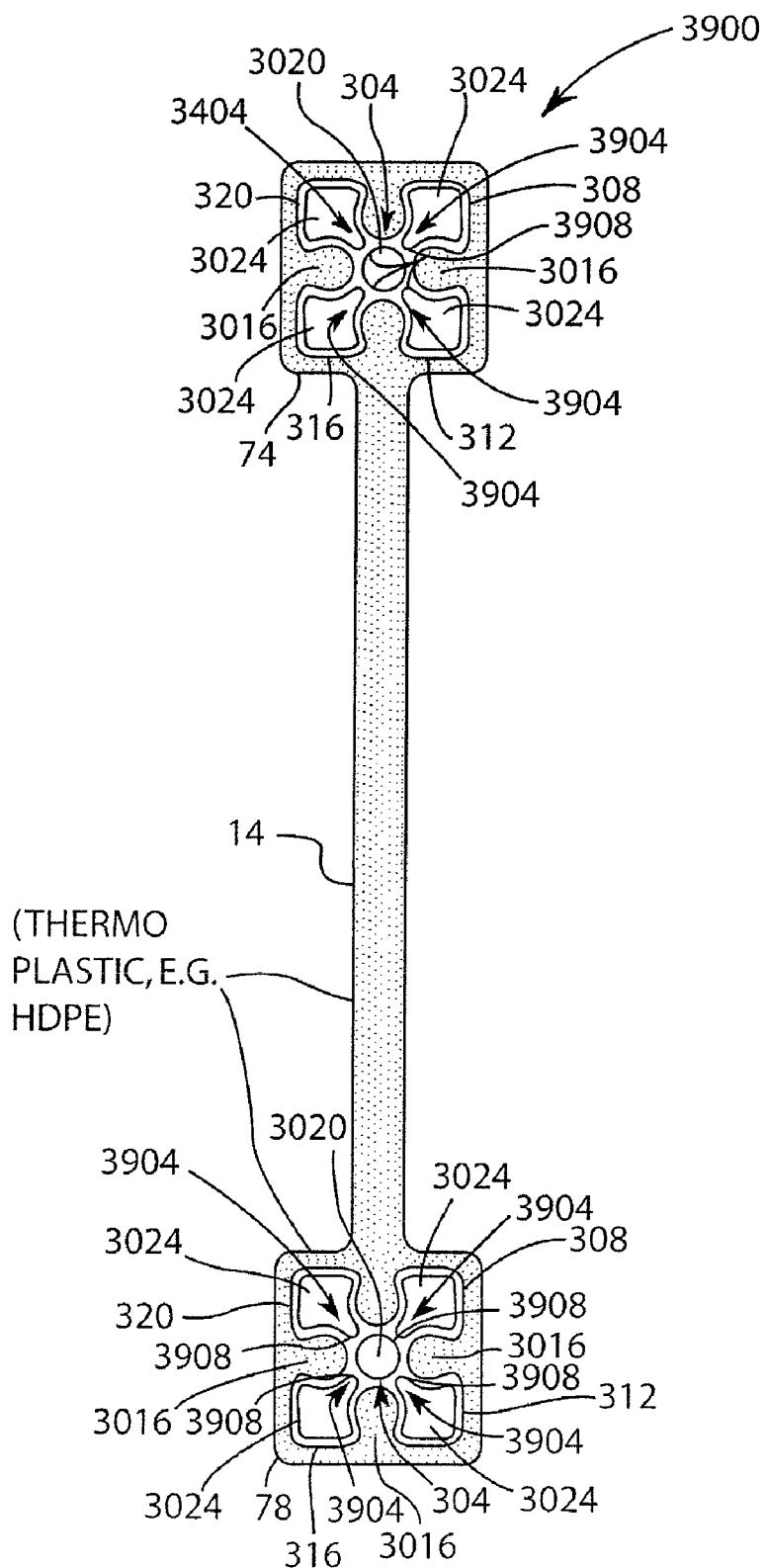
FIG. 39 is a side elevation view of an I-joist in accordance with embodiments of the present invention.

Referring now to FIG. 39, a further embodiment of I-joist 350 is shown. I-joist 350 includes a reinforcing member 3900 that has a central hollow region 3020, and further includes a plurality of arm hollow areas 3024 within the plurality of arms 308, 312, 316 and 320. The arm hollow areas 3024 narrow at a neck region 3904 between the center area of the arm hollow areas 3024 toward the central hollow region 3020. A separation section 3908 divides the of the arm hollow areas 3024 from the central hollow region 3020 at the location where the arms 308, 312, 316, and 320 meet the central core 304 of the structural reinforcing member 3900. The hollow areas 3024 provide for advantageous deflection characteristics of the reinforcing member 3900.

Figure 40G:
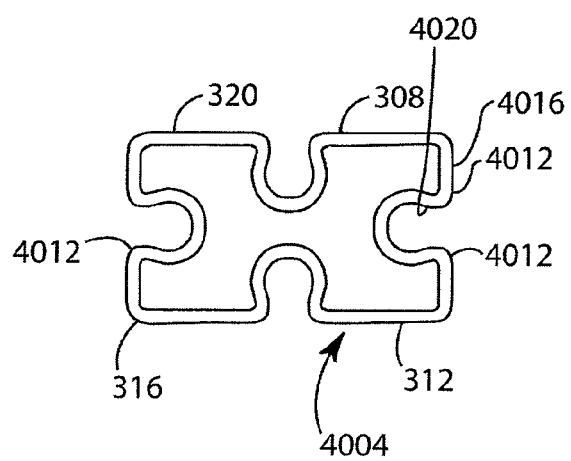
FIG. 40G is a detail view of the reinforcing member shown in FIG. 40F.
Figure 40F:
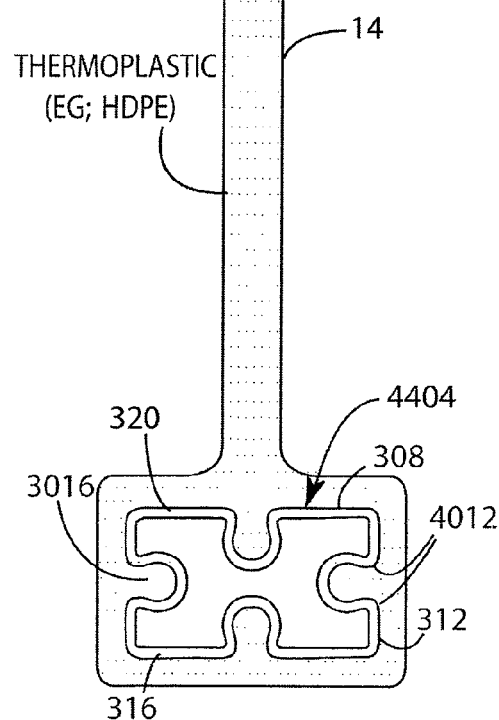
FIG. 40F is a side elevation view of an I-joist in accordance with embodiments of the present invention.

Referring now to FIGS. 40A-40E, a further embodiment of I-joist 4000 is shown. The I-joist 4000 includes a reinforcing member 4004 having a width greater than its height. By way of example and not limitation, for the I-joist 4000 of FIG. 40A, the flanges 74 and 78 have an outer dimensional width of about 2.1 inches, and a height of 1.4 inches, where the overall height of the I-joist is about 9.5 inches. Also by way of example and not limitation, the reinforcing member has a width of about 1.7 inches and a height of about 1.0 inch. FIGS. 40F and 40G depict the I-joist 4000 with slightly modified dimensional values for the joist, including slightly different dimensions for the reinforcing member 4004. Thus, again, the values described in this document and shown in the drawings are examples of possible dimensions, and are not meant to be limiting. Other dimensions and proportions are encompassed within the scope of the invention and claims.

In comparing the I-joist 350 of FIGS. 37A and 38A to the I-joist 4000 of FIG. 40A, the flanges 74 and 78 of the I-joist 4000 have a wider width than height. In addition, with regard to the reinforcing member 4004, while the first arm 308 is aligned substantially opposite the third arm 316, and the second arm 312 is aligned substantially opposite the fourth arm 320, the angle between the first arm 308 and second arm 312 is less than the angle between the first arm 308 and the fourth arm 320. This is in contrast to the angles between the arms of the I-joists 350 of FIGS. 37A and 38A. The relatively wider reinforcing member 4004 provides modified internal stabilizing characteristics for the reinforcing member 4004.

In accordance with embodiments of the present invention, the reinforcing members comprising a plurality of arms, such as reinforcing member 4004, may include curved portion exceeding 90 degrees. Referring now to FIG. 40B, reinforcing member 4004 includes first arm 308, second arm 312, third arm 316 and fourth arm 320. The reinforcing member 4004 includes an exterior surface 4008, wherein the exterior surface 4008 includes bends 4012 that are greater than 90 degrees, and more preferably, greater than about 100 degrees. Thus, by way of example and not limitation, for bend 4012 of the second arm 312 of the reinforcing member 4004 shown in FIG. 40B, the exterior surface 4008 of reinforcing member 4004 curves greater than 90 degrees between lateral exterior surface portion 4016 of the second arm 312 and saddle exterior surface portion 4020. When located within the I-joist 4000, as shown in FIG. 40A, the bends 4012 serve to pinch the thermoplastic material within the saddle area 3016 when the I-joist 4000 undergoes compression, thereby mechanically locking the reinforcing member 4004 within the thermoplastic as the I-joist undergoes loading. As depicted in the drawings, the exterior surface of reinforcing members are preferably surrounded laterally (or in cross-section) by thermoplastic material.

Embodiments of the present invention include variety of configurations. By way of example and not limitation, reinforcing members of the various embodiments described herein may comprise a hollow configuration. Other embodiments may comprise a first material forming the reinforcing member, with a second material filling the first material. For example, the reinforcing member may comprise a hollow aluminum reinforcing member, or the reinforcing member may be filled with another material, such as a foam. In at least one embodiment of the present invention, the reinforcing members, such as reinforcing member 4004, may comprise a hollow (or substantially hollow) glass-reinforced polyurethane structure. In at least one embodiment of the present invention, the reinforcing members, such as reinforcing member 4004, may comprise a hollow foamed or unfoamed glass-reinforced polyurethane material. In at least one embodiment of the present invention, the reinforcing members, such as reinforcing member 4004, may comprise a solid (or substantially solid) member, such as a foamed or an unfoamed glass-reinforced polyurethane material. The reinforcing members may also comprise a metal, a metal alloy, steel, aluminum, an aluminum alloy, glass-reinforced polyurethane, carbon fiber, foamed and unfoamed glass-reinforced polyurethane, and combinations thereof.

Figure 41:
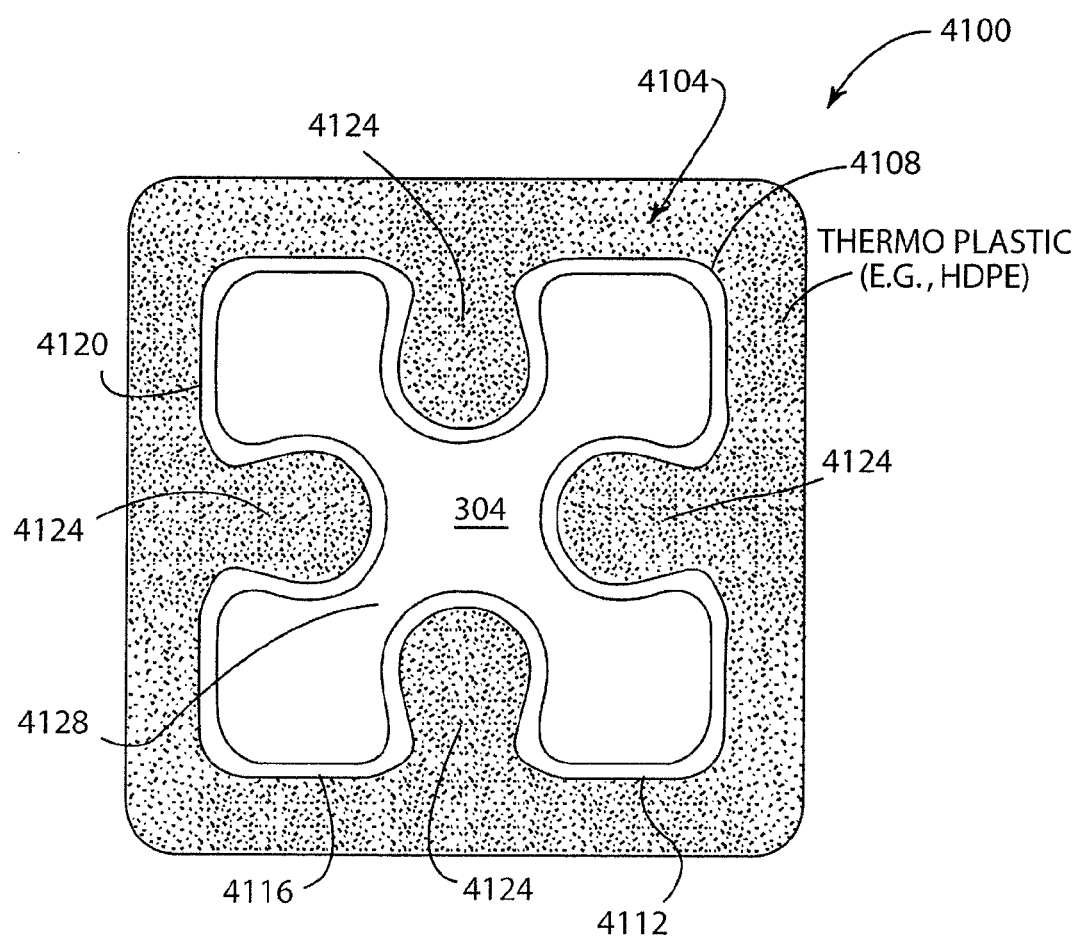
FIGS. 41-43 are top elevation views of posts in accordance with embodiments of the present invention.
Figure 42:
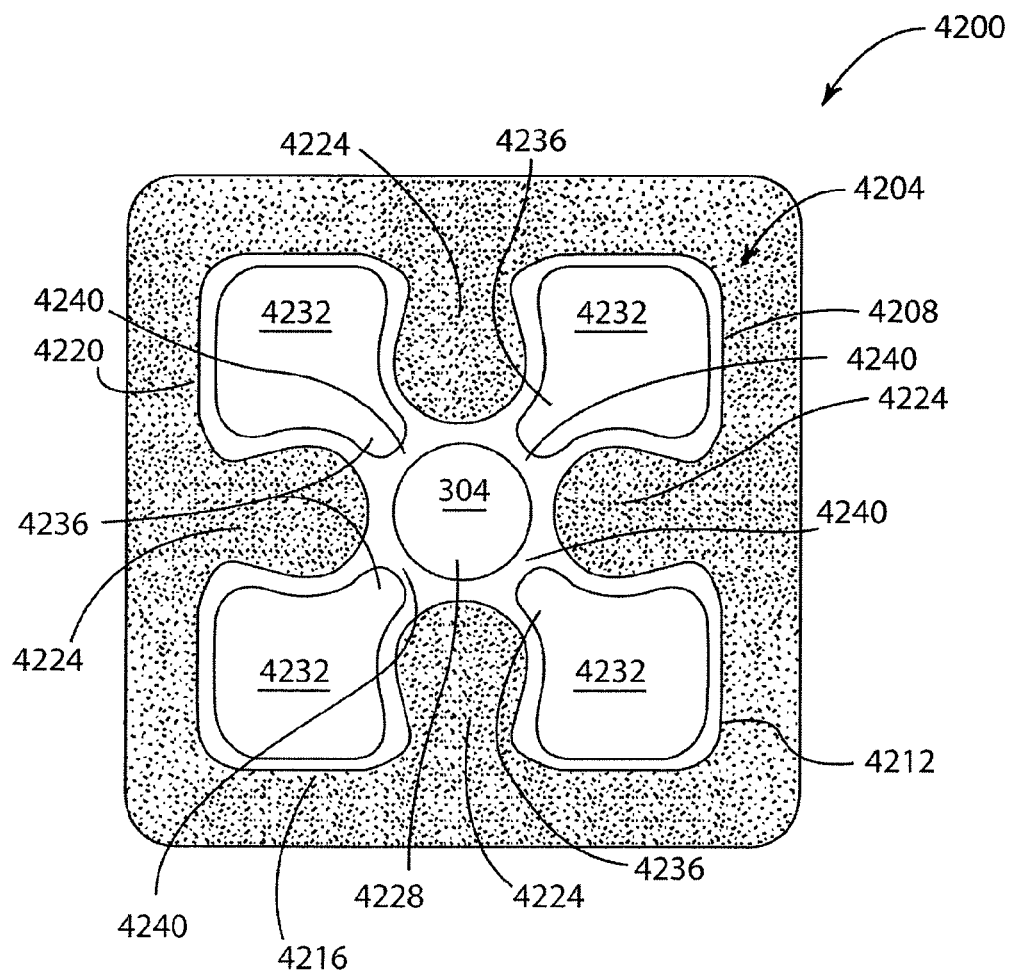
Figure 43:
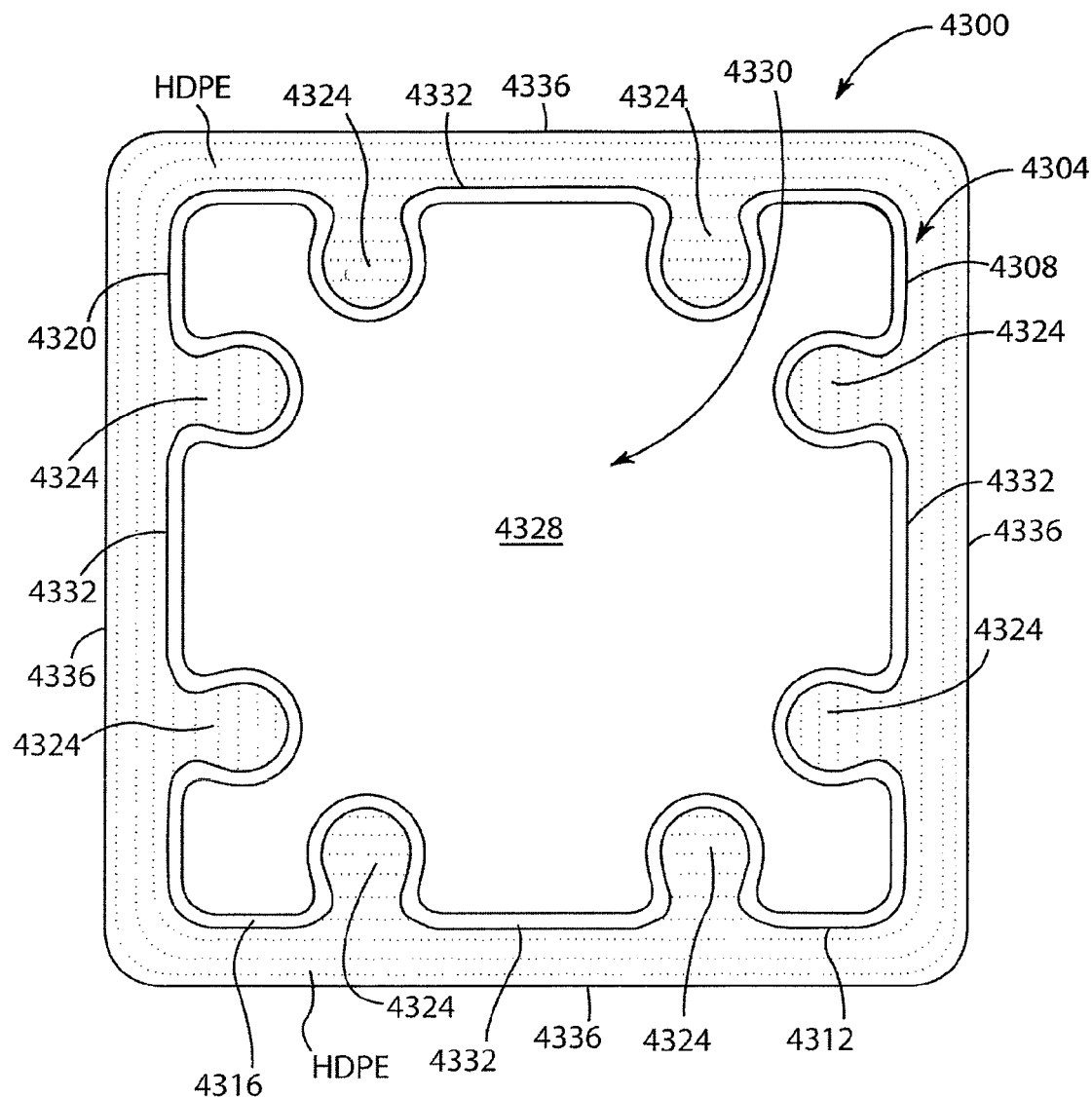

Referring now to FIGS. 41-43, and in accordance with embodiments of the present invention, a series of posts are shown, the posts including a reinforcing member. The posts shown in FIGS. 41-43 may include a reinforcing member comprising foamed glass-reinforced polyurethane with or without the hollow regions. Referring to FIG. 41, an elevation view of post 4100 is shown, the post including a reinforcing member 4104 having a plurality of arms 4108, 4112, 4116 and 4120, where the arms are substantially lobe or prong-shaped. The arms 4108, 4112, 4116 and 4120 are separated by saddle areas 4124, and such saddle areas and arms may extend in the third dimension (i.e., into the page of the drawing). The reinforcing member 4104 is preferably hollow; alternatively, it may be filled with another material, such as a foam. The hollow area 4128 of reinforcing member 4104 extends from the central core 304 to the interior of the arms 4108, 4112, 4116 and 4120. A thermoplastic material such as HDPE surrounds the lateral sides of the reinforcing member 4104 and resides within the saddle areas 4124.

Referring now to FIG. 42, yet another embodiment of a post 4200 is shown, the post including reinforcing member 4204. As with post 4100, post 4200 includes a reinforcing member 4204 having a plurality of arms 4208, 4212, 4216 and 4220, where the arms are substantially lobe or prong-shaped. The arms 4208, 4212, 4216 and 4220 are separated by saddle areas 4224, and such saddle areas and arms may extend in the third dimension (i.e., into the page of the drawing). The reinforcing member 4204 includes a central core 304 having a center hollow region 4228. The plurality of arms 4208, 4212, 4216 and 4220 include arm hollow areas 4232, and the arm hollow areas 4232 narrow at a neck region 4236 between the center area of the arm hollow areas 4232 and the central hollow region 4228. A separation section 4240 divides the arm hollow areas 4232 from the central hollow region 4228 at the location where the arms 4208, 4212, 4216 and 4220 meet the central core 304 of the structural reinforcing member 4204. Any of the hollow regions 4228 and/or 4232 may be filled with another, such as a foam.

Referring now to FIG. 43, still yet another embodiment of a post 4300 is shown, the post including reinforcing member 4304. Reinforcing member 4304 includes a plurality of arms 4308, 4312, 4316 and 4320, where the arms are substantially lobe or prong-shaped. The reinforcing member 4304 further includes a plurality of saddle areas 4324 along each side of the reinforcing member 4304. More particularly, each of the arms 4308, 4312, 4316 and 4320 are separated by more than one saddle area 4324, and such saddle areas and arms may extend in the third dimension (i.e., into the page of the drawing). Although not shown, embodiments of the present invention may alternatively include a single saddle area 4324 along at least one side, and a plurality of saddle areas 4324 along at least one of the other sides of the reinforcing member. Thus, as one skilled in the art will appreciate, a variety of configurations are possible, and such variations are encompassed within the scope of the present invention. The reinforcing member 4304 is preferably hollow; alternatively, it may be filled with another material, such as a foam or concrete. The hollow area 4328 of reinforcing member 4304 extends from the central region 4330 of the reinforcing member 4304 to the interior of the arms 4308, 4312, 4316 and 4320. Alternatively, the central region 4330 of the reinforcing member 4304 may be divided into a plurality of discrete zones or cells (not shown). A thermoplastic material such as HDPE surrounds the lateral sides of the reinforcing member 4304 and resides within the saddle areas 4324. The area between the saddles area 4324 along a particular side of the reinforcing member 4304 may comprise an outermost surface 4332 that is substantially parallel to the exterior surface 4336 of the post 4300.

Figure 44A:
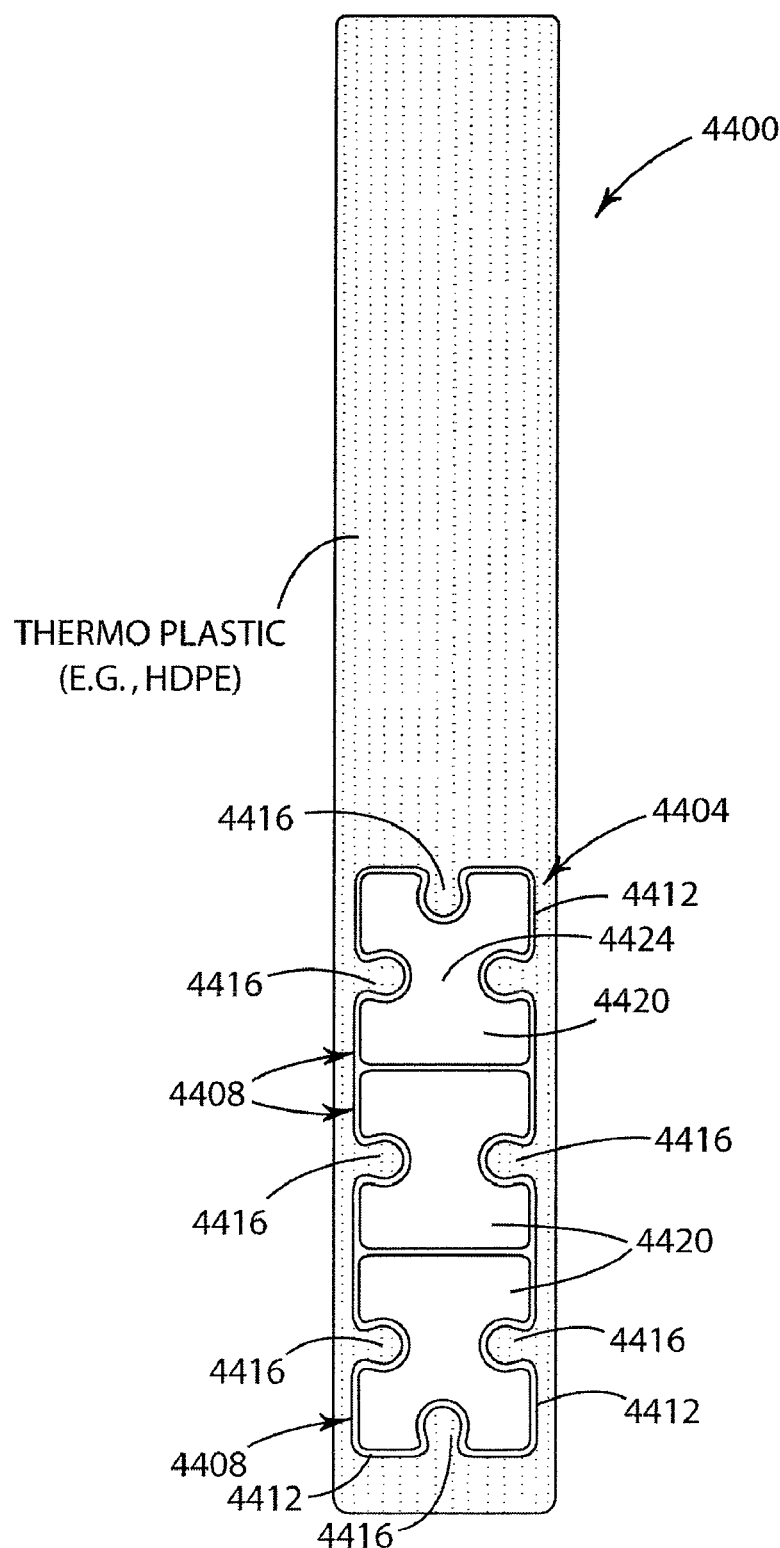
FIGS. 44A and 44B are a side elevation views of a structural member in accordance with embodiments of the present invention.
Figure 44B:
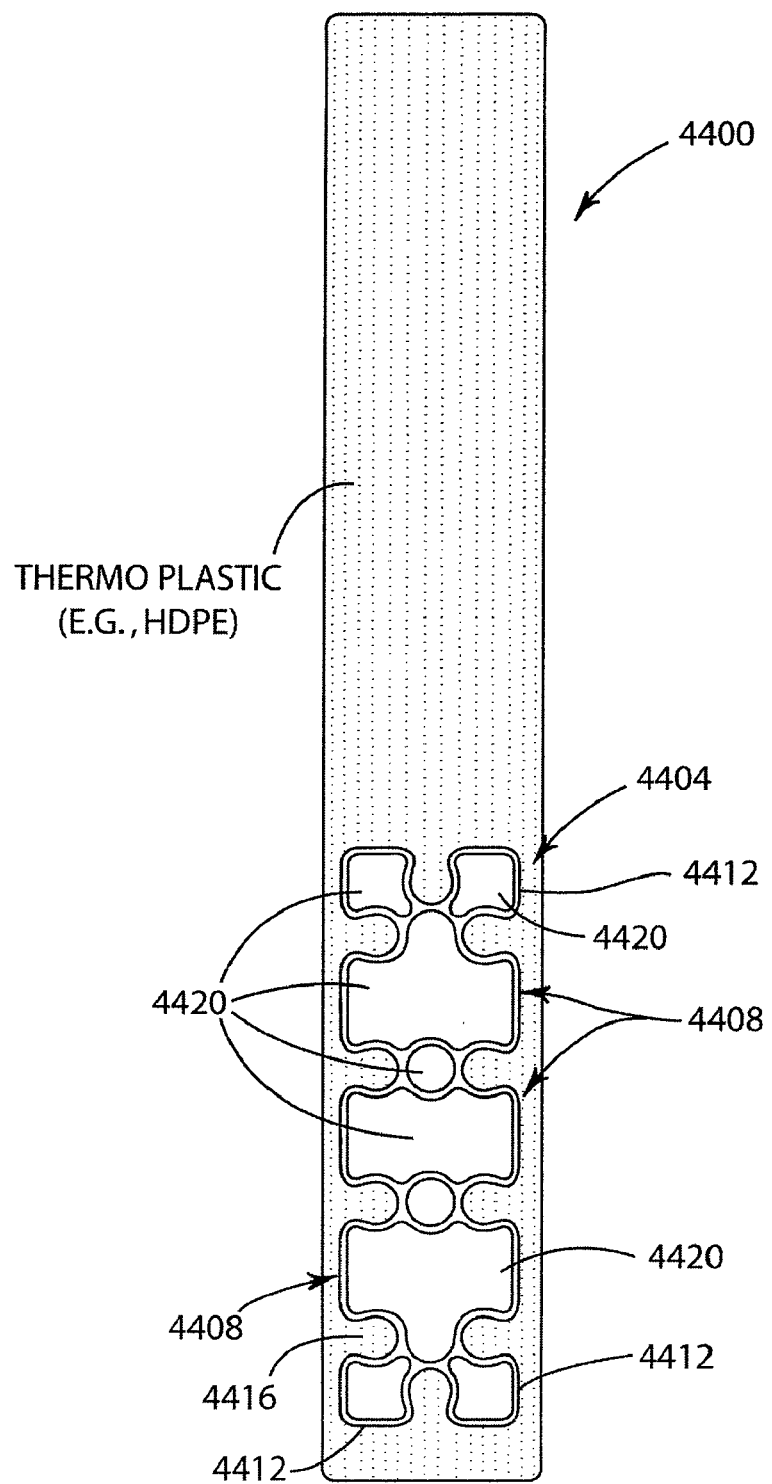

Referring now to FIGS. 44A and 44B, and in accordance with embodiments of the present invention, a horizontal member or stringer 4400 used to connect upright members is shown. The stringer 4400 may be used in the frame of a building. The stringer 4400 of the present invention comprises a reinforcing member 4404 located within a thermoplastic material, such as HDPE. The reinforcing member 4404 is generally limited to the lower portion of the stringer 4400. The reinforcing member 4404 of stringer 4400 includes a plurality of interconnected cells 4408, wherein the interconnected cells 4408 may comprise a plurality of arms 4412 and saddle areas 4416. In accordance with at least one embodiment of the present invention, each of the interconnected cells 4408 comprises one or more hollow areas 4420. As shown in FIG. 44A, the hollow areas 4420 may extend from the central area 4424 of the cell 4408 and into the arms 4412.

Alternatively, as shown in FIG. 44B, the hollow areas 4420 may be divided within one or more of the cells 4408 of the reinforcing member 4404. In at least one embodiment of the invention, the area within the reinforcing member 4404 is filled with a material, such as a foam. Alternatively, the stringer 4400 may include a reinforcing member comprising foamed glass-reinforced polyurethane with or without the hollow areas 4420.

Figure 45A:
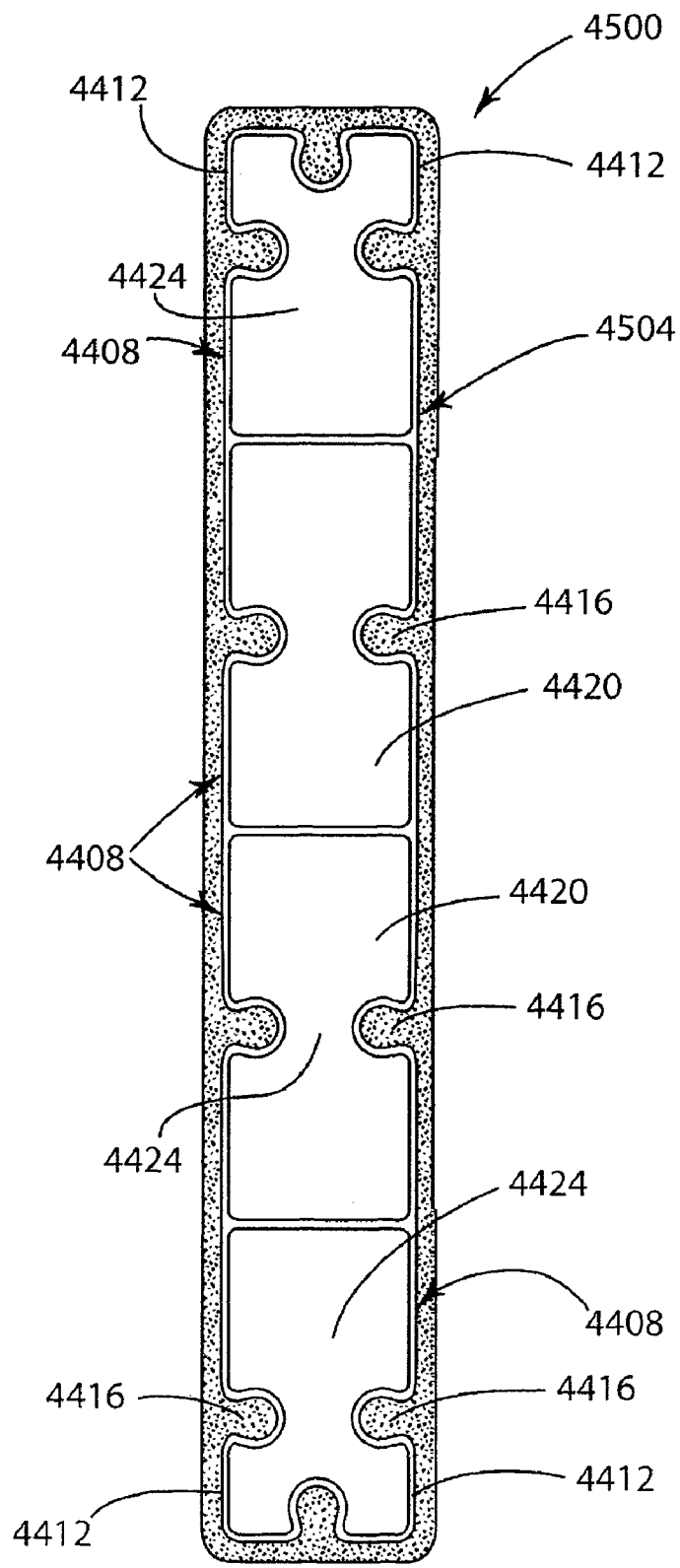
FIGS. 45A and 45B are a side elevation views of a structural member in accordance with embodiments of the present invention.
Figure 45B:
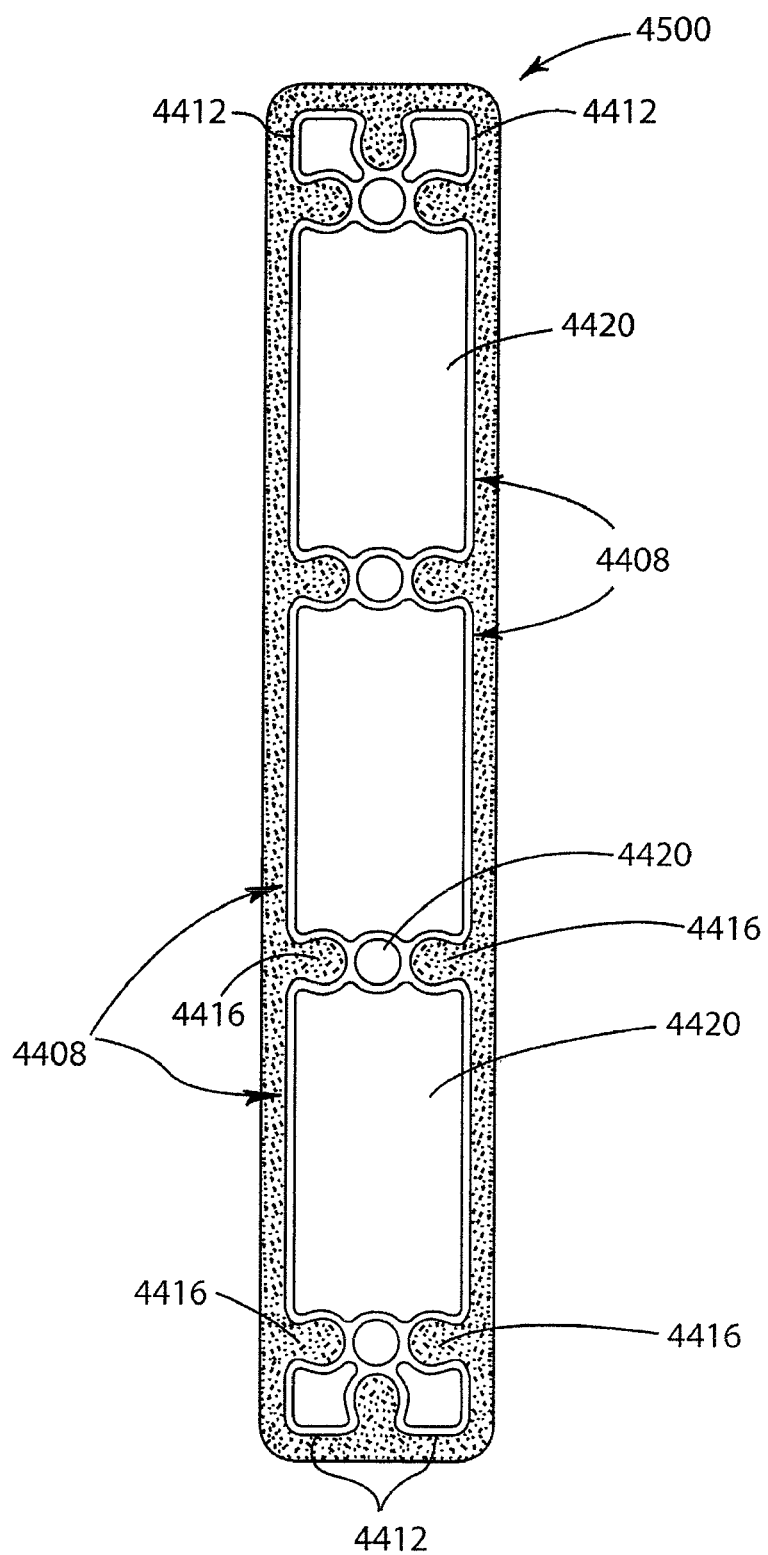

Referring now to FIGS. 45A-45C, and in accordance with embodiments of the present invention, a rim joist or ledger 4500 is shown. As with stringer 4400, the rim joist or ledger 4500 of the present invention comprises a reinforcing member 4504 located within a thermoplastic material, such as HDPE. The reinforcing member 4504 generally extends substantially the entire height of the ledger 4500, with the exception of the outer upper and lower surfaces of the reinforcing member that are surrounded by the thermoplastic material. The reinforcing member 4504 of ledger 4500 includes a plurality of interconnected cells 4408, wherein the interconnected cells 4408 may comprise a plurality of arms 4412 and saddle areas 4416. In accordance with at least one embodiment of the present invention, each of the interconnected cells 4408 comprise one or more hollow areas 4420. As shown in FIG. 45A, the hollow areas 4420 may extend from the central area 4424 of the cell 4408 and into the arms 4412. Alternatively, as shown in FIG. 45B, the hollow areas 4420 may be divided within one or more of the cells 4408 of the reinforcing member 4504. In at least one embodiment of the invention, the area within the reinforcing member 4504 is filled with a material, such as a foam.

Referring now to FIGS. 46A-46D, and in accordance with at least one embodiment of the present invention, a rim joist or ledger 4600 comprises a plurality of separated reinforcing members 4604, such as an upper reinforcing member 4604 and a lower reinforcing member 4604. The reinforcing member 4604 preferably comprise a plurality of arms, such as arms 308, 312, 316 and 320. The reinforcing member 4604 may also comprise one or more hollow areas 4608, or the area within the reinforcing member 4604 may be filled with another material, such as a foam. The ledger 4600 also preferably includes one or more hollow areas 4612 located within the interior of the ledger 4600. In accordance with at least one embodiment of the present invention, the upper half 4616 of the ledger 4600 includes reinforcing member 4604 and a hollow area 4612, and the lower half 4620 of the ledger 4600 includes a reinforcing member 4604 and a hollow area 4612. In accordance with embodiments of the present invention, the hollow areas 4612 may alternatively be filled with another material, such as a foam.

Figures 46E, 46F:
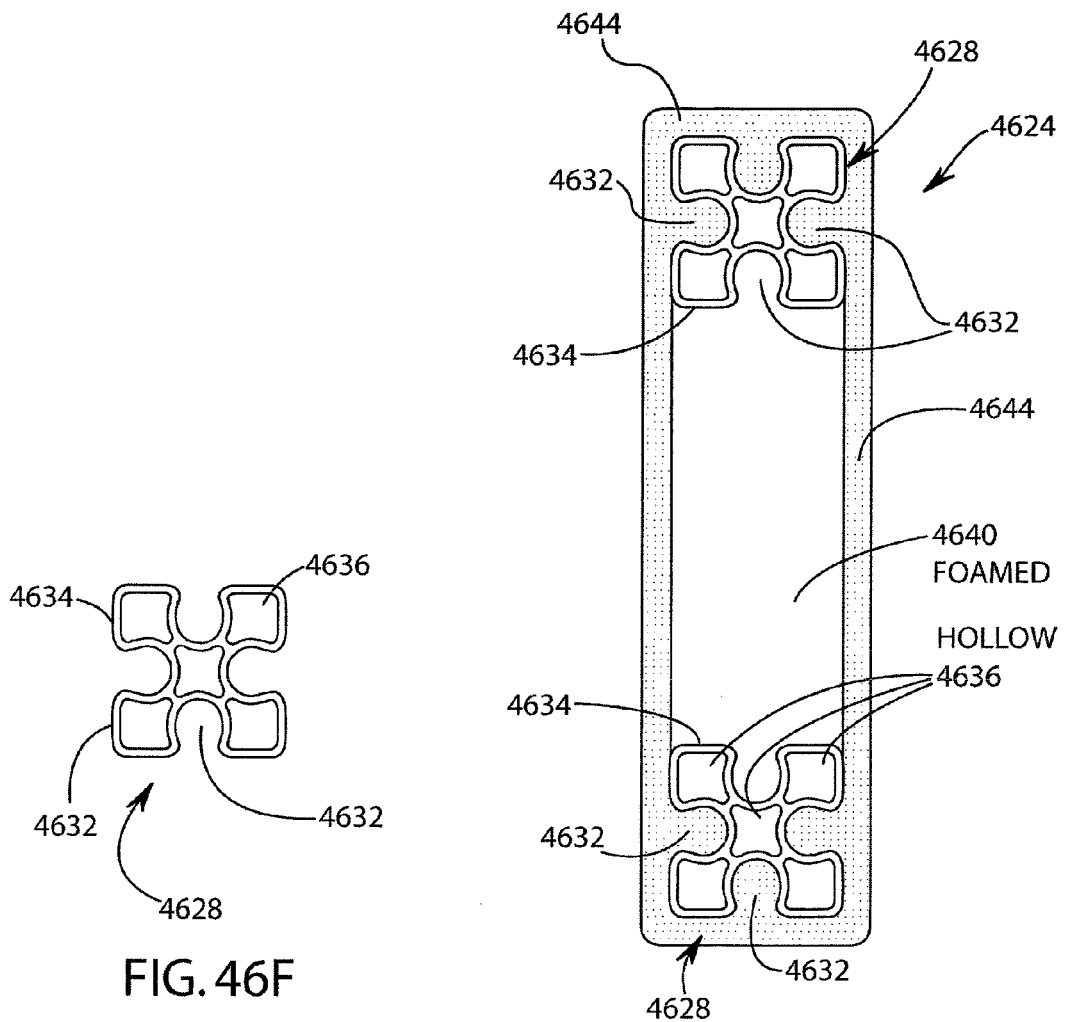
FIG. 46E is a side elevation view of a structural member in accordance with embodiments of the present invention.
FIG. 46F is a detail view of the reinforcing member shown in FIG. 46E.

Referring now to FIGS. 46E-46H, and in accordance with at least one embodiment of at least one or more of the inventions presented herein, a structural member is shown comprising a least one reinforcing member, a thermoplastic material around at least a portion of the reinforcing member, wherein a portion of the cross-sectional area of the structural member includes a foamed material, such as a foamed thermoplastic material. With reference to FIGS. 46E and 46G, a structural member comprising a rim joist or ledger 4624 is shown. The example ledger 4624 shown in FIG. 46E is sized as a 2×6 inch piece of dimensional lumber, with detail dimensions given for various elements or portions thereof. The example ledger 4624 shown in FIG. 46G is sized as a 2×10 inch piece of dimensional lumber, with detail dimensions given for various elements or portions thereof. It is to be understood that all dimensions are for exemplary and enablement purposes, and other dimensions are encompassed by the scope of the present invention. For example, other shapes and sizes of structural members and/or portions thereof, such as a 2×2, 2×4, 2×12, etc., pieces of dimensional lumber are within the scope of the present invention. For purposes of this description, a ledger is used, but other types of structural members are within the scope of the present invention.

The ledger 4624 comprises a plurality of separated reinforcing members 4628, such as an upper reinforcing member 4628 and a lower reinforcing member 4628. The reinforcing member 4628 preferably comprise a plurality of saddle areas 4632, wherein the saddle areas 4632 may comprise non-linear and/or accurate shaped surfaces, and/or may include a cross section that varies in dimension with distance from an exterior surface 4634 of the reinforcing member 4628. In one or more embodiments, the saddle areas 4632 may be separated by an arm, such as arms 308, 312, 316 and 320. Other shaped reinforcing members 4628 are within the scope of the present invention. The reinforcing member 4628 may also comprise one or more hollow areas 4636, or the area within the reinforcing member 4628 may be filled with another material, such as a foam.

The ledger 4624 also preferably includes one or more foamed areas 4640 located within the interior of the ledger 4624. As shown in FIGS. 46E and 46G, foamed area 4640 extends between at least a portion of the exterior surface 4634 of a first reinforcing member 4628 to at least a portion of the exterior surface 4634 of a second reinforcing member 4628. In at least one embodiment, the reinforcing member 4628 comprises a plurality of saddle areas 4632, and the foamed area 4640 extends within at least one saddle area 4632 of each reinforcing member 4628.

In at least one embodiment, the one or more foamed areas 4640 comprise a foamed thermoplastic material. Alternatively, the foamed area 4640 may be formed of a material other than a foamed thermoplastic. In at least one embodiment, the foamed area 4640 comprises between 30-70% by weight of the structural member; alternatively, between 40-60% by weight of the structural member; or alternatively, between about 45-55% by weight of the structural member.

In accordance with one or more embodiments of the present invention, the one or more foamed areas 4640 are adjacent one or more of (a) an outer layer of thermoplastic 4644, and (b) a reinforcing member 4628. In accordance with at least one embodiment, the one or more foamed areas 4640 contact at least a portion of a reinforcing member 4628, wherein the reinforcing member 4628 and the one or more foamed areas 4640 are surrounded in cross section by an outer layer of thermoplastic 4644.

The thermoplastic 4644 may be made of HDPE, PPE, another thermoplastic material, or a combination of materials. The thermoplastic material 4644 may or may not include further additives, such as talc and/or $CaCO_3$ that acts as a both a filler and strengthening material. In at least one embodiment of the invention, an additive such as talc is added to the thermoplastic 4644 to improve brittleness and/or modulus characteristics. Embodiments of the invention include 0 to 45 percent by weight talc, and more preferably, 20 to 40 percent by weight talc, and more preferably yet, 25 to 35 percent by weight talc, and still more preferably yet, 30 to 33 percent by weight talc.

In accordance with one or more embodiments of the present invention, the material forming the foamed area 4640 is co-extruded with the thermoplastic layer 4644 around and/or adjacent the one or more reinforcing members 4628.

Other types of structural members other than a rim joist or ledger may include a foamed area 4640.

Figure 47:
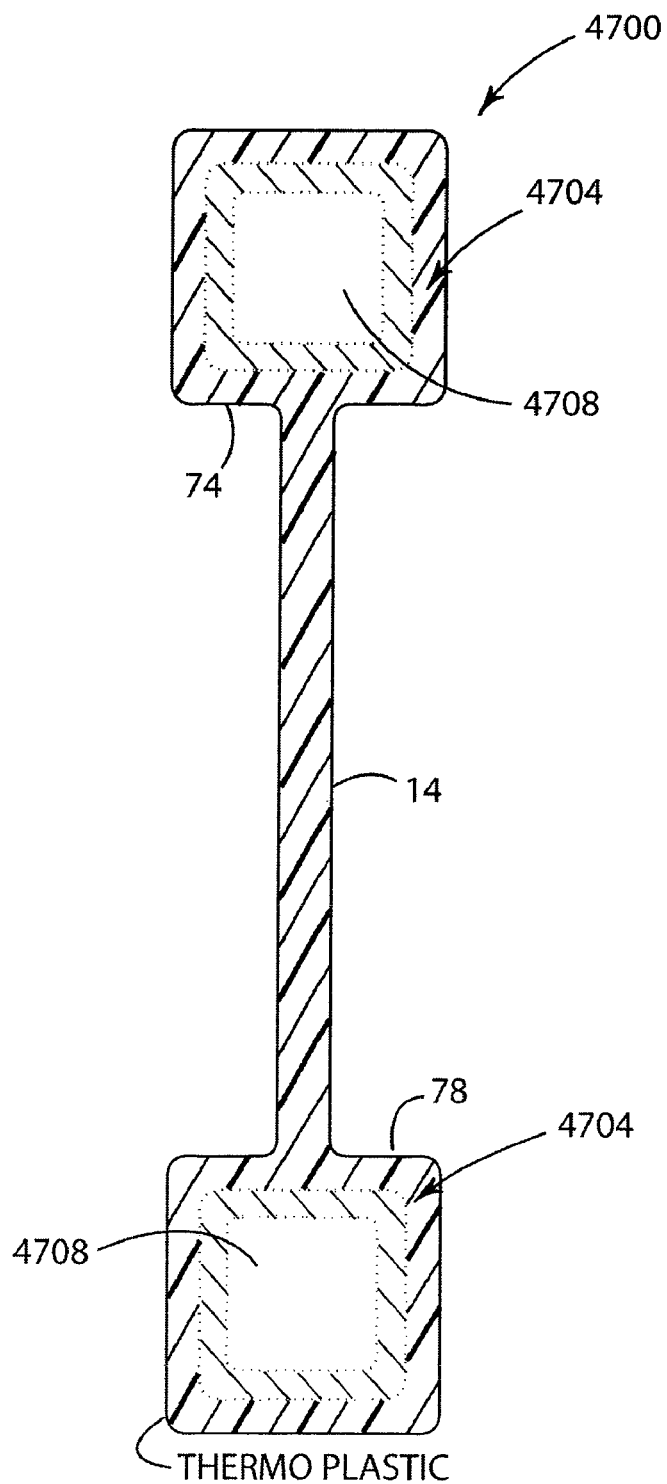
FIG. 47 is a cross-sectional view of an I-joist in accordance with embodiments of the present invention.

Referring now to FIG. 47, and in accordance with embodiments of the present invention, a cross-section of an I-joist 4700 is shown, the I-joist 4700 including flanges 74 and 78 having a composite glass-plastic reinforcing member 4704. It is to be understood that, although shown in an I-joist, a composite glass-plastic reinforcing member (or a foamed glass-reinforced polyurethane) may be used in all structural members described herein, including posts, pylons, rim joists, ledgers, beams, etc. In accordance with embodiments of the present invention, the composite glass-plastic reinforcing member 4704 comprises a continuous liquid glass (CLG) and polyurethane material. The CLG material has a liquid-like viscosity upon extrusion during the manufacturing process, but hardens as it cools. In at least one embodiment of the present invention, the CLG and polyurethane material is foamed during manufacture. In at least one embodiment of the present invention, the CLG and polyurethane material is not foamed during manufacture. In accordance with embodiments of the present invention, the composite glass-plastic reinforcing member 4704 forms a chemical bond when co-extruded with the surrounding thermoplastic material so that reinforcing member 4704 remains integrally secured to the surrounding thermoplastic material, even under loading conditions. In accordance with the various embodiments of the present invention, the thermoplastic material surrounding the reinforcing member(s) comprises a polypropylene (PP), wherein the PP may further comprise one or more fillers such as calcium carbonate and/or talc. When co-extruded, the thermoplastic structural member with the CLG polyurethane core/reinforcing member demonstrates attractive engineering properties, such as a significant modulus of elasticity.

Referring again to FIG. 47, the composite glass-plastic reinforcing member 4704 is shown as having a substantially square or rectangular cross-sectional shape; however, as one skilled in the art will appreciate, the composite glass-plastic reinforcing member 4704 may take an alternate shape, such as circular. In accordance with embodiments of the present invention, the interior area 4708 of the composite glass-plastic reinforcing member 4704 is hollow. Alternatively, the composite glass-plastic reinforcing member 4704 may be substantially solid and not contain any hollow area (with the exception of voids associated with the foaming process, if a foamed CLG and polyurethane material is used). Alternatively, the interior area of the composite glass-plastic reinforcing member 4704 may be filled with another material, such as a closed-cell foam. Although shown as squares or rectangles, the composite glass-plastic reinforcing member 4704 may be shaped differently, such as including a plurality of arms and/or saddle areas, or T-shaped or any other shape for a reinforcing member as shown and/or described in this detailed description.

Figure 48B:
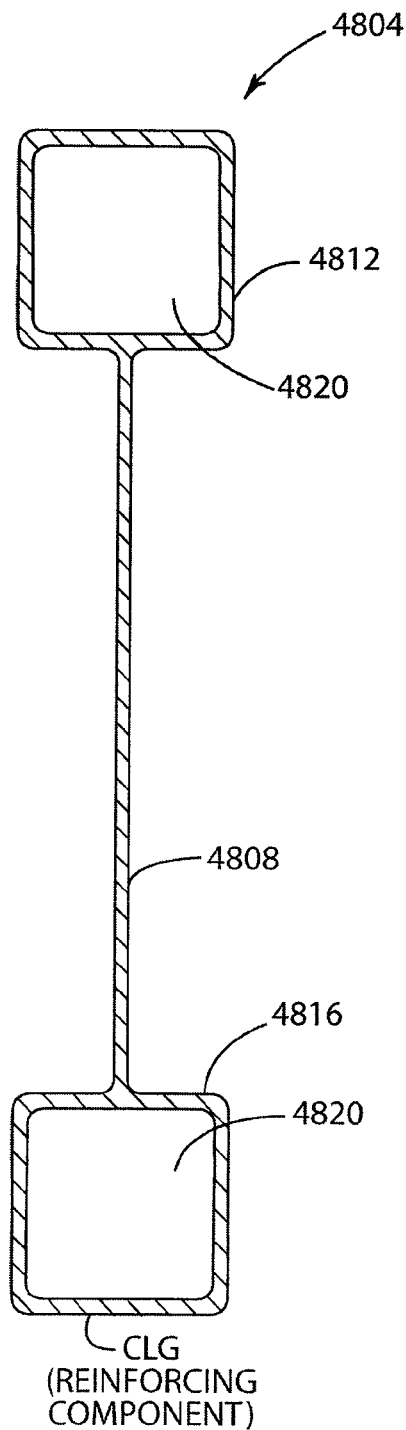
FIG. 48B is a cross-sectional view of the reinforcing member shown in FIG. 48A.
Figure 48A:
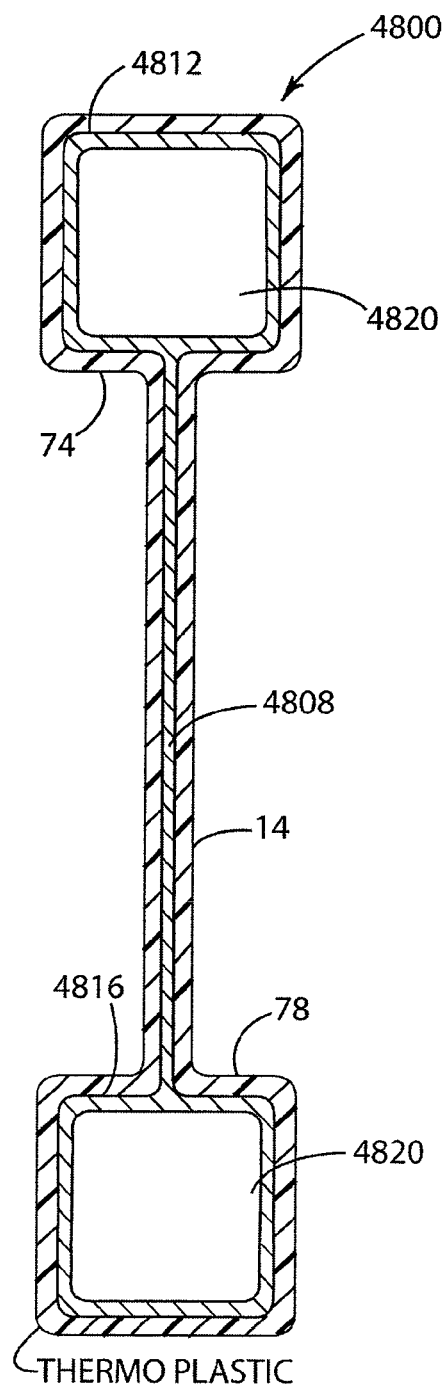
FIG. 48A is a cross-sectional view of an I-joist in accordance with embodiments of the present invention.

Referring now to FIGS. 48A and 48B, yet another I-joist 4800 in accordance with embodiments of the present invention is shown. The I-joist 4800 includes a reinforcing member 4804 that extends from upper flange 74 to lower flange 78, and includes a webbing portion 4808 interconnected to an upper flange reinforcing member 4812 and a lower flange reinforcing member 4816. The reinforcing member 4804 is surrounded in cross-section by a thermoplastic material, such as PP that may further comprise one or more fillers such as calcium carbonate and/or talc. The upper and lower flange reinforcing members 4812 and 4816 include a hollow area 4820. Alternatively, the hollow areas may be filled with another material, such as a closed-cell foam. Although shown as squares or rectangles, the upper and lower flange reinforcing members 4812 and 4816 may be shaped differently, such as including a plurality of arms and/or saddle areas, or T-shaped or any other shape for a reinforcing member as shown and/or described in this detailed description.

Figure 49B:
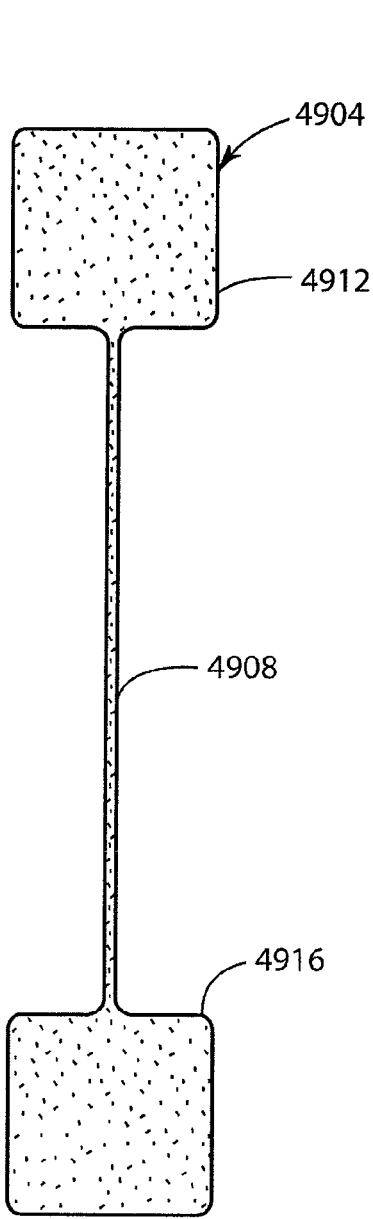
FIG. 49B is a cross-sectional view of the reinforcing member shown in FIG. 49A.
Figure 49A:
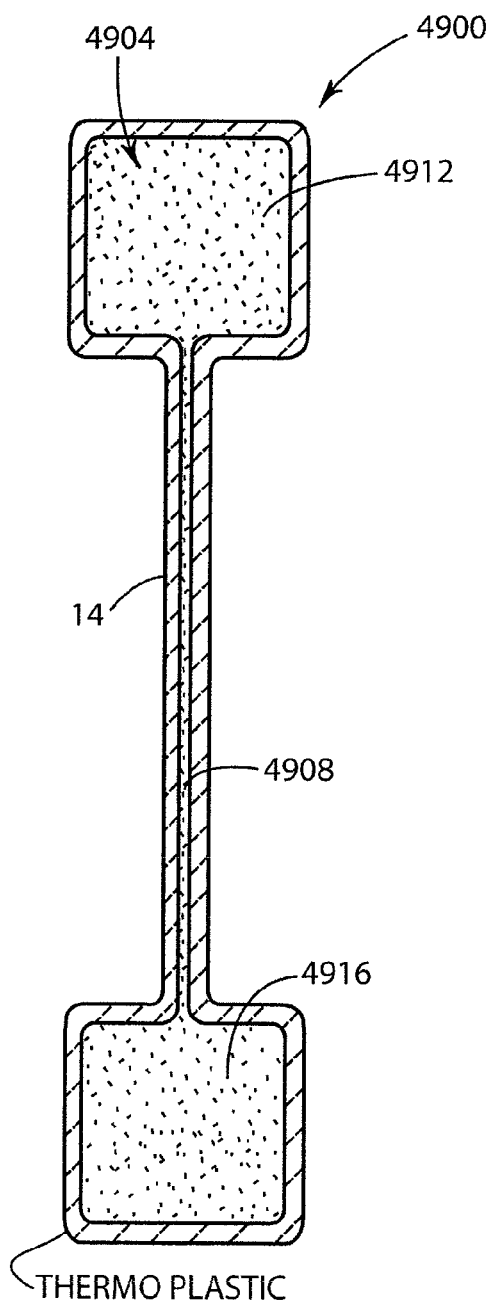
FIG. 49A is a cross-sectional view of an I-joist in accordance with embodiments of the present invention.

Referring now to FIGS. 49A and 49B, another I-joist 4900 in accordance with embodiments of the present invention is shown. The I-joist 4900 includes a reinforcing member 4904 that extends from upper flange 74 to lower flange 78, and includes a webbing portion 4908 interconnected to an upper flange reinforcing member 4912 and a lower flange reinforcing member 4916. The reinforcing member 4904 is surrounded in cross-section by a thermoplastic material, such as PP that may further comprise one or more fillers such as calcium carbonate and/or talc. The upper and lower flange reinforcing members 4912 and 4916 comprise a foamed glass-reinforced polyurethane. Although shown as squares or rectangles, the upper and lower flange reinforcing members 4912 and 4916 may be shaped differently, such as including a plurality of arms and/or saddle areas, or T-shaped or any other shape for a reinforcing member as shown and/or described in this detailed description.

The various reinforcing members described herein may comprise different materials. As for example, the reinforcing members may comprise a metal alloy, such as steel, or aluminum or an aluminum alloy, or it may comprise another structurally reinforcing material, such as carbon fiber or glass-reinforced polyurethane. The glass-reinforced polyurethane may be foamed to reduce its weight and to provide other advantageous engineering properties. The reinforcing members may be solid, or alternatively, it may comprise void spaces or hollow areas. Thus, by way of example, for reinforcing member 3000, the central region 304 may comprise a central hollow area 3020. In addition, the arms 308, 312, 316, and 320 may also include arm hollow areas 3024. Alternatively, the hollow areas 3020 and 3024 may later be at least partially filled with another material, such as a foam.

Referring now to FIG. 33, and in accordance with embodiments of the present invention, an I-joist 3300 is shown, the I-joist 3300 preferably includes a reinforcing member within in the upper flange 74 and lower flange 78. The reinforcing member used in the flanges may comprise any of configurations described herein. For the embodiment shown in FIG. 33, the webbing 3304 between the flanges 74, 78 comprises one or more hollow portions 3308. For the embodiment depicted in FIG. 33, the webbing 3304 includes three hollow portions 3308 that are separated axially along the height of the webbing 3304. An I-joist having webbing 3304 with hollow portions 3308 has potentially applicability for structures with appropriate loading conditions.

Figure 34A:
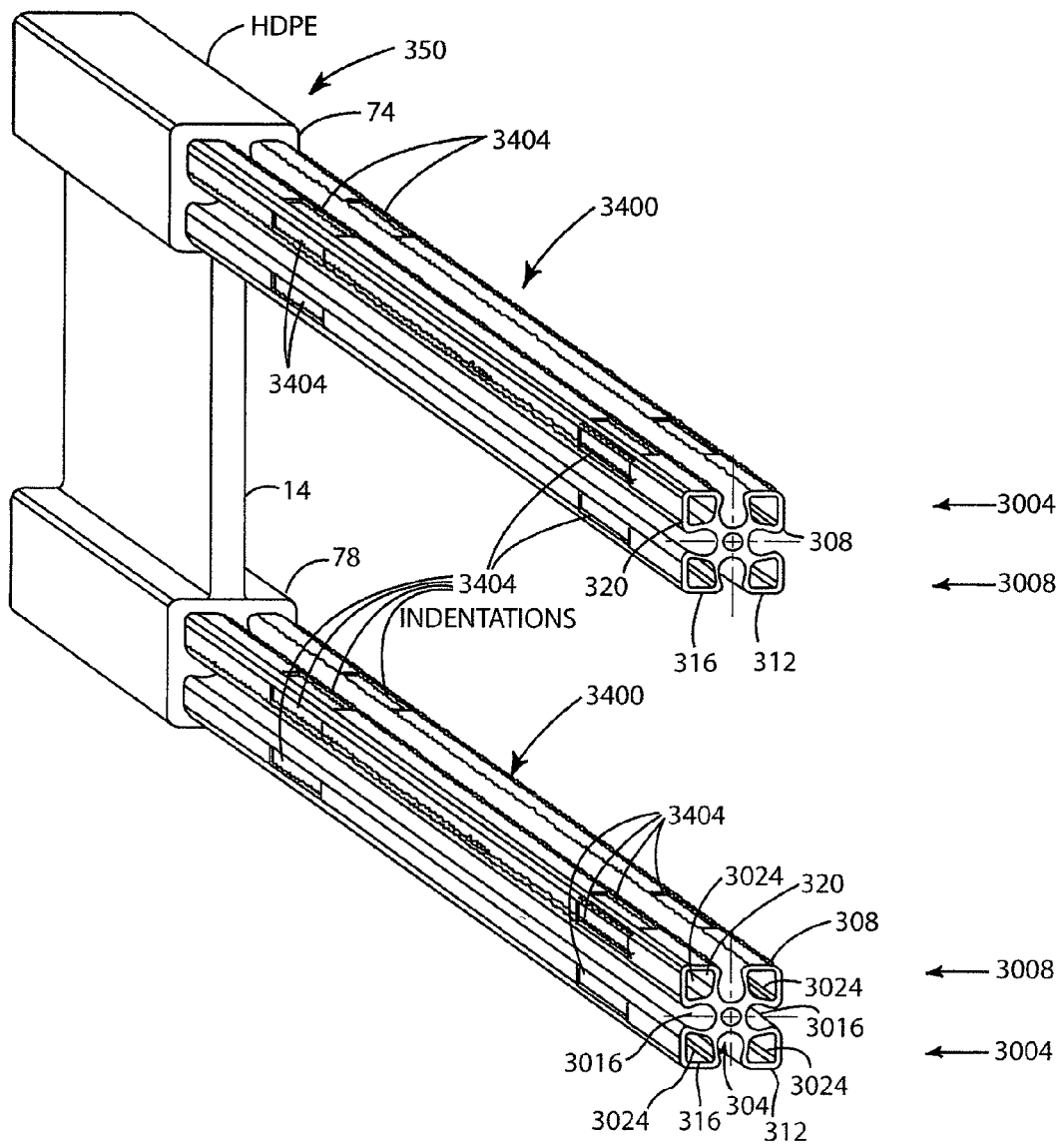
FIG. 34A is a side perspective view of an I-joist in accordance with embodiments of the present invention, wherein the thermoplastic material has been omitted from an end of the I-joist to show the reinforcing members.
Figure 34B:
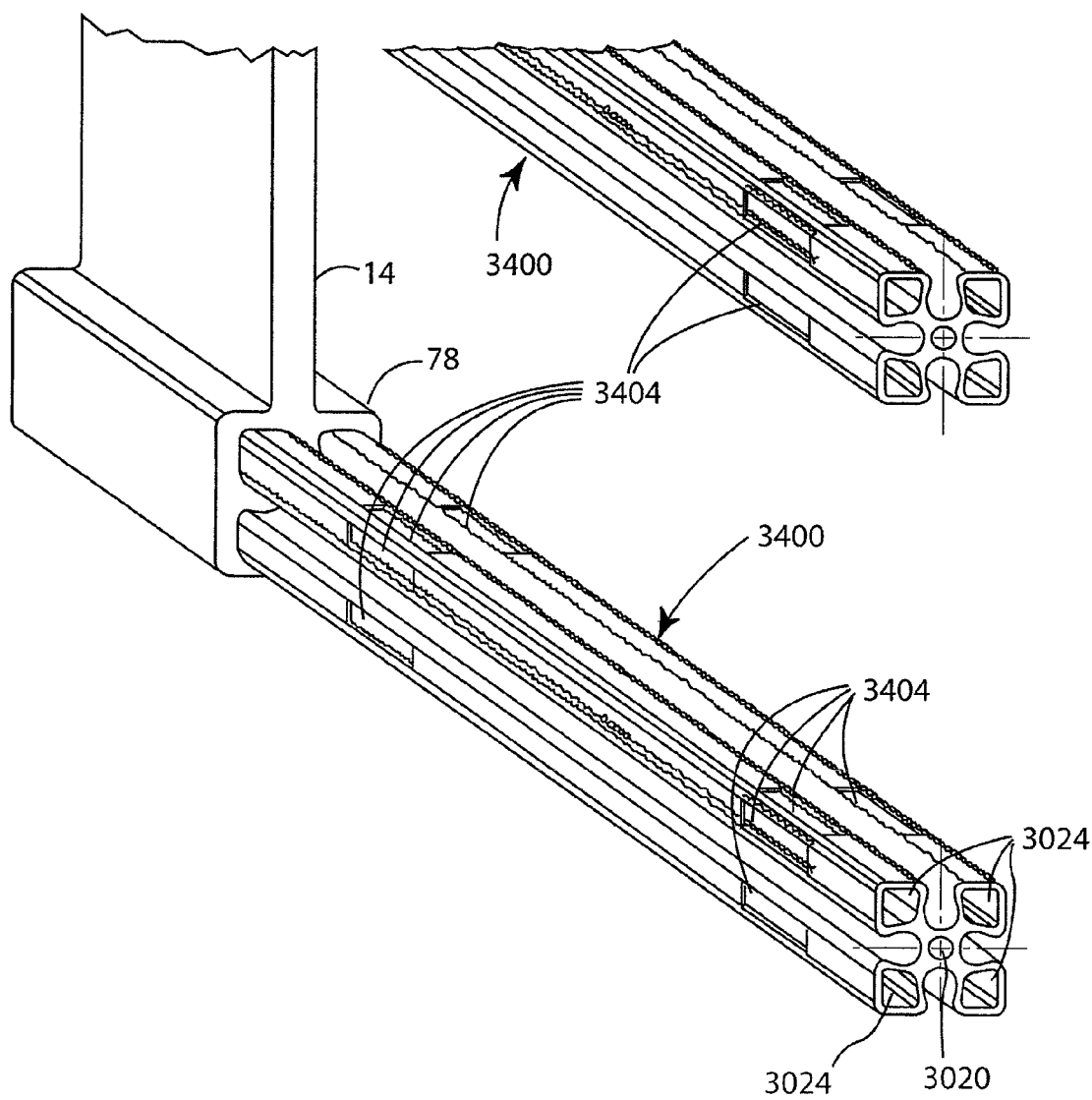
FIG. 34B is an enlarged view of portions of the I-joist shown in FIG. 34A.
Figure 34C:
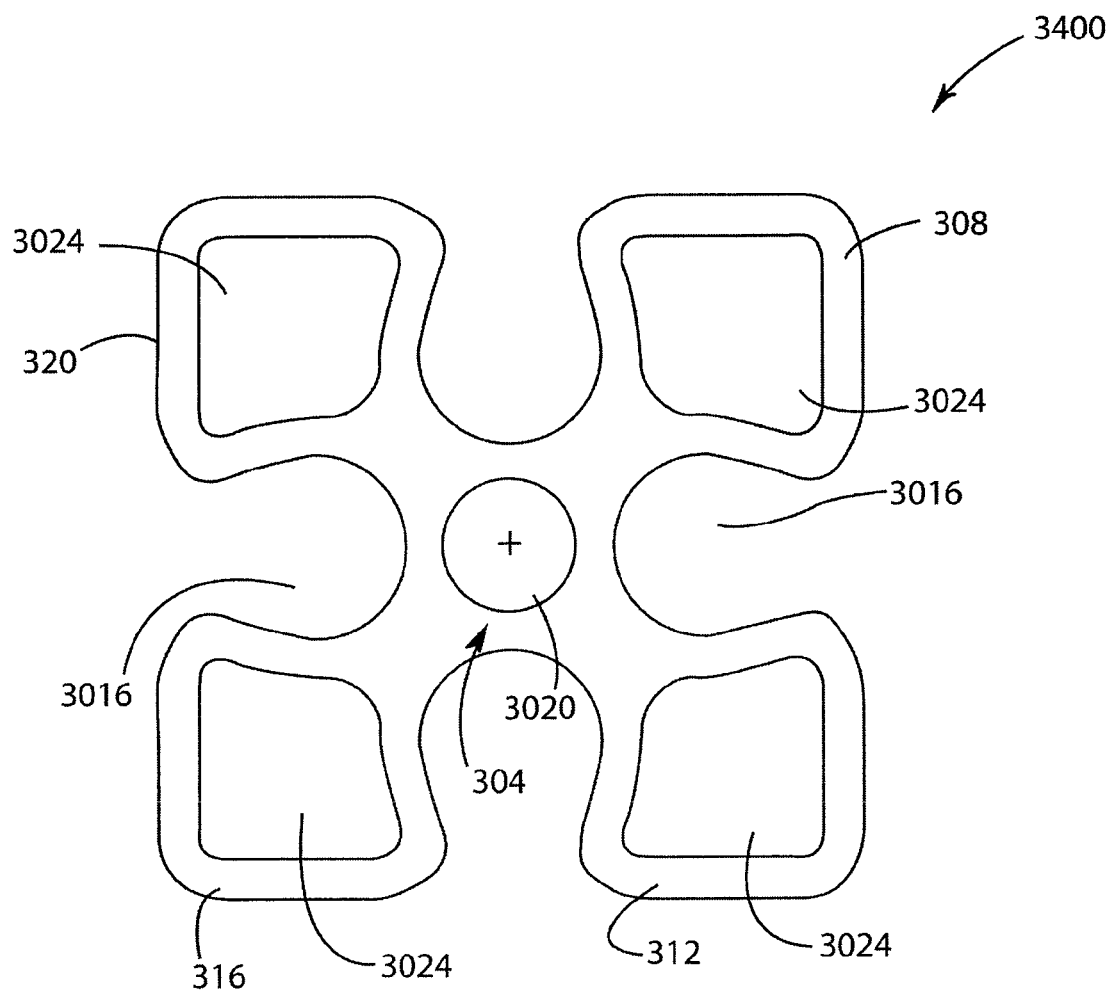
FIG. 34C is an enlarged view of a non-indented portion of the reinforcing member shown in FIG. 34A.

Referring now to FIG. 34A, and in accordance with embodiments of the present invention, an I-joist 350 is shown in perspective view, wherein the thermoplastic material is omitted from the I-joist 350 at one end of the I-joist so that the reinforcing member 3400 can be illustrated. FIG. 34B provides an enlarged view of portions of the I-joist 350 shown in FIG. 34A. The reinforcing member 3400 includes a first region 3004 and a second region 3008 wherein the first region 3004 is located further away from the webbing 14 than the second region 3008. For the I-joist 350 shown in FIG. 34A, the reinforcing member 3400 comprises a plurality of arms. More particularly, similar to the reinforcing member 300 shown in FIG. 16, reinforcing member 3400 includes a plurality of arms extending from a central core 304. In accordance with illustrative embodiments of the present invention, reinforcing member 3400 includes four arms, including a first arm 308, a second arm 312, a third arm 316, and a fourth arm 320. FIG. 34C provides an enlarged side elevation view of the reinforcing member 3400. Therefore, for the upper flange 74 of the I-joist 350, first region 3004 comprises first arm 308 and fourth arm 320, while the second region 3008 comprises the second arm 312 and the third arm 316. For the lower flange 78 of the I-joist 350, first region 3004 comprises the second arm 312 and the third arm 316, while the second region 3008 comprises first arm 308 and fourth arm 320. The first arm 308 is preferably situated substantially opposite third arm 316, and second arm 312 is also preferably situated substantially opposite fourth arm 320.

Figure 34D:
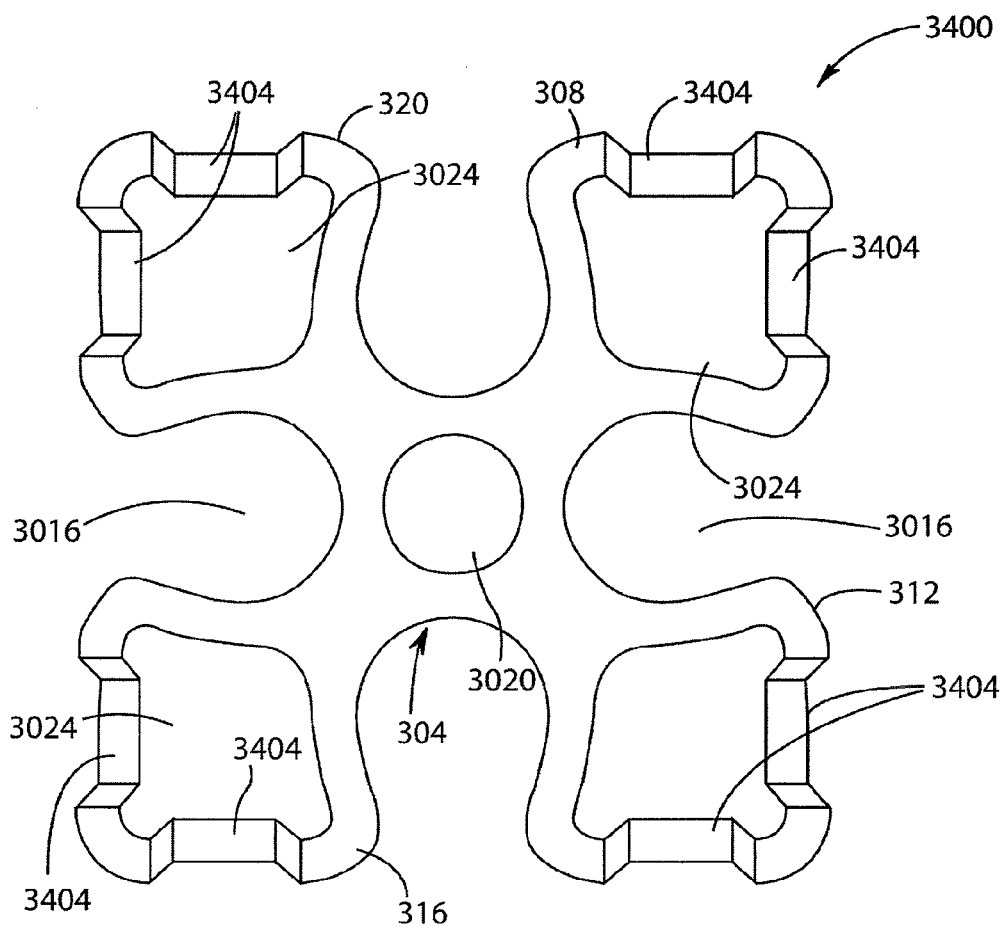
FIG. 34D is an enlarged view of an indented portion of the reinforcing member shown in FIG. 34A.

In accordance with embodiments of the present invention, the reinforcing member 3400 may comprise one or more features for promoting the mechanical bonding or coupling of the thermoplastic material to the material of the reinforcing member. Thus, in at least one embodiment of the present invention, the HDPE is extruded around the reinforcing member, wherein no adhesives or tape are used to facilitate bonding between the HDPE and the reinforcing member, which may comprise an variety of materials, such as carbon fiber, glass-reinforced polyurethane, aluminum or a metal alloy, such as an aluminum alloy. For the reinforcing member 3400, indentations 3404 are provided along the longitudinal length of the arms 308, 312, 316 and 320. The indentations 3404 of reinforcing member 3400 provide for mechanical bonding between the HDPE and the reinforcing member 3400. More particularly, two indentations 3404 are located on each arm 308, 312, 316 and 320, wherein the indentations 3404 are positioned on exterior surfaces of each of the arm 308, 312, 316 and 320. In accordance with at least one embodiment of the present invention, the indentations 3404 are spaced apart along the longitudinal length of the reinforcing member 3400. For one embodiment of the present invention, and by way of example and not limitation, as depicted in FIG. 34A, the indentations 3404 are about 1 inch long, are substantially trapezoidal in shape, and are spaced apart about 9 inches along the longitudinal length of the reinforcing member 3400. The indentations 3404 are preferably located on each arm 308, 312, 316 and 320 at substantially the same longitudinal position along the longitudinal length of the reinforcing member 3400. FIG. 34C illustrates an enlarged side elevation view of the reinforcing member where the indentations are not present, and FIG. 34D illustrates an enlarged side elevation view of the reinforcing member where the indentations 3404 are present. As can be seen in FIG. 34D, the indentations 3404 are recessed areas of the arms 308, 312, 316, and 320. Thus, in general, the configuration of the reinforcing member acts to allow the outer lobes or arms of the reinforcing member to pinch on the thermoplastic when under load, thereby making the combined materials collectively stronger than the two independently. This provides for vertical bonding. In addition, in accordance with embodiments of the present invention, the horizontal and added vertical bonding of the two materials is also achieved by providing indentations or scarification of one or more surfaces of the reinforcing member, thereby allowing the thermoplastic to enter the indentations and/or scarifications during extrusion, and subsequently harden to mechanically bond the two together. Adhesives and other materials may also be used if necessary, although such use is optional and depends upon the particular characteristics and intended use of a subject I-joist or structural member being considered. That is, the use of adhesives and other materials is not necessarily required or even preferred, however, their use in various embodiments of the present invention is not necessarily precluded either.

In accordance with embodiments of the present invention, the central core 304 of reinforcing member 3400 comprises a central hollow area 3020, and the arms 308, 312, 316 and 320 may also include arm hollow areas 3024. In accordance with embodiments of the present invention, the hollow areas 3020 and 3024 may later be at least partially filled with another material, such as a foam, and/or the hollow areas may act as conduit or acts as a pathway of other structures, such as wiring or cables, fibers, etc. In accordance with at least one embodiment of the invention wherein the reinforcing member comprises arms having hollow areas 3024, the indentations 3404 impinge on the hollow area 3024. One method of manufacturing the reinforcing members comprises debossing at least a portion the reinforcing member to form the indentations 3404. Debossing is the process of causing a depression in an object, for example, forming a depressed shape below the normal surface of a material. Alternatively, the reinforcing members may be subjected to a process known as coining to provide surface features along at least a portion of the longitudinal length of the reinforcing members. Coining is the squeezing of metal while it is confined in a closed set of dies. Therefore, in accordance with embodiments of the present invention, the reinforcing member 3400 includes indentations 3404 that are spaced apart along the longitudinal length of the reinforcing member 3400, wherein the indentations 3404 are caused by applying a force to the exterior of the reinforcing member 3400.

Figure 35:
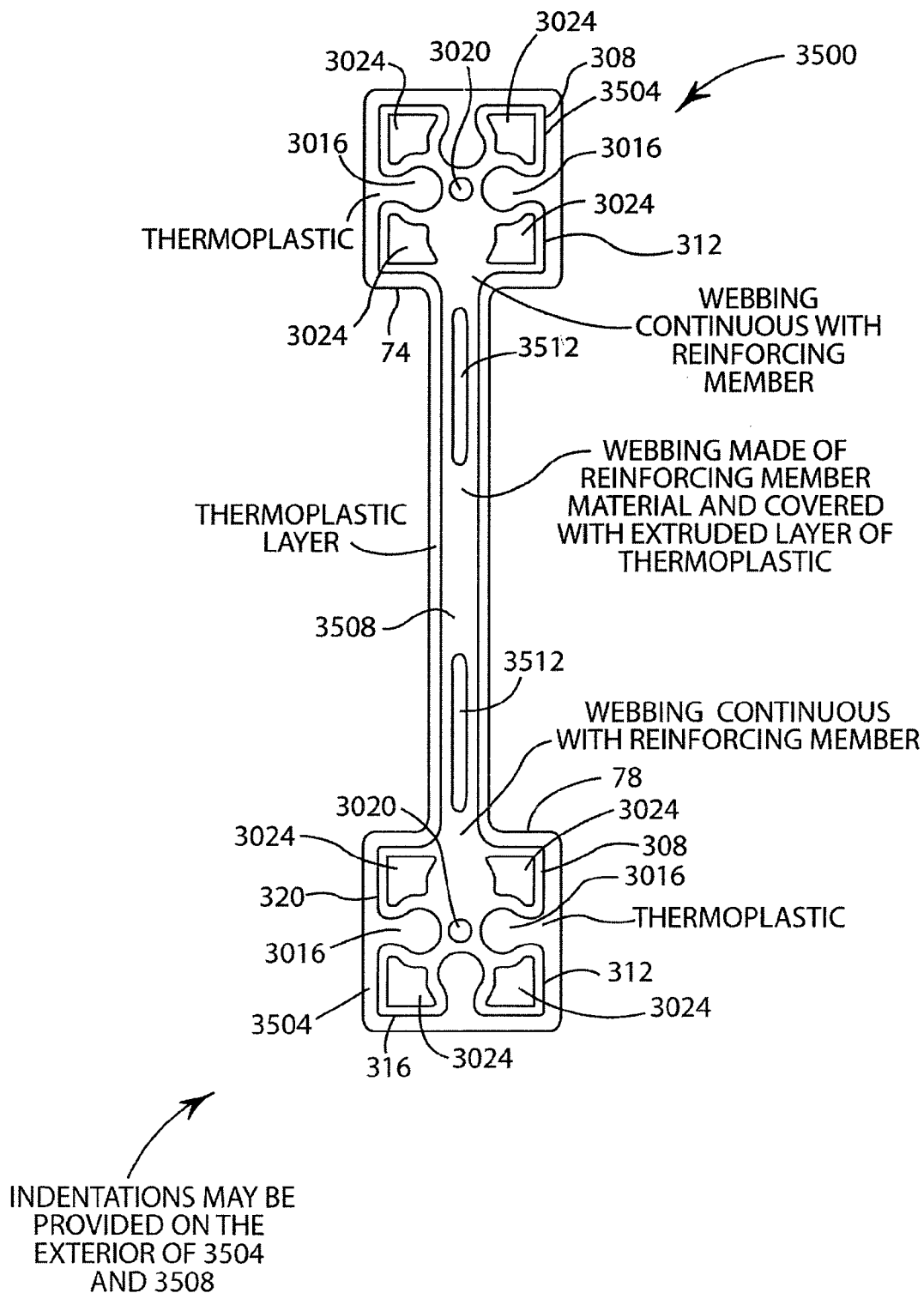
FIG. 35 is a side elevation view of an I-joist in accordance with embodiments of the present invention.

Referring now to FIG. 35, and in accordance with embodiments of the present invention, I-joist of the present invention may use a reinforced webbing continuous with the reinforced members located in the flanges 74 and 78. Accordingly, for the I-joist 3500 shown in FIG. 35, the reinforcing members 3504 include a webbing connection to a webbing reinforcing member 3508. In one preferred embodiment, the reinforcing members 3504 are co-extruded with the webbing reinforcing member 3508. Alternatively, the reinforcing members may be manufactured separately and then interconnected, such as by welding. The webbing reinforcing member 3508 may also include one or more webbing hollow areas 3512.

Figure 36A:
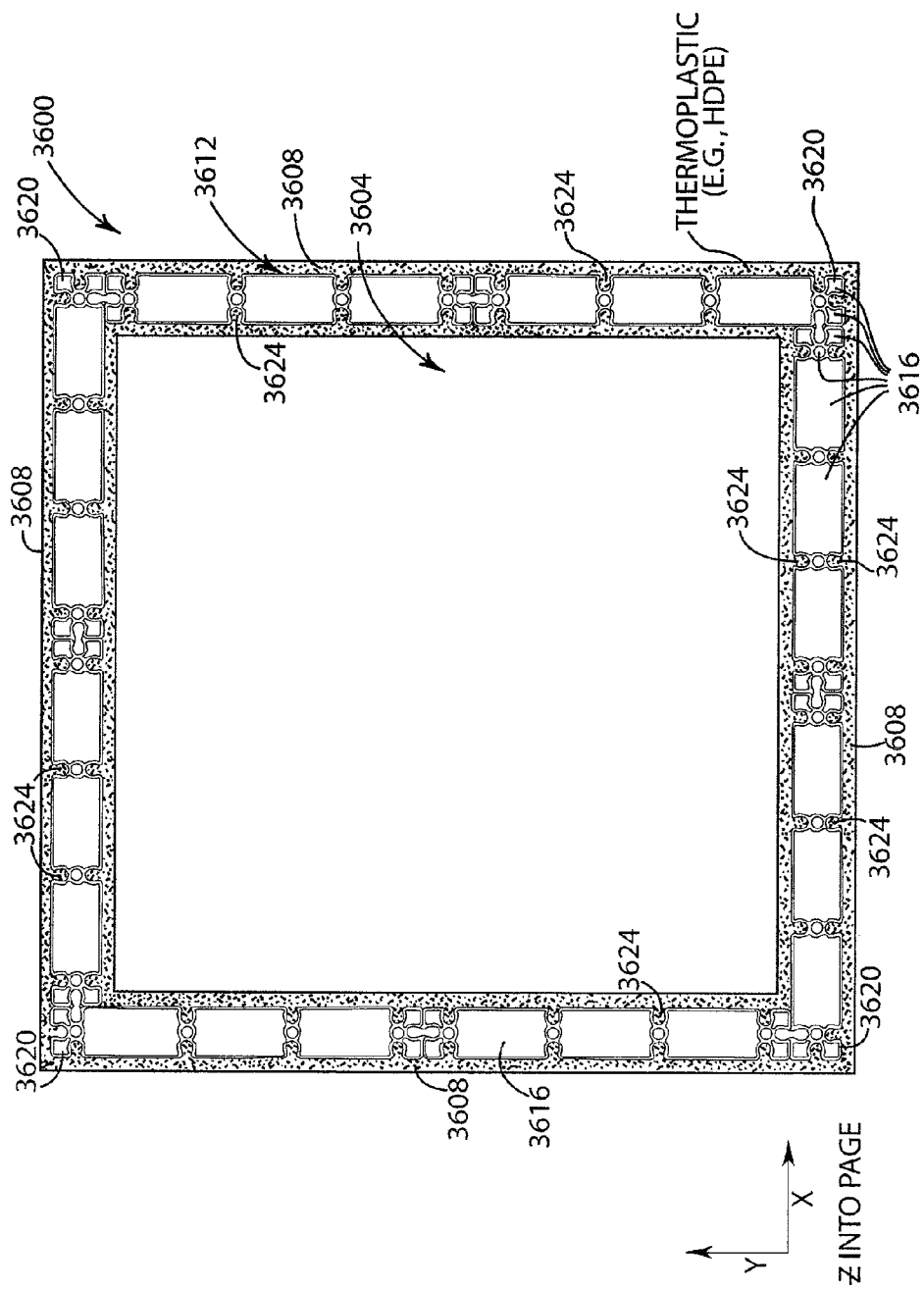
FIGS. 36A-36C are top plan views of a column, pier, or pylon in accordance with embodiments of the present invention.
Figure 36B:
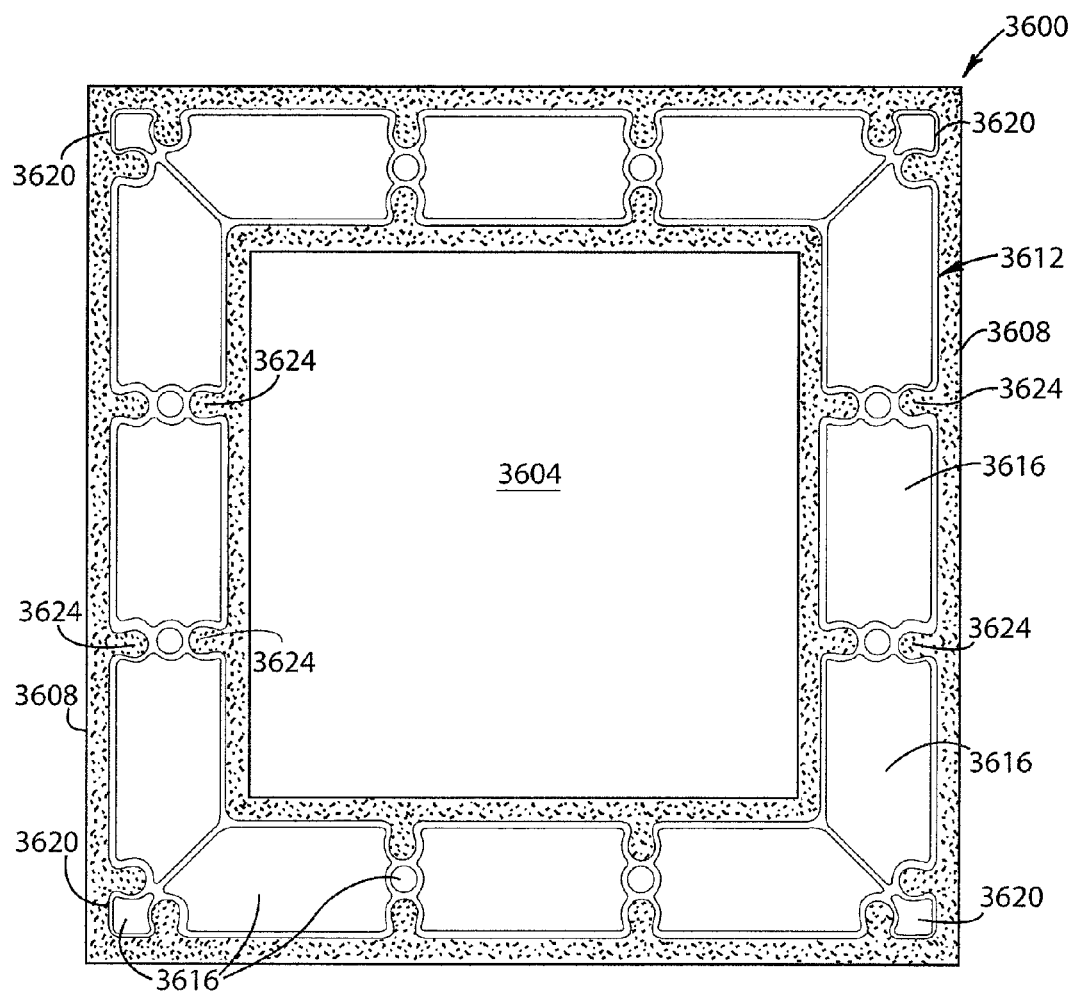
Figure 36C:
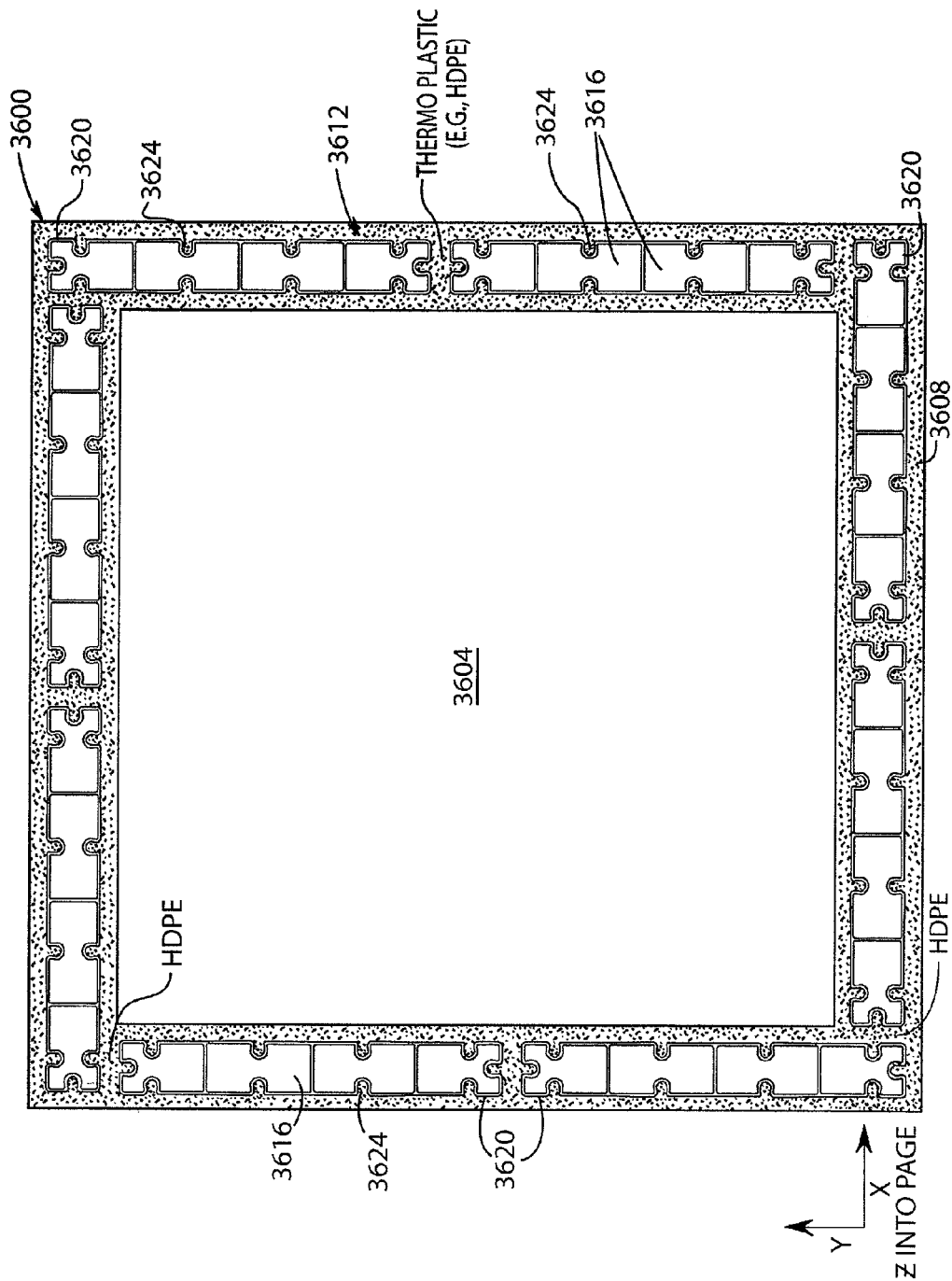

Referring now to FIG. 36A-36C, and in accordance with a separate embodiment of the present invention, a column, pier or pylon may be formed utilizing inventive features as provided herein. More particularly, columns, piers, or pylons 3600 have a side width of greater than 6 inches, such as 10 inches, 12 inches, 20 inches and larger, and preferably comprise a hollow center area 3604 surrounded by a wall 3608 comprising thermoplastic material. The wall 3608 of thermoplastic material incorporates a lattice reinforcing member 3612. In accordance with embodiments of the present invention, the lattice reinforcing member 3612 utilizes arms 3620 and saddle areas 3624 extending both in the x, y and z directions. The lattice reinforcing member 3612 may include one or more lattice hollow areas 3616. These lattice hollow areas 3616 may alternatively be filled with another material, such as slurry or foam. The arms 3620 and saddle areas 3624 in the x and y directions work to confine thermoplastic material when the pylon 3600 is under a lateral load. The arms 3620 and saddle areas 3624 in the z direction address compression of the column or tension from uplift caused by wind loading.

The pylon 3600 shown in FIG. 36A comprises a laterally continuous lattice reinforcing member 3612. The lattice reinforcing member 3612 of FIG. 36B is also continuous, but comprises an alternate configuration. The lattice reinforcing member 3612 shown in FIG. 36C is laterally discontinuous, at least at the elevation shown. That is, as shown in FIG. 36C, the lattice reinforcing member 3612 may comprise thermoplastic material that extends from an outer wall of the pylon 3600 to the inner wall of the pylon 3600. Thus, as one skilled in the art will appreciate, embodiments of the present invention may include a variety of shapes and features, and such alternate configurations are within the scope of the present invention.

The columns, piers, or pylons 3600 have particular application to use in large structures, including structures, bridges, or pier supports. Depending upon the use, the hollow center area 3604 may be filled with a variety of materials, including by way of example and not limitation, water, reinforcing supports extending from one interior surface to another, concrete, reinforced concrete, aggregate and/or other earthen materials such as rock or rip rap.

Combining a thermoplastic with a metal alloy, such as an aluminum alloy, or steel, or carbon fiber, or glass-reinforced polyurethane in the configurations shown and described herein provides functionality by increasing loading strength. Under compression or tension, the integral configuration of the structural members, flanges and the like, serves to resist movement from either, thereby improving load ratings. Hollow cores/reinforcing members enable achieving structurally sound members with some reduction of weight.

In accordance with embodiments of the present invention, at least one method of manufacture is also provided, the method comprising a unique process. As one example, the method of manufacture may comprise a dual extrusion in-line fabrication process. It will be appreciated that the various structural assemblies are described herein which generally may be referred to as structural members or load members, and are preferably formed in a sequence of separate steps. As an illustration, for example, web member 13 and flanges 26, 30, may be formed as respective structures prior to their assembly and formation of a structural member, such as I-joist 10. Likewise, web member 13, channel reinforcing members 64, 65 and flanges 26, 30, may be formed as respective structures prior to their assembly and formation of a structural member, such as I-joist 60. As a further example, any of reinforcing members 71, 86, 87, 109, or 110 may be formed as respective structures prior to formation of a structural member 82, 106, 106', or 114. As a further example, a reinforcing member 204, 300, or 300' may be formed as respective structures prior to formation of a structural member 200, 328 or 328'.

In accordance with another embodiment of the present invention, an illustrative method of manufacturing a structural support member having a rated deflection loading includes: (a) preparing a structural reinforcing member of at least length L for bonded integration into a structural support member of at least length L; (b) forming a structural support member preform by feeding the structural reinforcing member into a thermoplastic extruder and extruding the structural reinforcing member with a thermoplastic, wherein the thermoplastic is bonded to the surface of the structural reinforcing member along the length of at least L; and (c) controlledly cooling the extrusion-formed structural support member preform wherein the thermoplastic is bonded to the structural reinforcing member along the length of at least L and wherein the bonded thermoplastic and structural reinforcing member share the loading of the structural support member without separating along the at least length L when the structural support member is loaded to the rated deflection loading.

Practice of the invention may further include preparing the structural reinforcing member, to include forming an aluminum alloy extrusion with a non-uniform surface, the surface extending a length of at least L. The method may further include forming an aluminum alloy with a non-uniform surface that includes providing surface attributes that improve the bonding of the thermoplastic (or thermoplastic composites, such as amended HDPE) to the structural reinforcing member. The method may further include preparing the structural reinforcing member to include forming an aluminum alloy extrusion with a non-uniform surface, the surface extending a length of at least L. Furthermore, the method may include preparing the structural reinforcing member to include extruding the structural reinforcing member and adjusting its temperature by cooling.

In accordance with at least one embodiment of the present invention, to form the glass-reinforced polyurethane core material, liquid or molten glass is added to the tooling downstream of the extruded polyurethane to blend the two materials together. In accordance with embodiments of the present invention, the glass-reinforced polyurethane may be entrained with air or otherwise foamed to provide a lighter material that still exhibits advantageous engineering properties. By way of example and not limitation, one possible blend for the glass-reinforced polyurethane comprises 70% glass by weight and 30% polyurethane by weight. This blended material comprises the reinforcing member of various structural members as described herein, and for example, can serve as a substitute material for an aluminum alloy reinforcing member. The glass-reinforced polyurethane is then fed through a cross-head die to the surrounding thermoplastic comprising, for example, HDPE or PP, with or without fillers of calcium carbonate or talc. Engineering property assessments have been made on this core, with values of 6.5-7.2 Mpsi modulus, simulating properties of aluminum. The glass-reinforced polyurethane core/reinforcing member material also offers advantages over other materials, such as a metal alloy reinforcing core. More particularly, mechanical bonding between the core material and the surrounding thermoplastic is less significant of an issue because bonding between the glass-reinforced polyurethane core and the surrounding thermoplastic is achieved sufficiently through chemical bonding between the two materials, that is, the core and the surrounding thermoplastic.

Figure 25:
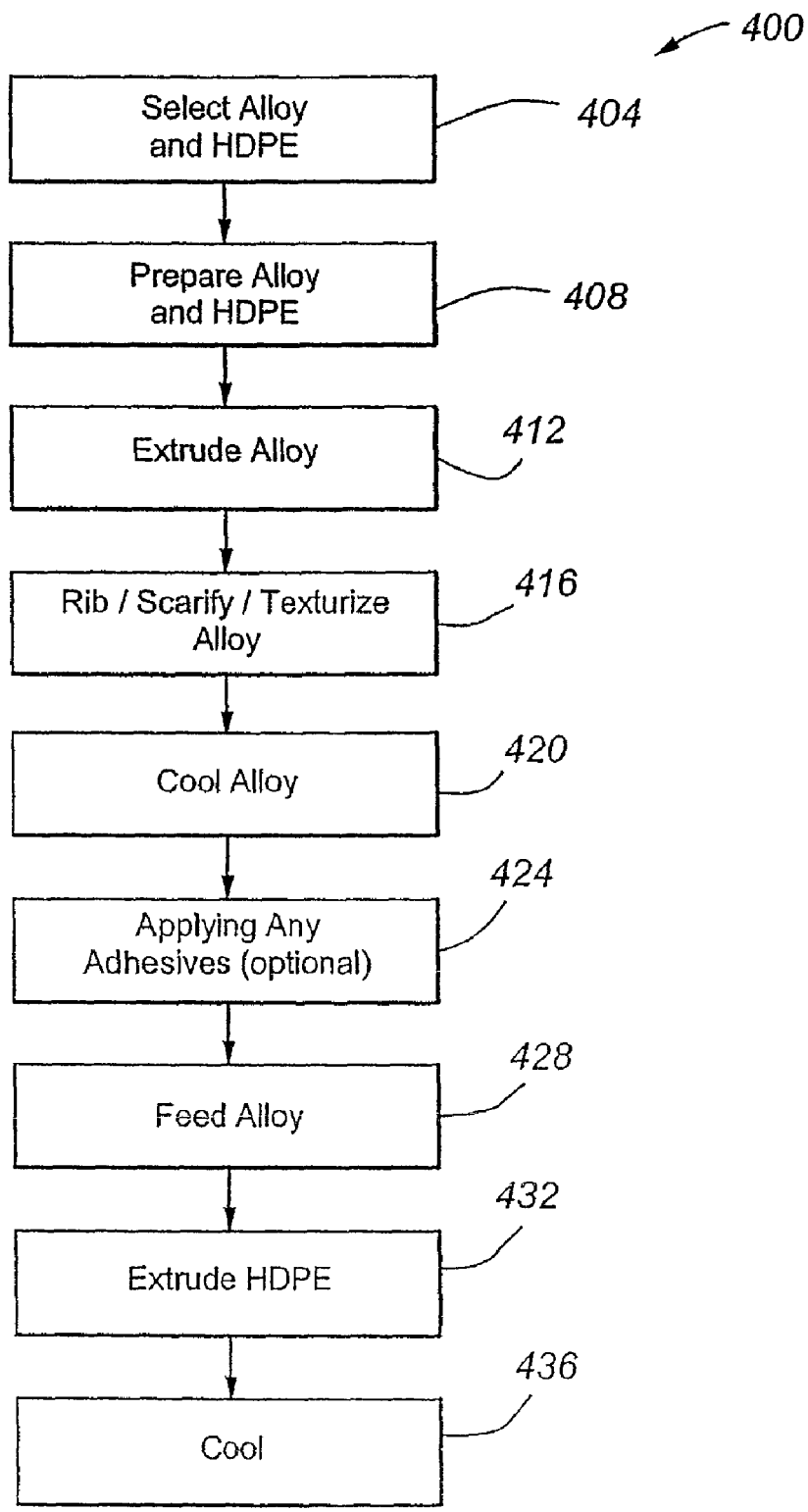
FIG. 25 shows an illustrative method of the present invention.

FIG. 25 shows an illustrative method 400 for forming a structural member of the invention, including: (a) the step 404 of selecting the structural member, including selecting a thermoplastic material, and a reinforcing member shape and material type; (b) the step 408 of preparing to manufacture the structural member, including preparation of resins and reinforcing materials; (c) the step 412 of extruding the reinforcing member, such as extruding an aluminum alloy or glass-reinforced polyurethane reinforcing member; (d) the step 416 of modifying, if appropriate, the reinforcing member, such as by adding partially or fully penetrating divots or apertures, scarifying at least a portion of the surface of the reinforcing member, and/or otherwise providing texturizing features to the reinforcing member that were not otherwise generated when the reinforcing member was extruded; (e) the step 420 of cooling the reinforcing member (which may occur before step (d) depending upon the materials used and the nature of the modifications performed in step 416); (f) the optional step 424 of adding any adhesives or bonding agents to at least a portion of the surface of the reinforcing member (such as may be necessary of a carbon fiber reinforcing member is used in combination with HDPE outer member); (g) the step 428 of feeding the reinforcing member, such as the aluminum alloy reinforcing member into the HDPE extruder; (h) the step 432 of extruding the HDPE around the reinforcing member; and (i) the step 436 of cooling the structural member comprising the HDPE and reinforcing member, where such cooling may be performed in a controlled fashion.

In one embodiment, at least some of steps 412 through 436 are continuous, wherein a reinforcing member is extruded to specification, cooled and texturized (if necessary), and then fed into an HDPE extruder, extruded with HDPE, and then cooled to form the desired structural member. The step 436 of cooling the extruded structural member may accommodate for complexities in cooling the extruded structural member having diverse materials, such as having a HDPE over an aluminum or carbon fiber reinforcing member. This dual in-line fabrication extrusion method has the advantage of providing all necessary opportunity for engineered control of a continuous manufacture process in one location. U.S. Patent Application Publication US 2005/0108983 A1 discloses a method of forming a reinforced extruded composite structural member, and such publication is incorporated herein by reference in its entirety.

Figure 26:
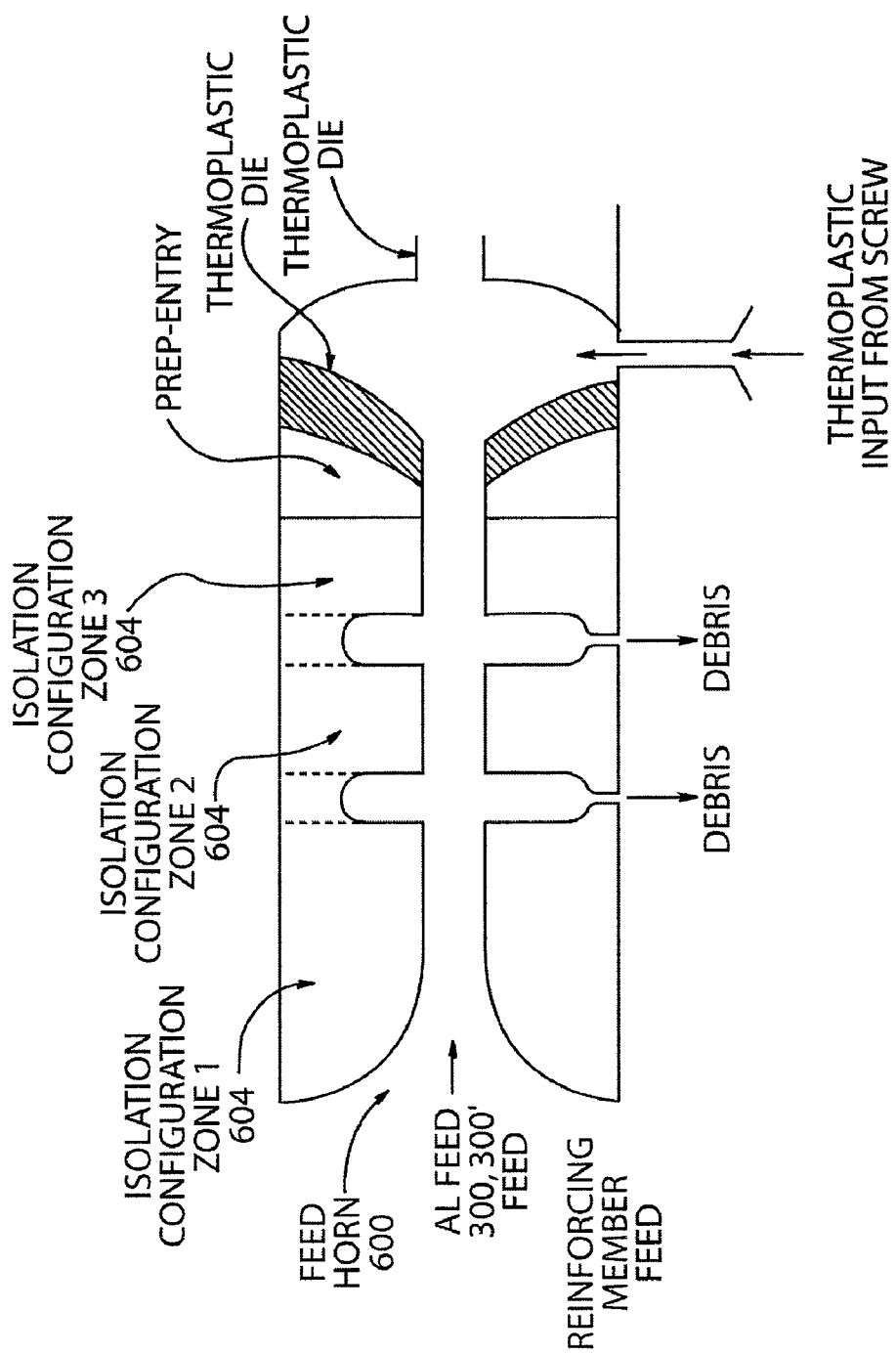
FIGS. 26 and 27 are views of generalized manufacturing equipment in accordance with embodiments of the present invention.
Figure 27:
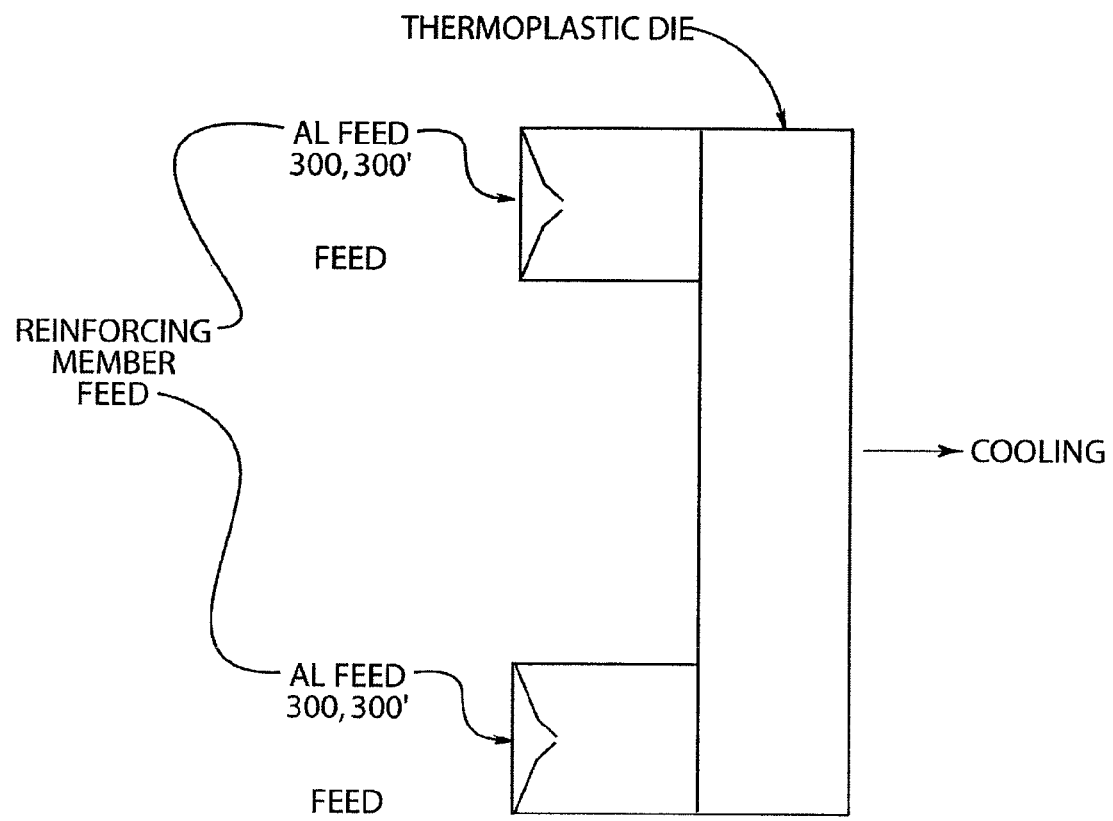

Referring now to FIGS. 26 and 27, a novel feed horn for manufacture of structures in accordance with embodiments of the present invention is shown. This apparatus has application for performing the steps 428 and 432 shown in FIG. 25 and discussed above. In FIG. 26, a top view of a feed horn 600 is shown, wherein the feed horn 600 may be used to extrude a material around the reinforcing member 300, 300', such as the extrusion of HDPE around an aluminum alloy or glass-reinforced polyurethane reinforcing member 300, 300'. The feed horn 600 features at least one isolation configuration zone (and/or secondary dies that may include vacuum forming), or alternatively, a plurality of isolation configuration zones. Due to the pressures involved in extruding a plastic such as HDPE over another material, these zones prevent the extrusion process from forcing the reinforcing member backwards in the feed horn 600, particularly where the reinforcing member comprises shapes, such as divots 344 in ribs 336 or indentations 512, 516 in ridges 338, that are surfaces for inducing a backpressure on the forward progression of the reinforcing member in the feed horn. In general, any backflow potential of the HDPE around the reinforcing member is controlled to allow the reinforcing member to be fed at a rate to fully encapsulate the reinforcing member with the HDPE.

Additional embodiments of the present invention are directed to one or more methods of manufacturing I-joist or other structural members. In accordance with at least one embodiment of the present invention, sonic vibrations are used on the die use to extrude the I-joist or structural member. The sonic vibrations have been found to improve the throughput of the material through the die, such a by a factor of about 3.

In accordance with embodiments of the present invention, thermal control of the reinforcing member may be performed while extruding the thermoplastic material around the reinforcing member. For the various embodiments of the present invention, the thermoplastic may comprise HDPE, PP (Polypropylene) and/or other materials. Polypropylene typically exhibits less shrinkage/swell given temperature fluctuations following extrusion, and may be more beneficial for certain applications. Reinforcing fiber materials may or may not be used, and may comprise carbon fibers, fiberglass, wood fibers, or other types of fibers. In addition, foaming agents may or may not be used, and may be included for a portion of the thermoplastic to lighten the weight of the I-joist or structural member; however, the use of foaming agents in the thermoplastic material is preferably limited so as not to adversely affect the overall strength of the I-joist or structural member. Thus, to maintain strength, a balance is needed for the particular application to appropriately proportion the thickness of the dimensions of the reinforcing member with any thermo-foaming used in the thermoplastic portions of the I-joist or structural member.

By way of example and not limitation, for reinforcing members comprising a metal, such as steel, aluminum or an aluminum alloy, the reinforcing member may be heated or cooled to improve bonding of the thermoplastic material around the reinforcing member. In addition, in at least one embodiment of the present invention, one or more streams of air or gas are can be directed at one or more parts of the composite I-joist or structural member during manufacturing to prevent the thermoplastic material from pulling away from the reinforcing member. In at least one embodiment of the present invention, one or more streams of air or gas are thermally adjusted to promote controlled heating or cooling of the thermoplastic material against the reinforcing member. In addition, in at least one embodiment of the invention, the die used to form portions of the I-joist or structural member are heated and/or cooled to control heating and/or cooling of the thermoplastic plastic material and/or reinforcing member, thereby helping to control shrinkage and/or swelling of the thermoplastic material relative to the reinforcing member. An air pocket may be used in certain areas during the manufacturing process to avoid contraction of the thermoplastic material away from the arms of the reinforcing member. Thus, during one possible method of manufacture, as the reinforcing member enters die, such a cross-head thermoplastic extrusion die, the reinforcing member may be either heated or cooled to assist in a more even cooling and distribution of the thermoplastic material around the reinforcing member. The die itself may also be either heated or cooled to further assist in a more even cooling and distribution of the thermoplastic material around the reinforcing member. In addition, sonic vibration of the reinforcing member or the die may be applied to increase thermoplastic throughput, and thus increase overall production. In general, sonic vibration acts to keep the thermoplastic flowing and in liquid form and from reaching a solid condition prematurely. In addition, to assist even distribution of the thermoplastic in certain thicker sections, and air port providing air pressure may be added to assist in keeping the thermoplastic flow at more equal velocity and extend and maintain the contact with the reinforcing member.

To assist in the understanding of the present invention the following list of components and associated numbering found in the drawings is provided herein:

| Number | Component |
|---|---|
| 10 | I-joist |
| 13 | web member |
| 14 | webbing |
| 18 | upper flange |
| 22 | lower flange |
| 26 | upper outer flange |
| 27 | upper flange assembly |
| 29 | lower flange assembly |
| 30 | lower outer flange |
| 34 | receptacle (of the upper outer flange 26) |
| 38 | key (of the webbing 14 and upper flange 18) |
| 39 | locking mechanism |
| 42 | key (of the webbing 14 and lower flange 22) |
| 43 | locking mechanism |
| 46 | receptacle (of the lower outer flange 30) |
| 60 | I-joist |
| 64 | channel reinforcing member |
| 65 | channel reinforcing member |
| 66 | details/surface texturing |
| 68 | opening |
| 70 | I-joist |
| 71 | reinforcing member |
| 72 | rods |
| 73 | cross member |
| 74 | upper flange |
| 75 | strengthening member |
| 78 | lower flange |
| 82 | I-joist |
| 86 | flange reinforcing member |
| 87 | flange reinforcing member |
| 88 | aperture |
| 90 | corrugated reinforcing member |
| 91 | corrugated reinforcing member |
| 94 | M-shaped reinforcing member |
| 95 | M-shaped reinforcing member |
| 98 | inward projections (of M-shaped reinforcing member 94) |
| 106 | I-joist |
| 106' | I-joist |
| 109 | enclosed flange reinforcing member |
| 110 | enclosed flange reinforcing member |
| 111 | connecting means |
| 114 | I-joist |
| 118 | gusset reinforcing member |
| 122 | I-joist |
| 126 | vertical reinforcing member |
| 130 | I-joist |
| 134 | knock-outs |
| 136 | pins |
| 200 | structural member (or post) |
| 204 | core reinforcing member (of post 200) |
| 208 | outer layer (of post 200) |
| 300 | structural reinforcing member |
| 300' | structural reinforcing member |
| 304 | central region (of structural reinforcing member 300 or 300') |
| 308 | first arm (of structural reinforcing member 300 or 300') |
| 312 | second arm (of structural reinforcing member 300 or 300') |
| 316 | third arm (of structural reinforcing member 300 or 300') |
| 320 | fourth arm (of structural reinforcing member 300 or 300') |
| 328 | structural member (with structural reinforcing member 300) |
| 328' | structural member (with structural reinforcing member 300') |
| 332 | reinforcing core (of structural reinforcing member 300') |
| 336 | rib (of structural reinforcing member 300 or 300') |
| 338 | ridge (of structural reinforcing member 300 or 300') |
| 340 | exterior intersection (between the arms 308, 312, 316, 320) |
| 344 | divot |
| 348 | end shape (of arms 308, 312, 316, 320) |
| 350 | I-joist |
| 352 | I-joist |
| 354 | web and flange reinforcing member |
| 356 | webbing |
| 358 | reinforcing flange member |
| 360 | reinforcing flange member |
| 362 | rim joist |
| 364 | outer member |
| 366 | holes |
| 400 | method of manufacturing |
| 404 | select (reinforcing member specifics and outer material specifics) |
| 408 | prepare (reinforcing member and outer HDPE) |
| 412 | extruding alloy (or other reinforcing member) |
| 416 | rib/scarify/texturize alloy (or other reinforcing member) |
| 420 | cool alloy (or other reinforcing member) |
| 424 | apply adhesive (optional depending upon material type of reinforcing member) |
| 428 | feed alloy (or other reinforcing member) |
| 432 | extrude HDPE around alloy (or other reinforcing member) |
| 436 | cool HDPE |
| 500 | rectangular shape (of ridge 338) |
| 504 | lateral sides (of ridge 338) |
| 508 | top surface (of ridge 338) |
| 512 | full indentions (of ridge 338) |
| 516 | partial indentions (of ridge 338) |
| 520 | reinforcing member |
| 524 | narrowing region (of reinforcing member 520) |
| 528 | waist (of reinforcing member 520) |
| 532 | exterior portion (of reinforcing member 520) |
| 536, 540 | lobes (of reinforcing member 520) |
| 544 | saddle region (of reinforcing member 520) |
| 548 | substantially planar region (of reinforcing member 520) |
| 552 | surface (opposite the saddle 544) |
| 600 | feed horn |
| 604 | isolation configuration zone |
| 700 | reinforcing member |
| 704 | first region |
| 708 | second region |
| 712 | angled lateral channels |
| 712 | angles channels |
| 716 | hollow portion |
| 720 | reinforcing member |
| 724 | concave features |
| 728 | fourth side |
| 732 | flanges |
| 736 | exterior surface |
| 740 | concave features |
| 744 | reinforcing member |
| 748 | channels |
| 752 | lateral sides |
| 756 | top side |
| 760 | first portion |
| 764 | two prongs |
| 768 | indentations |
| 772 | planar surface |
| 772 | surface |
| 776 | flanges |
| 780 | second portion |
| 784 | reinforcing member |
| 788 | lateral channel |
| 792 | concave features |
| 796 | concave features |
| 800 | reinforcing member |
| 804 | planar surface |
| 2800 | indentation |
| 3000 | reinforcing members |
| 3004 | first region |
| 3008 | second region |
| 3012 | indentations |
| 3016 | saddle areas |
| 3020 | central hollow area |
| 3024 | arm hollow area |
| 3100 | reinforcing member |
| 3200 | reinforcing member |
| 3300 | I-joist |
| 3304 | webbing |
| 3308 | hollow portions |
| 3400 | reinforcing member |
| 3404 | indentations |
| 3404 | hollow areas |
| 3500 | I-joist |
| 3504 | reinforcing member |
| 3508 | reinforcing member |
| 3512 | hollow areas |
| 3600 | columns or piers |
| 3604 | hollow center area |
| 3608 | wall |

-continued

| Number | Component |
|---|---|
| 3612 | reinforcing member |
| 3616 | hollow areas |
| 3700 | reinforcing member |
| 3704 | hollow region |
| 3800 | reinforcing member |
| 3800 | a reinforcing member |
| 3800b | reinforcing member |
| 3804 | hollow region |
| 3900 | reinforcing member |
| 3904 | neck region |
| 3908 | separation section |
| 4000 | I-joist |
| 4004 | reinforcing member |
| 4008 | exterior surface (of reinforcing member) |
| 4012 | bend (in exterior surface member) |
| 4016 | lateral exterior surface portion |
| 4020 | saddle exterior surface portion |
| 4100 | post |
| 4104 | reinforcing member |
| 4108 | arm |
| 4112 | arm |
| 4116 | arm |
| 4120 | arm |
| 4124 | saddle area |
| 4200 | post |
| 4204 | reinforcing member |
| 4208 | arm |
| 4212 | arm |
| 4216 | arm |
| 4220 | arm |
| 4224 | saddle area |
| 4228 | center hollow region |
| 4232 | arm hollow region |
| 4236 | neck region |
| 4240 | separation section |
| 4300 | post |
| 4304 | reinforcing member |
| 4308 | arm |
| 4312 | arm |
| 4316 | arm |
| 4320 | arm |
| 4324 | saddle area |
| 4328 | hollow area |
| 4330 | central region |
| 4332 | outermost surface |
| 4336 | exterior surface |
| 4400 | stringer |
| 4404 | reinforcing member |
| 4408 | interconnected cells |
| 4412 | plurality of arms |
| 4416 | saddle area |
| 4420 | hollow areas |
| 4500 | ledger |
| 4504 | reinforcing member |
| 4600 | rim joist or ledger |
| 4604 | reinforcing member |
| 4608 | hollow areas |
| 4612 | hollow areas |
| 4616 | upper half |
| 4620 | lower half |
| 4700 | I-joist |
| 4704 | composite glass-plastic reinforcing member |
| 4708 | interior area |
| 4800 | I-joist |
| 4804 | reinforcing member |
| 4812 | upper flange reinforcing member |
| 4816 | lower flange reinforcing member |
| 4820 | hollow area |
| 4900 | I-joist |
| 4904 | reinforcing member |
| 4908 | webbing portion |
| 4912 | upper flange reinforcing member |
| 4916 | lower flange reinforcing member |
| A-A | axis (of webbing 14 or joist) |
| C | center of flange 74 or 78 |
| $\alpha_{1\text{-}2}$ | angle between first arm 308 and second arm 312 |
| $\alpha_{3\text{-}4}$ | angle between third arm 316 and fourth arm 320 |
| $b_{1\text{-}2}$ | bisector of the angle $\alpha_{1\text{-}2}$ |
| $b_{3\text{-}4}$ | bisector of the angle $\alpha_{3\text{-}4}$ |
| F | force |
| L | longitudinal length |
| d | separation distance (between reinforcing members) |
| w | width (of webbing 14) |
| x | direction |
| y | direction |
| z | direction |

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit Invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A lightweight structural member suitable for use as a building element comprising:
   a substantially solid aluminum alloy inner structural core that is shaped to provide a hollow inner space;
   a plurality of saddles formed in said substantially solid aluminum alloy inner structural core that protrude inwardly into said inner space, said saddles having a neck and a base, said neck having a neck width that is less than a maximum base width of said base;
   a thermoplastic outer layer that is extruded over an outer surface of said substantially solid aluminum alloy inner structural core, said thermoplastic outer layer substantially filling said base of said saddles so that said saddles mechanically secure said thermoplastic outer layer to said substantially solid aluminum alloy inner structural core, said thermoplastic outer layer substantially surrounding said substantially aluminum alloy inner structural core to provide a protective layer that protects said substantially solid aluminum alloy inner structural core.

2. The lightweight structural member of claim 1 further comprising:
an additional substantially solid aluminum alloy inner structural core that is shaped to provide an additional hollow inner space;
additional saddles formed in said additional substantially solid aluminum alloy inner structural core that protrude inwardly into said inner space, said additional saddles having a neck and a base, said neck having a neck width that is less than a maximum base width of said base.

3. The lightweight structural member of claim 1 wherein said substantially solid aluminum inner structural core has at least one bend that transitions between a straight portion of said outer surface of said substantially solid aluminum inner structural core and at least one saddle of said plurality of saddles, said straight portion disposed substantially parallel to a planar exterior surface of said lightweight structural member, said bend being greater than 90 degrees and less than about 180 degrees.

4. The structural member of claim 1 wherein said thermoplastic outer layer comprises HDPE.

5. The structural member of claim 1 wherein said thermoplastic outer layer comprises PPE.

6. The structural member of claim 1 wherein said thermoplastic outer layer comprises a talc additive.

7. The structural member of claim 1 wherein said thermoplastic outer layer comprises a $CaCO_3$ additive.

8. A method of making a lightweight structural member for use as a building element comprising:
providing a substantially solid aluminum alloy inner structural core that is shaped to provide a hollow inner space;
providing a plurality of saddles in said substantially solid aluminum alloy inner structural core that protrude inwardly into said hollow inner space of said substantially solid aluminum alloy inner structural core, said saddles having a neck and a base, said neck having a neck width that is less than a maximum base width of said base of said saddles;
extruding a thermoplastic outer layer over an outer surface of said substantially solid aluminum alloy inner structural core, said thermoplastic outer layer substantially filling said base of said saddle so that said saddle mechanically secures said thermoplastic outer layer to said substantially solid aluminum alloy inner structural core, said thermoplastic outer layer substantially surrounding said substantially solid aluminum alloy inner structural core to protect said substantially solid aluminum alloy inner structural core.

9. The method of claim 8 further comprising:
providing an additional substantially solid aluminum alloy inner structural core that is shaped to provide an additional hollow inner space;
providing additional saddles formed in said additional substantially solid aluminum alloy inner structural core that protrude inwardly into said inner space, said additional saddles having a neck and a base, said neck having a neck width that is less than a maximum base width of said base.

10. The method of claim 8 wherein said process of extruding a thermoplastic outer layer comprises:
extruding a thermoplastic outer layer that comprises HDPE.

11. The method of claim 8 wherein said process of extruding a thermoplastic outer layer comprises:
extruding a thermoplastic outer layer that comprises PPE.

12. The method of claim 8 wherein said process of extruding a thermoplastic outer layer comprises:
extruding a thermoplastic outer layer that comprises a talc additive.

13. The method of claim 8 wherein said process of extruding a thermoplastic outer layer comprises:
extruding a thermoplastic outer layer that comprises a $CaCO_3$ additive.

* * * * *